(12) United States Patent
Sabe et al.

(10) Patent No.: US 7,117,190 B2
(45) Date of Patent: Oct. 3, 2006

(54) ROBOT APPARATUS, CONTROL METHOD THEREOF, AND METHOD FOR JUDGING CHARACTER OF ROBOT APPARATUS

(75) Inventors: Kohtaro Sabe, Tokyo (JP); Rika Hasegawa, Chiba (JP); Makoto Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 09/890,231

(22) PCT Filed: Nov. 30, 2000

(86) PCT No.: PCT/JP00/08472

§ 371 (c)(1),
(2), (4) Date: Jul. 27, 2001

(87) PCT Pub. No.: WO01/39932

PCT Pub. Date: Jun. 7, 2001

(65) Prior Publication Data

US 2003/0045203 A1 Mar. 6, 2003

(30) Foreign Application Priority Data

Nov. 30, 1999 (JP) ................................. 11-341206
Nov. 30, 1999 (JP) ................................. 11-341207
Nov. 30, 1999 (JP) ................................. 11-341375

(51) Int. Cl.
*A63H 7/00* (2006.01)
*B25J 13/00* (2006.01)
*G05B 13/04* (2006.01)

(52) U.S. Cl. .......................................................... 706/45

(58) Field of Classification Search ................. 700/245, 700/247, 248, 250; 901/1
See application file for complete search history.

(56) References Cited

U.S. PATENT DOCUMENTS 5,870,527 A 2/1999 Fujikawa et al.

(Continued)

FOREIGN PATENT DOCUMENTS

EP 0 898 237 A2 2/1999

(Continued)

*Primary Examiner*—Anthony Knight
*Assistant Examiner*—Ronald E Williams, Jr.
(74) *Attorney, Agent, or Firm*—Frommer Lawrence & Haug LLP; William S. Frommer; Thomas F. Presson

(57) ABSTRACT

In a robot apparatus and a control method therefor, firstly, partial or whole state space of a behavioral model is expanded or reduced, secondly, transition to a predetermined node in the behavioral model is described as transition to a virtual node and a node group to be allotted to the virtual node is sequentially changed, thirdly, the number of emotions and/or desires which are used for generating actions is gradually increased, and fourthly, an environment is evaluated to update each sensitivity corresponding to each emotion and desire, on the basis of the evaluated. In the robot apparatus and the character discriminating method for the robot apparatus, a pet robot is provided with: detecting means for detecting outputs from other pet robots; character discriminating means for discriminating characters of the pet robots on the basis of the result detected by the detecting means; and character changing means for changing the character on the basis of the result judged by the character discriminating means.

20 Claims, 39 Drawing Sheets

U.S. PATENT DOCUMENTS

| | | |
|---|---|---|
| 6,253,167 B1 * | 6/2001 | Matsuda et al. ............... 703/11 |
| 6,302,789 B1 * | 10/2001 | Harada et al. ................. 463/7 |
| 6,385,506 B1 * | 5/2002 | Hasegawa et al. .......... 700/245 |
| 6,445,978 B1 * | 9/2002 | Takamura et al. .......... 700/245 |
| 6,584,376 B1 * | 6/2003 | Van Kommer .............. 700/245 |
| 6,595,858 B1 * | 7/2003 | Tajiri et al. ................... 463/31 |
| 6,656,049 B1 * | 12/2003 | Masaki et al. ................ 463/36 |
| 6,772,121 B1 * | 8/2004 | Kaneko ....................... 704/270 |
| 2001/0007825 A1 * | 7/2001 | Harada et al. ................. 463/7 |
| 2002/0016128 A1 * | 2/2002 | Saito .......................... 446/268 |
| 2002/0098879 A1 * | 7/2002 | Rheey ........................... 463/1 |

FOREIGN PATENT DOCUMENTS

| | | | |
|---|---|---|---|
| JP | 7-104778 | | 4/1995 |
| JP | 9-114514 | | 5/1997 |
| JP | 10-235019 | | 9/1998 |
| JP | 11-65417 | * | 3/1999 |
| JP | 11-126017 | | 5/1999 |
| WO | WO 00/67961 | * | 11/2000 |

* cited by examiner

```
「TWEETY PERIOD」
node 100 ,   1st ROW ,   1st LINE ,   20%
node 100 ,   1st ROW ,   nth LINE ,   30%
                  ⋮
node 320 ,   3rd ROW ,   3rd LINE ,   0%
                  ⋮
node 720 ,   2nd ROW ,   4th LINE ,   15%       ⎱91A
```

```
「ADULT PERIOD」
node 230 ,   1st ROW ,   3rd LINE ,   40%
node 230 ,   1st ROW ,   4th LINE ,   0%
                  ⋮
node 520 ,   4th ROW ,   15th LINE ,   20%      ⎱91D
```

NODE NAME | CHANGING PLACE | TRANSITION BROBABILITY AFTER CHANGE

| node 100 | INPUT EVENT NAME | DATA NAME | RANGE OF DATA | TRANSITION PROBABILITY TO ANOTHER NODE | | | | |
|---|---|---|---|---|---|---|---|---|
| | | | | A | B | C | D | n |
| | | | | node 120 | node120 | node 1000 | | node 600 |
| TRANSITION TARGET NODE OUTPUT ACTION | | | | ACTION 1 | ACTION 2 | MOVE BACK | | ACTION 4 |
| 1 | BALL | SIZE | 0,1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0,100 | | | 50% | | |
| 6 | | JOY | 50,100 | | | 100% | | |
| 7 | | SUPRISE | 50,100 | | | | | |
| 8 | | SADNESS | 50,100 | | | | | |

| node 100 | INPUT EVENT NAME | DATA NAME | RANGE OF DATA | TRANSITION PROBABILITY TO ANOTHER NODE $D_i$ | | | | |
|---|---|---|---|---|---|---|---|---|
| | | | | A | B | C | D | n |
| | | | | node 120 | node120 | node 1000 | | node 600 |
| TRANSITION TARGET NODE / OUTPUT ACTION | | | | ACTION 1 | ACTION 2 | MOVE BACK | | ACTION 4 |
| 1 | BALL | SIZE | 0.1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0.100 | | | | | |
| 6 | | JOY | 50.100 | | | 50% | | |
| 7 | | SUPRISE | 50.100 | | | 100% | | |
| 8 | | SADNESS | 50.100 | | | | | |

(A) 201A TWEETY
- Appetite 0.6
- Affection 0.0
- Curiosity 0.0
- Exercise 0.0

(B) 201B BABY
- Appetite 0.5
- Affection 0.6
- Curiosity 0.0
- Exercise 0.0

(C) 201C CHILD
- Appetite 0.5
- Affection 0.3
- Curiosity 0.4
- Exercise 0.0

(D) 201D YOUNG
- Appetite 0.5
- Affection 0.3
- Curiosity 0.6
- Exercise 0.7

(E) 201E ADULT
- Appetite 0.5
- Affection 0.3
- Curiosity 0.5
- Exercise 0.5

ROBOT APPARATUS, CONTROL METHOD THEREOF, AND METHOD FOR JUDGING CHARACTER OF ROBOT APPARATUS

TECHNICAL FIELD

The present invention relates to a robot apparatus and a control method therefor, and a robot character discriminating method, and more particularly to, for example, a pet robot.

BACKGROUND ART

As the first background art, in recent years, a four-legged walking type pet robot has been proposed and developed by the applicant of the present application. Such a pet robot has a shape similar to a dog and a cat which are raised in a general home, and is adapted to be able to autonomously act in response to approach from the user such as "patting" or "petting," a surrounding environment or the like.

Also, this pet robot is mounted with a learning function to change revelation probability of corresponding action on the basis of approaches such as "patting" and "petting" from the user, a growth function for stepwise changing the degree of difficulty of the action and the level of complicatedness on the basis of accumulation, elapsed time or the like of the approaches concerned, or the like to thereby provide high marketability and amusement characteristics as the "pet robot."

In such a pet robot, there are prepared behavioral models consisting of individual probability state transition models for each growth stage (hereinafter, referred to as "growth stage"), and the behavioral model is switched to the behavioral model of the above described "growth stage" on the basis of approaches from the user, accumulation of elapsed time or the like to thereby express the "growth." Also, in the pet robot, the transition probability at a corresponding place in the behavioral model is caused to change in response to approaches from the user is changed to thereby express the above described "learning."

According to this method, however, the behavioral model is switched to a new behavioral model every time the pet robot "grows," and therefore, the pet robot starts a new action for each "growth" as if the character was suddenly changed, and the result of the "learning" until then is to be canceled. This has led to a problem that the user, who has been used to and familiar with the action pattern until then, feels unnaturally.

Also, according to the method, even if there is any duplicate action pattern, it is necessary to prepare a behavioral model portion for the action pattern for each "growth stage," and therefore, there is a problem that an operation for generating the behavioral model will become complicated by that much.

Therefore, if it is made possible to carry forward the action pattern or the learning result to the next "growth stage" during, for example, "growth," it will be possible to get rid of such unnaturalness during "growth" as described above for expressing more organism-like "growth," and it is considered that the entertainment characteristics could be that much improved.

Further, as the second background art, in recent years, a study for modeling the emotion of a human being on a computer and expressing the emotion has been vigorously promoted. As the robot technological attempts of such modeling, there have been known in Japan, the face robot of a laboratory of Fumio Hara in the Tokyo science college, or WAMOEBA 2 of a laboratory of Sugano in the Waseda University, the cat robot of OMURON Co., Ltd. or the like ("Model and Expression of Generation of Artificial Emotion" by Fumio Hara; Mathematical science, vol. 32, No. 7, page 52–58, 1994, "Study of Emotional Exchange between Human Being and Robot, Setting and Trial of Robot for Evaluation "WAMOEBA-2" by Ogata, Sugano; Lecture thesis of robotics and mechatronics lecture meeting of Japan mechanics learned society, vol. A, 1996, pp 449–452, and "Interactive Pet Robot having Emotion" by Tajima, Saito, Osumi, Kudo, Shibata; Preparatory copies of science lecture meeting of Japan Robot learned society, vol. 16, page 11–12, 1998).

In these studies, their subjects reside in how behaviors or expressions similar to those of a living thing can be obtained by initially employing already completed emotion and instinct models. However, in the case where the growth processes of the living thing are taken into consideration, it is impossible to estimate that the emotion and instinct thereof always work on the basis of the same models from a BABY period to an adult period. Therefore, the above mentioned modeling of human emotion has involved an unnatural problem from the viewpoint of "growth".

Further, in the case where an application that an autonomous robot treated as a pet is equipped with emotion or instinct is considered, it is difficult for a user to understand and accept the robot which has initially perfect emotion and instinct. For example, in a robot having a plurality of desires (for instance, "affection desire" and "exercise desire", etc.) as the instinct and a plurality of emotional behaviors (for instance, "joy", "sadness" and "fear", etc.) as the emotion, since the internal motions of the robot are complicated, the user hardly understand what the robot currently wants or how the robot currently feels.

Further, in the above robot, if the emotion and the instinct of the robot do not change and are always the same, the user is liable to lose interest in the robot. Thus, the robot is disadvantageously insufficient in view of commercialization and amusement characteristics.

Furthermore, as the third background art, there have conventionally been proposed and developed the so-called quadruped walking type pet robots which act in accordance with users' commands and surrounding environments. This kind of pet robot has a form quite similar to that of a quadruped animal such as a dog or a cat which is bred at home and is configured to assume a posture of prostration when the robot receives an order of "prostrate" and take an action of "hand lending" when the user stretches out his hand before a mouth of the robot.

By the way, such a pet robot has a model of emotion as well as a mechanism which determines an action by himself and a feature of the pet robot which can be called as a character is changed under no influence due to another robot.

Here, the character of an animal is formed under influences due to surrounding environments and when two pets are bred together, for example, existence of a pet influences largely on forming of a character of the other pet in actual circumstances.

DISCLOSURE OF THE INVENTION

The present invention has been achieved in consideration of the above described points, and is aimed to propose: firstly, a robot apparatus and control method therefor which are capable of improving the entertainment characteristics; secondly, a robot apparatus and control method therefor which are capable of improving the amusement characteristics; thirdly, a robot apparatus and a robot character discriminating method which are capable of forming the character more real.

In order to solve such problems, a robot apparatus according to the present invention is provided with: memory means for storing behavioral model; and action generating means for generating actions by the use of partial or full state space of the behavioral model, and the action generating means is caused to change state space to be used for action generation, of the behavioral models while expanding or reducing the state space. As a result, this robot apparatus is capable of reducing discontinuity in action output before and after change in state space to be used for action generation because the state space to be used for action generation continuously changes. Thereby, output actions can be changed smoothly and naturally, thus making it possible to realize a robot apparatus which improves the entertainment characteristics.

Also, according to the present invention, in a robot apparatus having a behavioral model consisting of state transition models and for generating action on the basis of the behavioral model concerned, transition to a predetermined node in the behavioral model is described as transition to a virtual node consisting of imaginary nodes, a predetermined first node group is allocated to the virtual node concerned, and change means for changing a node group to be allocated to the virtual node is provided. As a result, in this robot apparatus, it is possible to provide consistency in the output action because the behavioral model, which becomes the basis, is fixed. Thereby, output actions can be changed smoothly and naturally, thus making it possible to realize a robot apparatus which improves the entertainment characteristics.

Further, in the present invention, a control method for the robot apparatus is provided with a first step for generating action by the use of partial or full state space of the behavioral model, and a second step for changing state space to be used for action generation, of the behavioral models while expanding or reducing the state space. As a result, according to the control method for this robot apparatus, it is possible to reduce discontinuity in action output before and after change in state space to be used for action generation because the state space to be used for action generation continuously changes. Thereby, output actions can be changed smoothly and naturally, thus making it possible to realize a control method for a robot apparatus which improves the entertainment characteristics.

Further, according to the present invention, in the control method for the robot apparatus, transition to a predetermined node in the behavioral model is described as transition to a virtual node consisting of imaginary nodes, and there are provided a first step for allocating a predetermined node group to the virtual node concerned, and a second step for changing the node group to be allocated to the virtual node. As a result, according to the control method for this robot apparatus, it is possible to change the output action with consistency because the basic behavioral model is determined. Thereby, output actions can be changed smoothly and naturally, thus making it possible to realize a control method for a robot apparatus which improves the entertainment characteristics.

Further, according to the present invention, there is provided a robot apparatus which generates an action on the basis of the parameter value of each emotional behavior of an emotion model and/or the parameter value of each desire of an instinct model which are sequentially updated in accordance with prescribed conditions, the robot apparatus comprising restricting means for restricting the number of the emotional behaviors or the desires used for generating the action so as to increase or decrease them stepwise. As a result, according to this robot apparatus, the emotion and/or instinct can be changed as if the emotion and/or instinct of a real living thing "grew".

Further, according to the present invention, there is provided a robot apparatus which generates an action on the basis of the parameter value of each emotional behavior of an emotion model and/or the parameter value of each desire of an instinct model, the robot apparatus comprising emotional behavior and/or desire updating means for sequentially updating the parameter value of each emotional behavior and/or the parameter value of each desire, depending on corresponding sensitivity individually set to each emotional behavior and/or each desire, on the basis of externally applied stimulation and/or the lapse of time; and sensitivity updating means for evaluating an environment and respectively updating the sensitivity corresponding to each emotional behavior and/or each desire on the basis of the evaluated result. Consequently, according to this robot apparatus, the sensitivity of each emotional behavior and/or each desire can be optimized relative to the environment.

Still further, according to the present invention, there is provided a control method for a robot apparatus which generates an action on the basis of the parameter value of each emotional behavior of an emotion model and/or the parameter value of each desire of an instinct model which are sequentially updated in accordance with prescribed conditions, the control method for the robot apparatus comprising: a first step of restricting the number of the emotional behaviors and/or the desires used for generating the action during an initial time and a second step of increasing or decreasing stepwise the number of the emotional behaviors and/or the desires used for generating the action. As a result, according to the control method for a robot apparatus, the emotion and/or instinct can be changed as if the emotion and/or instinct of a real living thing "grew".

Still further, according to the present invention, there is provided a control method for a robot apparatus which generates an action on the basis of the parameter value of each emotional behavior of an emotion model and/or the parameter value of each desire of an instinct model, the control method for a robot apparatus comprising a first step of updating the parameter value of each emotional behavior and/or the parameter value of each desire, depending on corresponding sensitivity individually set to each emotional behavior and/or each desire, on the basis of externally applied stimulation and the lapse of time; and a second step of evaluating an environment and respectively updating the sensitivity corresponding to each emotional behavior and/or each desire on the basis of the evaluated result. Therefore, according to this control method for a robot apparatus, the sensitivity of each emotional behavior and/or each desire can be optimized relative to the environment.

Further, the robot apparatus according to the present invention comprises detecting means for detecting an output from another robot and character discriminating means which discriminates a character of the other robot apparatus on the basis of a result detected by the detecting means. As a result, such a robot apparatus discriminates the character of the other robot apparatus on the basis of the detection result of the output from the other robot apparatus, which is detected by the detecting means, with the character discriminating means. Thereby, the robot apparatus can change own character based on the discrimination result of the character of the other robot apparatus, thus making it possible to realize a robot apparatus which can form its character more real.

Further, the character discriminating method for robot apparatus according to the present invention detects an output from a robot apparatus and discriminates a character of the above described robot apparatus on the basis of a detection result. Accordingly, using the character discriminating method for robot apparatus can realize the character discriminating method for robot apparatus which can change own character on the basis of the discrimination result of the character of another robot apparatus.

BRIEF DESCRIPTION OF THE DRAWINGS

FIG. 8 is a chart showing a state transition table.

FIG. 25 is a chart showing a state transition table.

FIG. 30 is a conceptual view showing an instinct parameter file for each "growth stage".

BEST MODE FOR CARRYING OUT THE INVENTION

Hereinafter, with reference to the drawings, the detailed description will be made of an embodiment according to the present invention.

Figure 1:
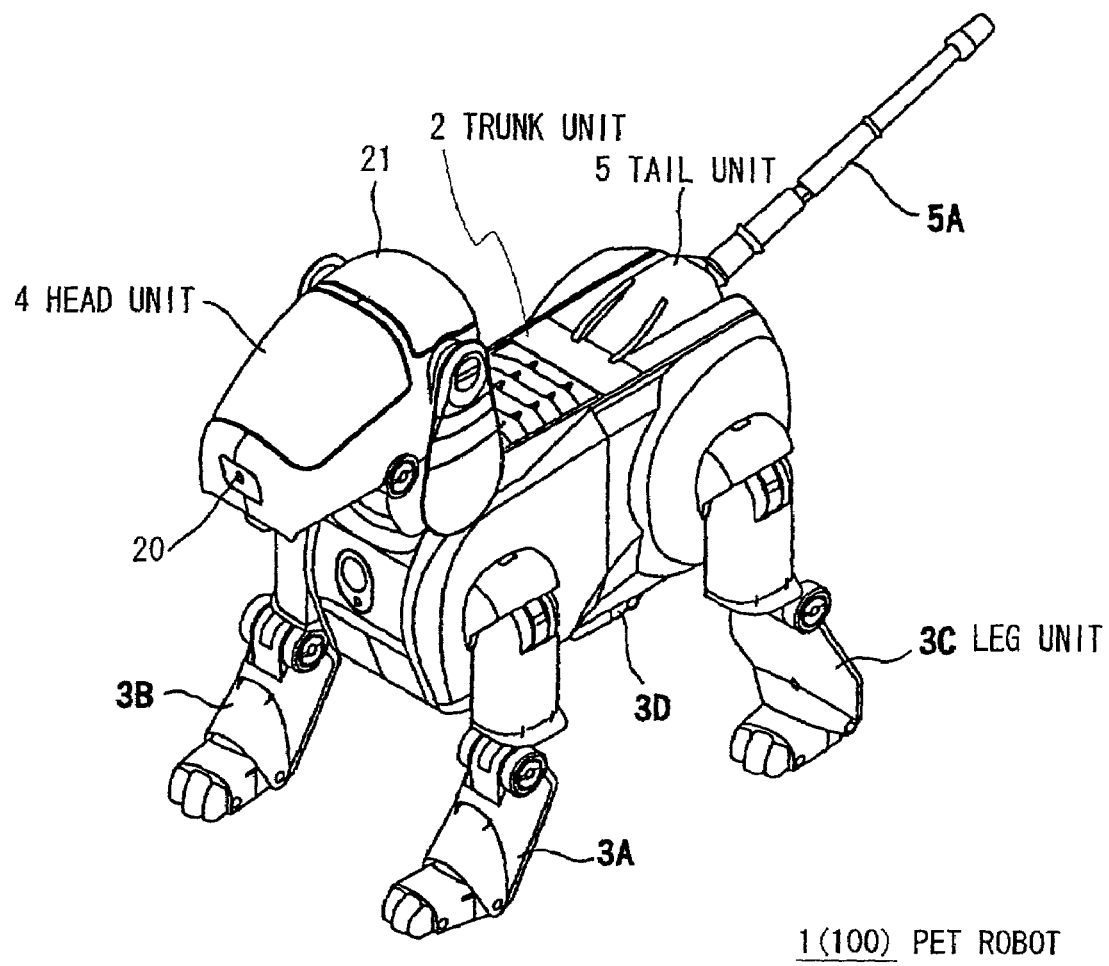
FIG. 1 is a perspective view showing an external appearance configuration of a pet robot according to a first and second embodiments.

(1) First Embodiment (1-1) Configuration of Pet Robot According to First Embodiment In FIG. 1, reference numeral 1 denotes a pet robot according to the first embodiment as a whole, which is configured such that leg units 3A to 3D are coupled to a trunk unit 2 in front and in rear, and on both sides thereof, and a head unit 4 and a tail unit 5 are coupled to the front end and rear end of the trunk unit 2 respectively.

Figure 2:
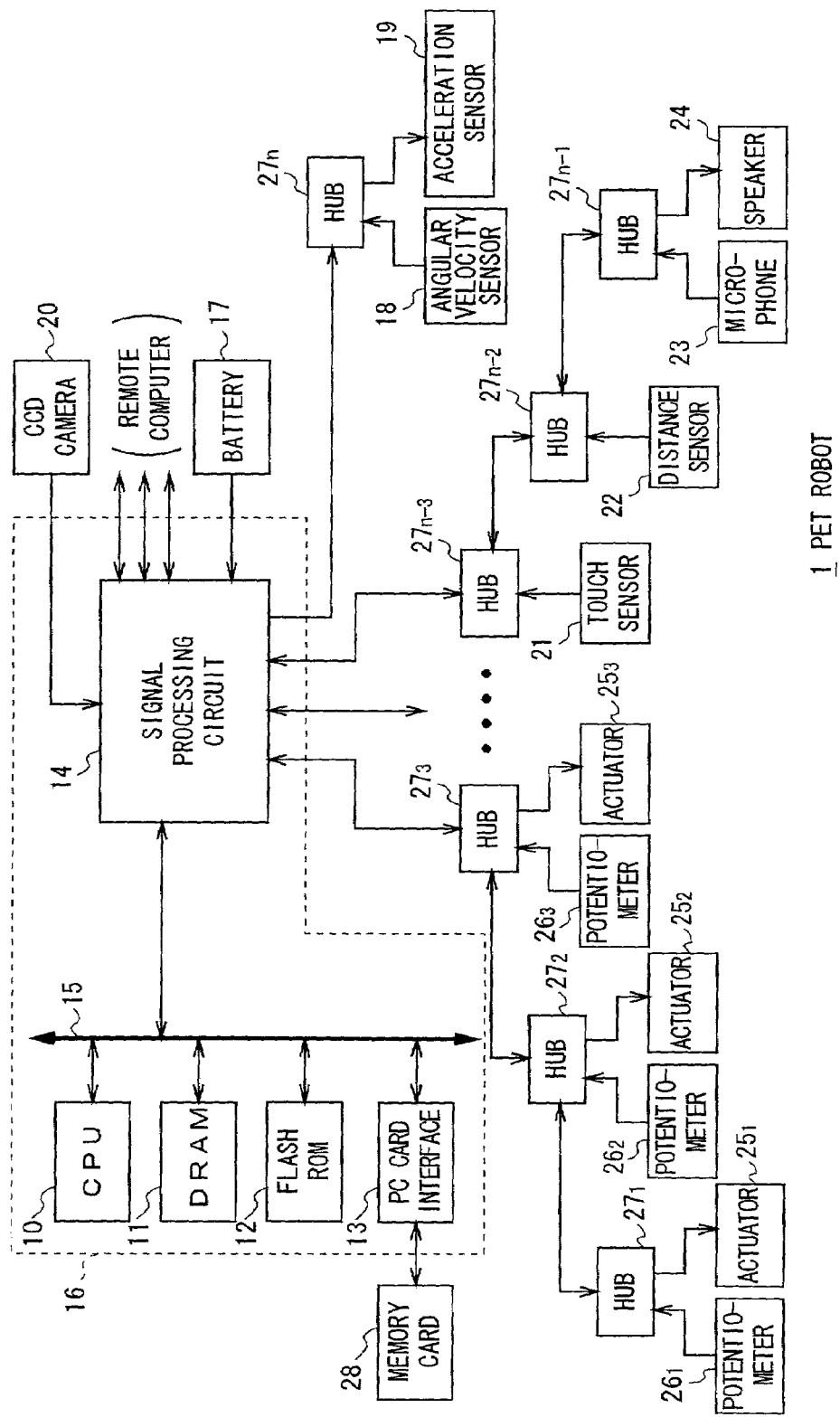
FIG. 2 is a block diagram showing a circuit configuration of the pet robot.

The trunk unit 2, as shown in FIG. 2, contains a control unit 16 in which a CPU (Central Processing Unit) 10, a DRAM (Dynamic Random Access Memory) 11, a flash ROM (Read Only Memory) 12, a PC (Personal Computer) card interface circuit 13 and a signal processing circuit 14 are connected to each other with an internal bus 15, and a battery 17 as a power source for the pet robot 1. In addition, the trunk unit 2 contains an angular velocity sensor 18, an acceleration sensor 19 or the like for detecting the direction and acceleration of the movement of the pet robot 1.

Disposed at predetermined positions in the head unit 4 are a CCD (Charge Coupled Device) camera 20 for picking up external conditions; a touch sensor 21 for detecting pressure given by physical approaches such as "petting" and "patting" from the user; a distance sensor 22 for measuring a distance to a front object; a microphone 23 for collecting external sounds; a speaker 24 for outputting sounds such as barks; LEDs (Light Emitting Diode) (not shown) corresponding to "eyes" of the pet robot 1; and the like.

Further, on joint portions of each leg unit 3A to 3D, each coupled portion between each leg unit 3A to 3D and the trunk unit 2, a coupled portion between the head unit 4 and the trunk unit 2, a coupled portion between the tail unit 5 and the tail 5A, and the like, there are disposed actuators $25_1$ to $25_n$ and potentiometers $26_1$ to $26_n$ having several degrees of freedom.

Various sensors including the angular velocity sensor 18, acceleration sensor 19, touch sensor 21, distance sensor 22, microphone 23, speaker 24, and each potentiometer $26_1$ to $26_n$, the LEDs and the actuator $25_1$ to $25_n$ are connected to the signal processing circuit 14 in the control unit 16 via corresponding hubs $27_1$ to $27_n$, and the CCD camera 20 and the battery 17 are directly connected to the signal processing circuit 14.

At this time, the signal processing circuit 14 successively captures sensor data, image data and audio data to be supplied from each of the above described sensors, and successively stores these data in predetermined positions of the DRAM 11 via the internal bus 15. The signal processing circuit 14 successively captures battery residual amount data indicating the battery residual amount to be supplied from the battery 17, together with those data to store them in a predetermined position of the DRAM 11.

Each sensor data, image data, audio data and battery residual amount data, which have been stored in the DRAM 11, will be utilized when the CPU 10 controls the operation of this pet robot 1 later.

Actually, the CPU 10 reads out, when power supply for the pet robot 1 is initially turned on, a control program stored in a memory card 28 loaded in the PC card slot (not shown) of the trunk unit 2 or in the flash ROM 12, via the PC card interface circuit 13 or directly, to store it in the DRAM 11.

Then, on the basis of each sensor data, image data, audio data and battery residual amount data to be successively stored in the DRAM 11 from the signal processing circuit 14 as described above, the CPU 10 judges self conditions and surrounding conditions, the presence or absence of any instruction and approaches from the user, and the like.

Further, the CPU 10 determines a next action on the basis of this judgment result and the control program stored in the DRAM 11, and drives necessary actuators $25_1$ to $25_n$ on the basis of the determination result concerned to thereby move the head unit 4 left, right, up or down, wag a tail 5A of the tail unit 5, and drive each leg unit 3A to 3D for walking among others.

At this time, the CPU 10 produces audio data as required, and gives it to the speaker 24 through the signal processing circuit 14 as an audio signal to thereby output voice based on the audio signal concerned outward, or to light, put out or blink the LED.

As described above, this pet robot 1 is adapted to be able to autonomously act depending on conditions of the self and surroundings and any instruction and approach from the user.

(1-2) Software Configuration of Control Program

Figure 3:
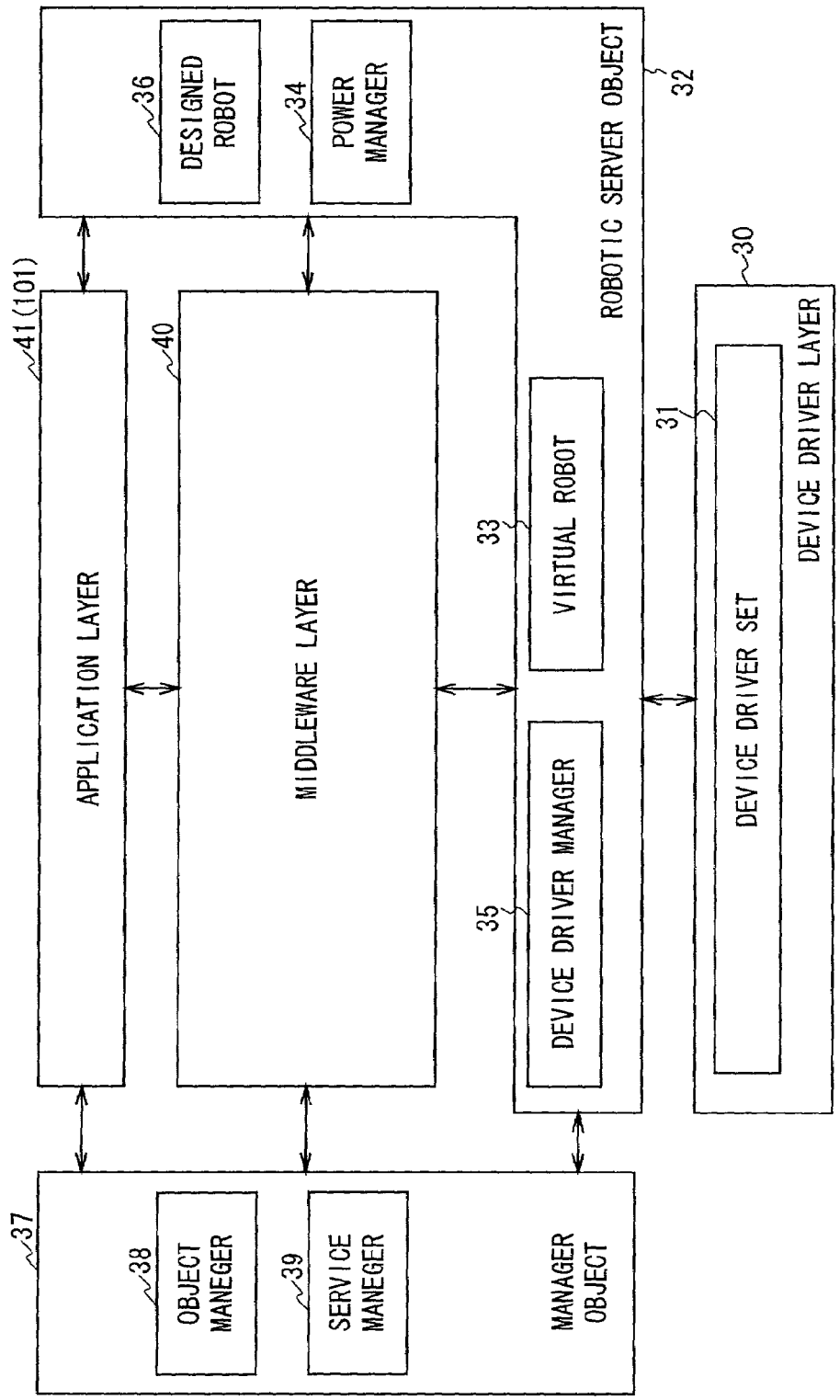
FIG. 3 is a conceptual view showing software configuration of a control program.

FIG. 3 shows a software configuration of the control program in the pet robot 1. In this FIG. 3, a device driver layer 30 is located at the lowest layer of this control program, and is configured by a device driver set 31 consisting of a plurality of device drivers. In this case, each device driver is an object allowed to directly access hardware to be used in an ordinary computer such as the CCD camera 20 (FIG. 2) and a timer, and receives an interruption from corresponding hardware for processing.

A robotic server object 32 is located in the upper layer of the device driver layer 30, and is configured by: a virtual robot 33 consisting of a software group for providing an interface for accessing hardware such as, for example, various sensors and actuators $25_1$ to $25_n$ described above; a power manager 34 consisting of a software group for managing switching or the like of the power supply; a device driver manager 35 consisting of a software group for managing other various device drivers; and a designed robot 36 consisting of a software group for managing the mechanism of the pet robot 1.

The manager object 37 is configured by an object manager 38 and a service manager 39. In this case, the object manager 38 is a software group for managing start and end of each software group included in the robotic server object 32, a middleware layer 40 and an application layer 41, and the service manager 39 is a software group for managing connections of the objects on the basis of information on connections between the objects written in a connection file stored in the memory card 28 (FIG. 2).

The middleware layer 40 is located in the upper layer of the robotic server object 32, and is configured by a software group for providing this pet robot 1 with basic functions such as image processing and audio processing. The application layer 41 is located in the upper layer of the middleware layer 40 and is configured by a software group for determining the actions of the pet robot 1 on the basis of results of processing obtained by processing by each software group constituting the middleware layer 40.

Figure 4:
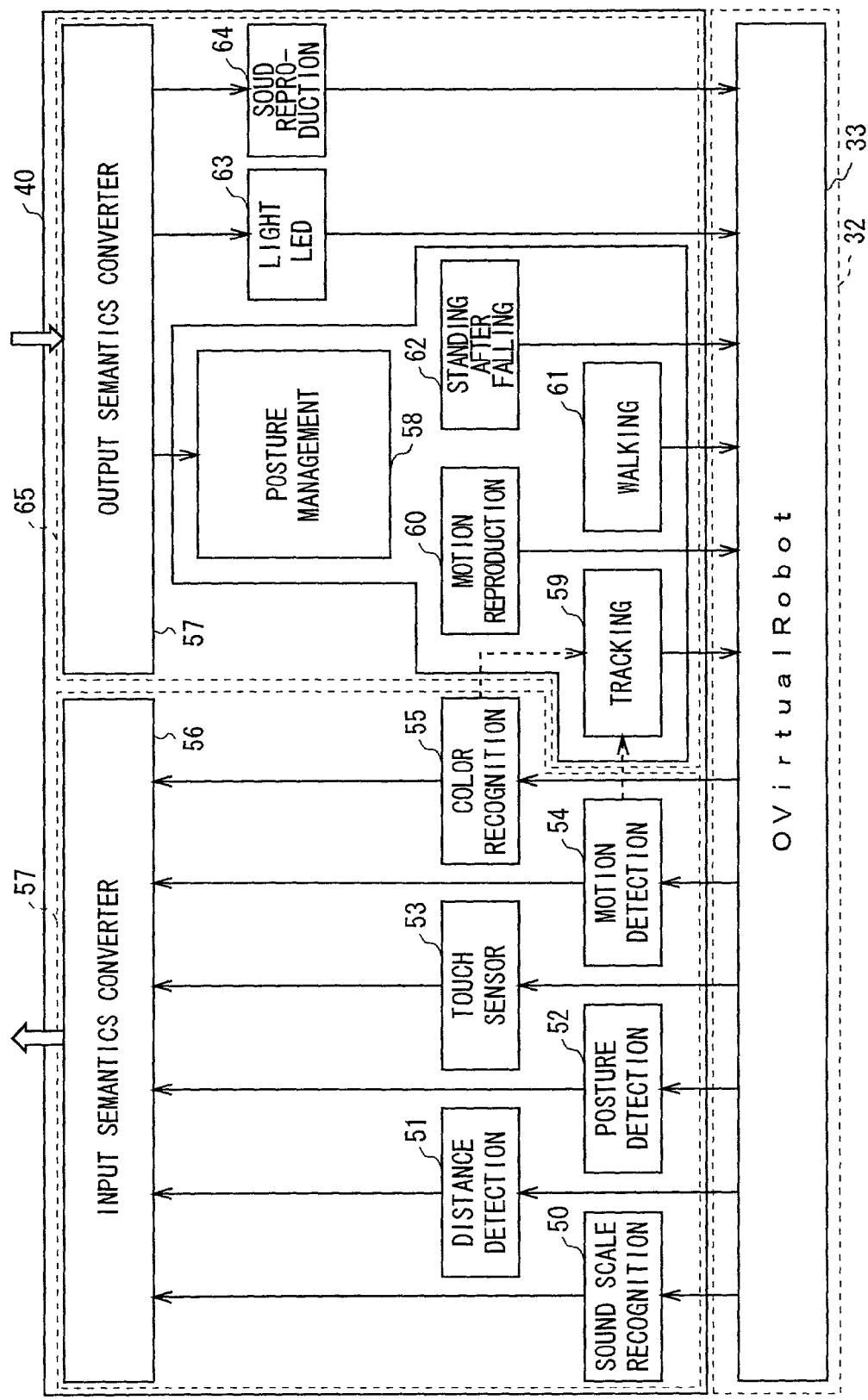
FIG. 4 is a conceptual view showing software configuration of a middleware layer.
Figure 5:
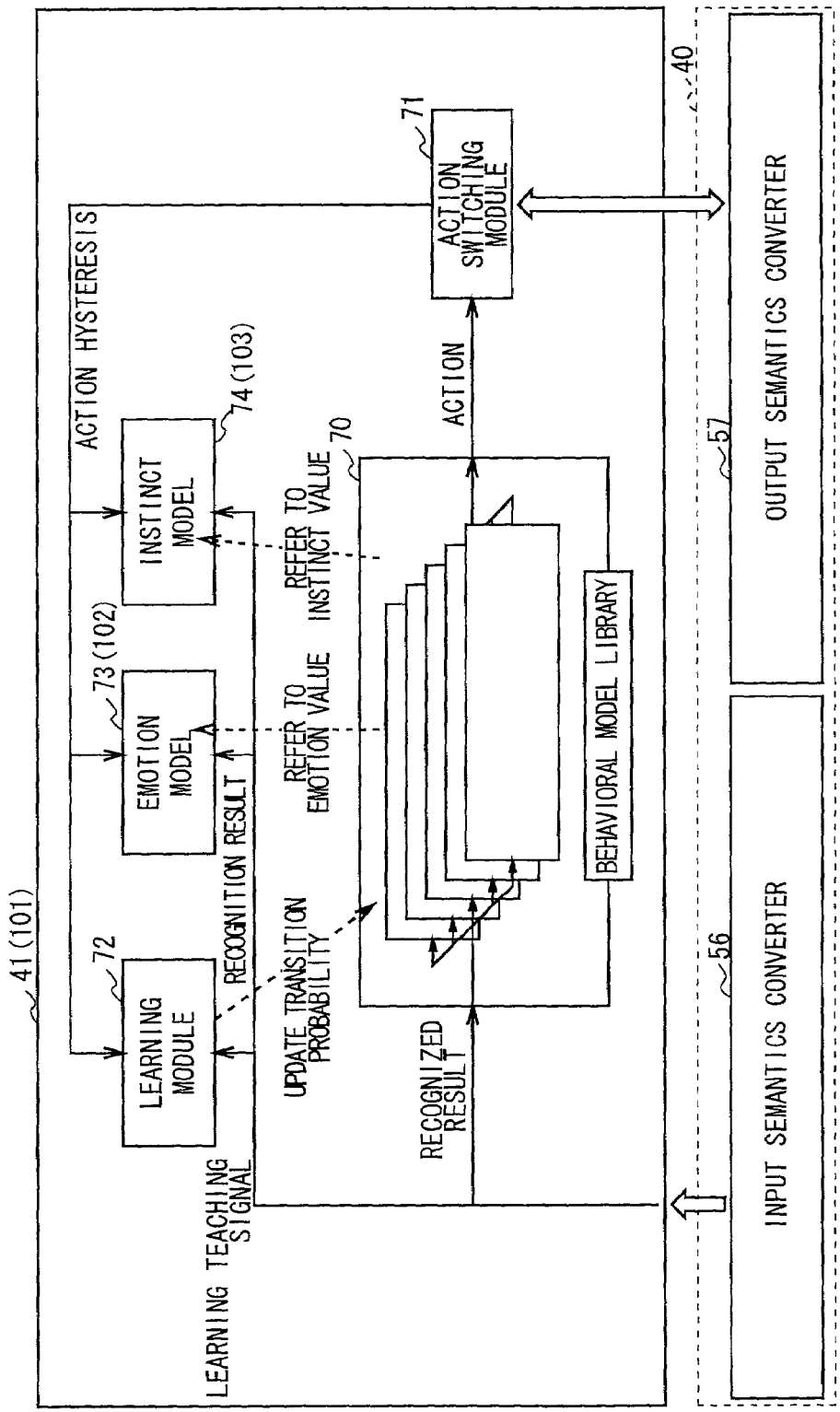
FIG. 5 is a conceptual view showing software configuration of an application layer.

In this respect, FIG. 4 and FIG. 5 show concrete software configuration of the middleware layer 40 and the application layer 41 respectively.

The middleware layer 40 is, as is obvious also from FIG. 4, configured by: a recognition system 57 having signal processing modules 50 to 55 for musical scales recognition, for distance detection, for posture detection, for the touch sensor, for movement detection and for color recognition, an input semantics converter module 56 and the like; and an output system 65 having an output semantics converter module 57, signal processing modules 58 to 64 for posture management, for tracking, for operation playback, for walking, for falling-down and standing-up, for LED lighting and for sound reproducing, and the like.

In this case, each signal processing module 50 to 55 in the recognition system 57 captures corresponding data from among sensor data, image data and audio data to be read out from the DRAM 11 (FIG. 2) by a virtual robot 33 in the robotic server object 32, and carries out predetermined processing on the basis of the data to supply the processing results to the input semantics converter module 56.

On the basis of the processing result to be given from each of these signal processing modules 50 to 55, the input semantics converter module 56 recognizes the self conditions and the surroundings, such as "detecting a ball," "fell down," "has been petted," "has been patted," "hearing musical scales of do-re-mi-fa," "detecting a moving object," or "detecting an obstacle," and any instruction and approach from the user, and outputs the recognition results to the application layer 41 (FIG. 2).

The application layer 41 is, as shown in FIG. 5, configured by five modules: a behavioral model library 70, an action switching module 71, a learning module 72, an emotion model 73 and an instinct model 74.

Figure 6:
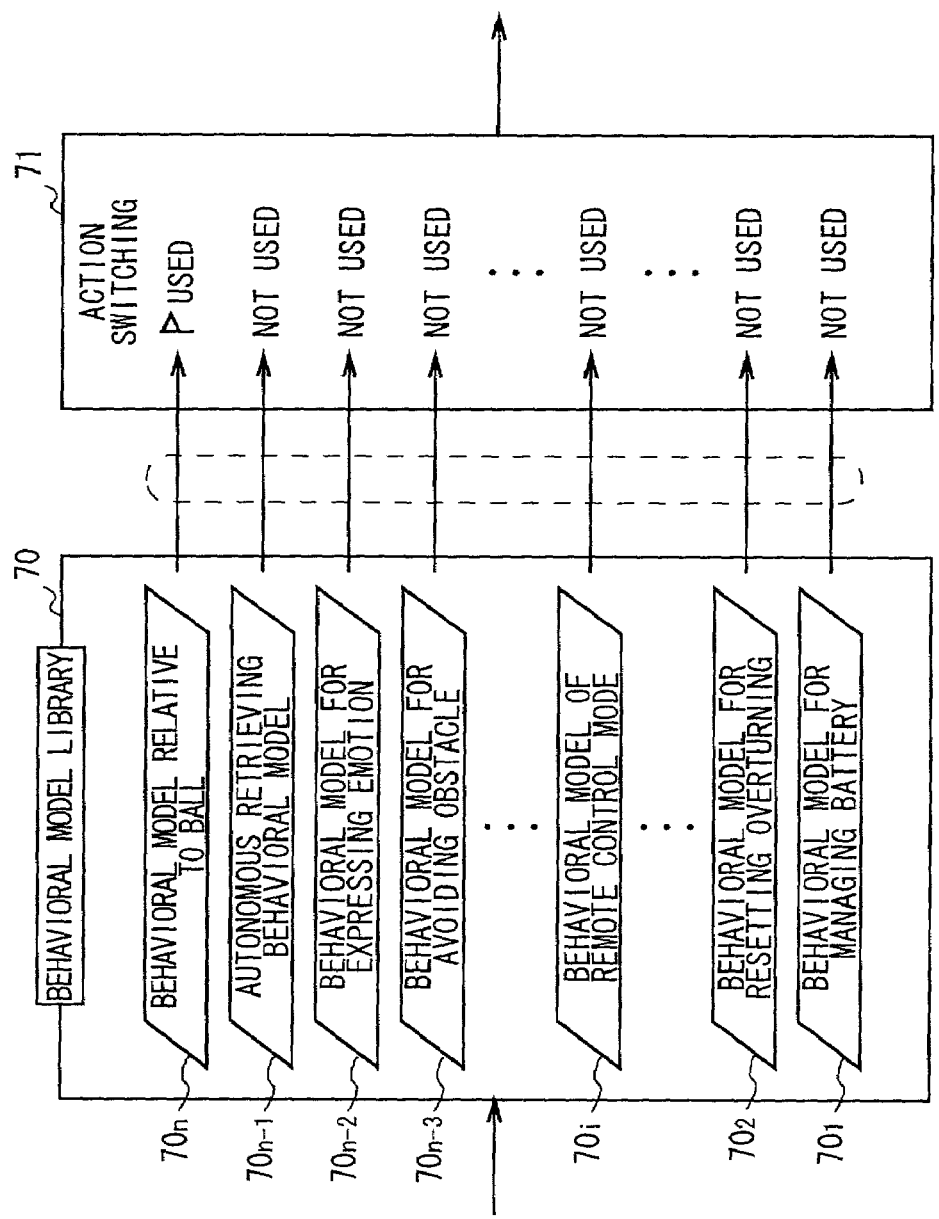
FIG. 6 is a conceptual view for explaining a behavioral model library.

In this case, the behavioral model library 70 is, as shown in FIG. 6, provided with respectively-independent behavioral models $70_1$ to $70_n$, by bringing each of them into correspondence with pre-selected several conditional items respectively, such as "when the battery residual amount has got low," "when standing up after falling down," "when dodging an obstacle," "when expressing an emotion," and "when detecting a ball."

When the recognition result is given from the input semantics converter module 56, or when a fixed time period has elapsed since the final recognition result was given, or the like, these behavioral models $70_1$ to $71_n$, determine a next action while referring to a parameter value of corresponding emotion held in the emotion model 73, and a parameter value of a corresponding desire held in the instinct model 74 as described later, as required, to output the determination result to the action switching module 71.

Figures 7, 12:
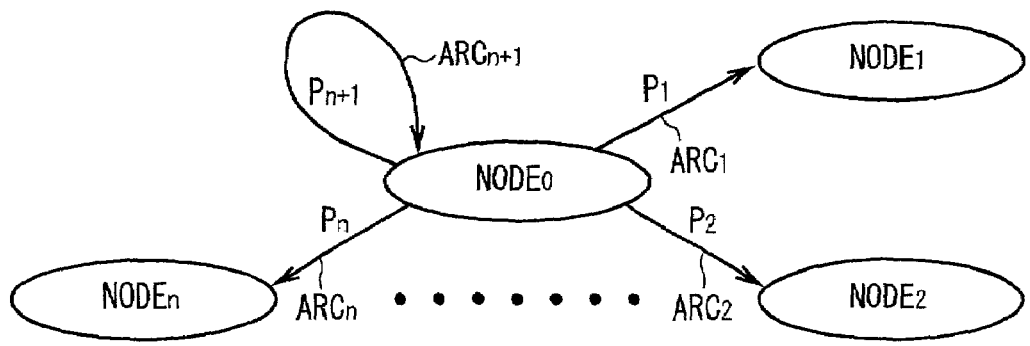
FIG. 7 is a schematic diagram showing probability automaton.
FIG. 12 is a conceptual view for explaining a difference file in the first embodiment.

In this respect, in the case of this embodiment, each behavioral model $70_1$ to $71_n$ on uses, as the technique of determining the next action, algorithm which is referred to as "probability automaton," to probably determine to which node $NODE_0$ to $NODE_n$ a transition is made from one node (state) $NODE_0$ to $NODE_n$ as shown in FIG. 7, on the basis of transition probabilities $P_1$ to $P_n$ which have been set respectively for arcs $ARC_1$ to $ARC_{n1}$ connecting the nodes $NODE_0$ to $NODE_n$.

Concretely, each behavioral model $70_1$ to $70_n$ has such a state transition table 80 for each of nodes $NODE_0$ to $NODE_n$ as shown in FIG. 8 by bringing each of them into correspondence with each of nodes $NODE_0$ to $NODE_n$ which form own behavioral models $70_0$ to $70_n$ respectively.

In this state transition table 80, with respect to the nodes $NODE_0$ to $NODE_n$, input events (recognition result), which are transition conditions, are enumerated in order of priority in a column of "Input Event Name," and the other transition conditions are described in the corresponding lines in columns of "Data Name" and "Data Range."

Accordingly, in a node $NODE_{100}$ represented on the state transition table 80 of FIG. 8, when recognition result "detecting a ball" has been given, the fact that the "SIZE" of the ball is within a range of "from 0 to 1000" to be given together with the recognition result, or when recognition result "detecting an obstacle" has been given, the fact that the "distance" to the obstacle to be given together with the recognition result is within a range of "from 0 to 100," is a condition required to make a transition to another node.

Also, in this node $NODE_{100}$, if any recognition result is not inputted, of parameter values of each emotion and each desire, which are held respectively by the emotion model 73 and the instinct model 74, to which the behavioral model $70_1$ to $70_n$ periodically refers, the parameter value of any of "JOY," "SURPRISE" and "SUDNESS," which are held by the emotion model 73, is within a range of "from 50 to 100," transition can be made to another node.

In the state transition table 80, in a row of "Transition Target Node" in a column of "Transition Probability to Another Node," names of nodes, to which a transition can be effected from the node $NODE_0$ to $NODE_n$, are enumerated, and when all conditions described in columns of "Input Event Name," "Data Name" and "Data Range" are met, transition probability of each of other nodes $NODE_0$ to $NODE_n$, to which the transition can be effected, is respectively described in a position corresponding thereto in the column of "Transition Probability to Another Node." Action to be outputted when transiting to the node $NODE_0$ to $NODE_n$ is described in a row of "Output Action" in the column of "Transition Probability to Another Node." In this respect, the sum of probability in each column in the column of "Transition Probability to Another Node" is 100[%].

Accordingly, in the node $NODE_{100}$ represented in the state transition table 80 of FIG. 8, when, for example, the recognition result that "detecting a ball" and the "SIZE" of the ball is within a range of "from 0 to 1000" has been given, it is possible to transit to "Node $NODE_{120}$ (node 120)" at a probability of "30[%]" and at the time, the action of "ACTION 1" is to be outputted.

Each behavioral model $70_1$ to $70_n$ is configured such that the nodes $NODE_0$ to $NODE_n$ described as such a state transition table 80 are connected in a great number, and when recognition result has been given from the input semantics converter module 56 among others, the next action is adapted to be determined by using probability through the use of the state transition table 80 for the corresponding nodes $NODE_0$ to $NODE_n$ to output the determination result to the action switching module 71.

Of action to be outputted respectively from each behavioral model $70_1$ to $70_n$ in the behavioral model library 70, the action switching module 71 selects action outputted from a predetermined higher-priority behavioral model $70_1$ to $70_n$, and transmits a command (hereinafter, referred to as "action command") to the effect that the action concerned should be taken to the output semantics converter 57 in the middleware layer 40. In this respect, in this embodiment, a behavioral model $70_1$ to $70_n$ shown on the lower side in FIG. 6 is set higher in priority level.

Also, the action switching module 71 notifies the learning module 72, the emotion model 73 and the instinct model 74 to the effect that the action has been completed on the basis of action-completed information to be given by the output semantics converter 57 after the action is completed.

On the other hand, of recognition results to be given by the input semantics converter 56, the learning module 72 inputs the recognition result of an instruction, received as approach from the user, such as "was patted" and "was petted."

On the basis of this recognition result and a notice from the action switching module 71, the learning module 72 changes transition probability, to which the behavioral model $70_1$ to $70_n$ corresponding thereto in the behavioral model library 70 corresponds in such a manner as to lower, when it "was patted (scolded)," the revelation probability of the action and to raise, when it "was petted (praised)," the revelation probability of the action.

On the other hand, concerning six emotions in total: "JOY," "SADNESS," "ANGER," "SURPRISE," "DISGUST" and "FEAR," the emotion model 73 holds parameters for expressing intensity of the emotion for each emotion. The emotion model 73 is adapted to successively update the parameter value for each of these emotions on the basis of specific recognition results of "has been patted," "has been stroked" or the like to be given by the input semantics converter module 56 respectively, elapsed time, a notice from the action switching module 71, or the like.

Concretely, on the basis of the recognition result from the input semantics converter 56 and a degree (predetermined) of work of the action of the pet robot 1 at the time on its emotion, the parameter value of each desire, which the instinct model 74 holds, and a degree (predetermined) of work of the action of the pet robot 1 at the time on its emotion, degrees of restraint and stimulus to be affected by other emotions, elapsed time or the like, the emotion model 73 uses the following equation in a predetermined period:

$$E[t+1]=E[t]+k_e \times \Delta E[t] \quad (1)$$

to calculate a parameter value E[t+1] of the emotion in the next period assuming an amount of fluctuation of the emotion to be calculated by a predetermined operation expression to be $\Delta E[t]$, the current parameter value for the emotion to be E[t], a coefficient for expressing a rate (hereinafter, referred to as "sensitivity") to change the emotion in accordance with the recognition result or the like to be $k_e$.

The emotion model 73 replaces this arithmetic result with the current parameter value E[t] of its emotion to thereby update the parameter value of the emotion. In this respect, it has been determined in advance the parameter value of which emotion should be updated in response to each recognition result and notices from the action switching module 71, and when a recognition result of, for example, "has been patted" is given, the parameter value for the emotion of "ANGER" rises, while when a recognition result of "has been stroked" is given, the parameter value for the emotion of "JOY" rises.

In contrast, the instinct model 74 holds, concerning four desires of "EXERCISE," "AFFECTION," "APPETITE" and "CURIOSITY," which are independent of one another, a parameter for representing intensity of the desire for each of these desires. The instinct model 74 is adapted to successively update these parameter values for the desires on the basis of recognition results to be given from the input semantics converter module 56, elapsed time, notices from the action switching module 71 or the like respectively.

Concretely, concerning the "EXERCISE," "AFFECTION," and "CURIOSITY," assuming an amount of fluctuation of the desire to be calculated by a predetermined operation expression on the basis of the action output, elapsed time, recognition result or the like of the pet robot 1 to be $\Delta I[k]$, the current parameter value of the desire to be I[k], and a coefficient for representing the sensitivity of the desire to be $k_i$, the instinct model 74 calculates the parameter value I[k+1] for the desire in the next period through the use of the following equation in a predetermined period:

$$I[k+]=I[k]+k_i \times \Delta I[k] \quad (2)$$

and replaces this arithmetic result with the current parameter value I[k] of the desire to thereby update the parameter value of the desire. In this respect, it has been determined in advance the parameter value of which desire should be changed in response to the action output, recognition result or the like, and if there has been a notice (notice to the effect that the action has been taken) from, for example, the action switching module 71, the parameter value for the "EXERCISE" will become lower.

As regards the "APPETITE," on the basis of the battery residual amount data to be given through the input semantics converter module 56, assuming the battery residual amount to be $B_L$, the instinct model 74 calculates the parameter value I[k] for the "APPETITE" through the use of the following equation:

$$I[k]=100-B_L \quad (3)$$

in a predetermined period, and replaces this arithmetic result with the current parameter value I[k] for the appetite to thereby update the parameter value for the "APPETITE" concerned.

In this respect, in this embodiment, the parameter values for each emotion and each desire are regulated so as to fluctuate within a range of 0 to 100 respectively, and values for the coefficients $k_e$ and $k_i$ are also individually set for each emotion and for each desire.

On the other hand, the output semantics converter module 57 of the middleware layer 40 gives, as shown in FIG. 4, such an abstract action command as "ADVANCE," "JOY," "YELP" or "TRACKING (Chase a ball)" to be given by the action switching module 71 of the application layer 41 as described above to the corresponding signal processing modules 58 to 64 of the output system 65.

When an action command is given, these signal processing modules 58 to 64 generate a servo command value to be given to a corresponding actuator $25_1$ to $25_n$ (FIG. 2) in order to take the action, audio data of sound to be outputted from a speaker 24 (FIG. 2) and/or driving data to be given to the LEDs serving as "Eyes," on the basis of the action command to successively transmit these data to the corresponding actuator $25_1$ to $25_n$, speaker 24 or LEDs through a virtual robot 33 of the robotic server object 32 and the signal processing circuit 14 (FIG. 2) successively.

As described above, this pet robot 1 is adapted to be able to autonomously act in response to conditions of the self and surroundings and any instruction and approach from the user in accordance with the control program.

(1-3) Growth Model of Pet Robot 1

Next, the description will be made of a growth function installed in this pet robot 1. This pet robot 1 has the growth function which continuously changes the action as if it "grew" in response to approach or the like from the user.

Figure 9:
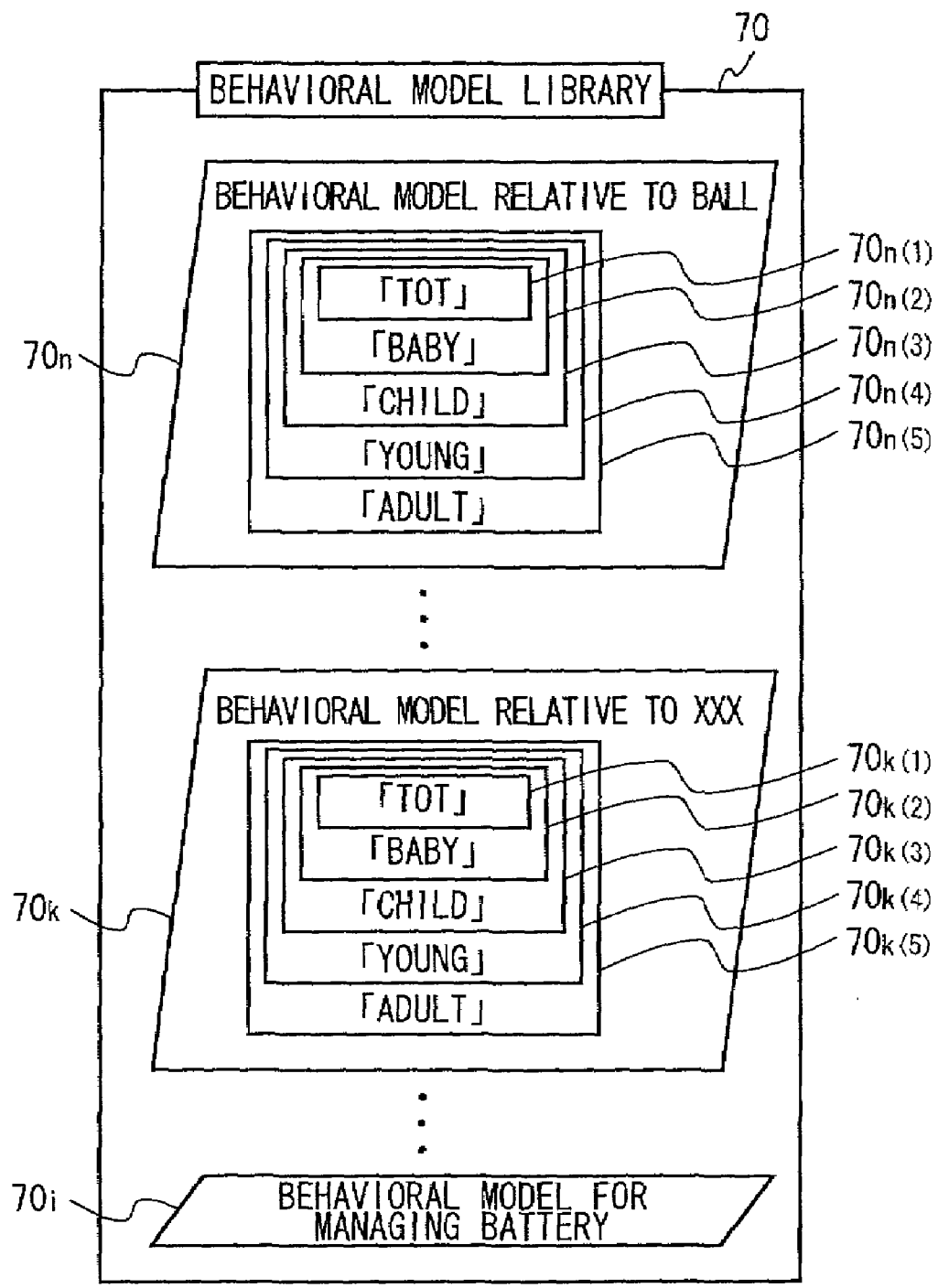
FIG. 9 is a conceptual view showing detailed configuration of the behavioral model library.

More specifically, this pet robot 1 is provided with five "growth stages" of "tweety," "baby period," "child period," "young period" and "adult period" as growth processes. The behavioral model library 70 (FIG. 5) in the application layer 41 is provided with behavioral models $70_{k(1)}$ to $70_{k(5)}$ which are brought into correspondence with the "tweety," "baby period," "child period," "young period" and "adult period" respectively as a behavioral model $70_k$ as shown in FIG. 9 concerning all conditional items (hereinafter, referred to as "growth-related conditional item") relating to "growth" such as the "Operation," "Action" or the like, of each conditional item such as the above described "when the battery residual amount is getting low." The behavioral model library 71 is adapted to determine the next action through the use of the behavioral model $70_{k(1)}$ of the "tweety period" in the initial stage concerning these growth-related conditional items.

In this case, each behavioral model $70_{k(1)}$ of the "tweety period" has a small number of nodes $NODE_0$ to $NODE_n$ (FIG. 7), and the contents of actions to be outputted from these behavioral models $70_{k(1)}$ are also actions or operations corresponding to the "tweety period" like "walking in pattern 1 (walking pattern for "tweety period")" or "making sounds in pattern 1 (bowwow pattern for "tweety period")."

Thus, this pet robot 1 acts, in the initial stage, so that it becomes as "simple" movement as simply "walk," "stand" and "lie down" concerning, for example, "operation," and so that it becomes "monotonous" by repeatedly performing the same action concerning "action" in accordance with each behavioral model $70_{k(1)}$ in the "tweety."

At this time, the learning module 72 (FIG. 5) in the application layer 41 holds parameters (hereinafter, referred to as "growth parameters") representing degrees of "growth" therein, and is adapted to successively update the value of growth parameter in accordance with the number of times, elapsed time or the like of approaches (instructions) such as "was petted" or "was patted" from the user on the basis of the recognition result, elapsed time information or the like to be given from the input semantics converter module 56.

The learning module 72 evaluates the value of this growth parameter every time the power to the pet robot 1 is turned on, and when the value exceeds a threshold which has been set in advance by bringing it into correspondence with the "baby period," notifies the behavioral model library 70 of this. When this notice is given, the behavioral model library 70 changes, concerning each growth-related conditional item described above, the behavioral models to be used respectively to the behavioral model $70_{k(2)}$ of the "BABY."

At this time, each behavioral model $70_{k(2)}$ in the "baby period" has a greater number of nodes $NODE_0$ to $NODE_n$ than the behavioral model $70_{k(1)}$ in the "tweety," and the contents of actions to be outputted from these behavioral models $70_{k(2)}$ are also higher in degree of difficulty and more complicated (in a growth level) than the actions in the "tweety."

Thus, this pet robot 1 acts, in accordance with these behavioral models $70_{k(2)}$ thereafter, so as to become "slightly higher and more complicated" movement by increasing the number of actions, for example, "operation," and so as to become action "at least with an objective" concerning the "action."

In the same manner as in the above described case thereafter, every time the value of the growth parameter exceeds each threshold set in advance by bringing it into correspondence with the "child period," "young period" and "adult period" respectively, further the learning module 74 notifies the behavioral model library 71 of this. Every time this notice is given, the behavioral model library 71 successively changes, concerning each growth-related conditional item described above, the behavioral models to be used respectively to the behavioral models $70_{k(3)}$ to $70_{k(5)}$ of the "child period," "young period" and "adult period."

At this time, each behavioral model $70_{k(3)}$ to $70_{k(5)}$ in the "child period," "young period" and "adult period" has a greater number of nodes $NODE_0$ to $NODE_n$ as the "growth stage" rises respectively, and the contents of actions to be outputted from these behavioral models $70_{k(3)}$ to $70_{k(5)}$ also become higher in degree of difficulty and level of complicatedness of the action as the "growth stage" rises.

As a result, this pet robot 1 successively stepwise changes the "operation" from "simple" toward "higher level and more complicated," and the "action" from "monotonous" toward "action with intention" as the "growth stage" rises (more specifically, changes from "tweety period" to "baby period," from "baby period" to "child period," from "child period" to "young period" and from young period" to "adult period").

As described above, this pet robot 1 is adapted to cause its action and operation to "grow" in five stages: "tweety," "baby period," "child period," "young period" and "adult period" in accordance with instructions to be given by the user and elapsed time.

Figure 10:
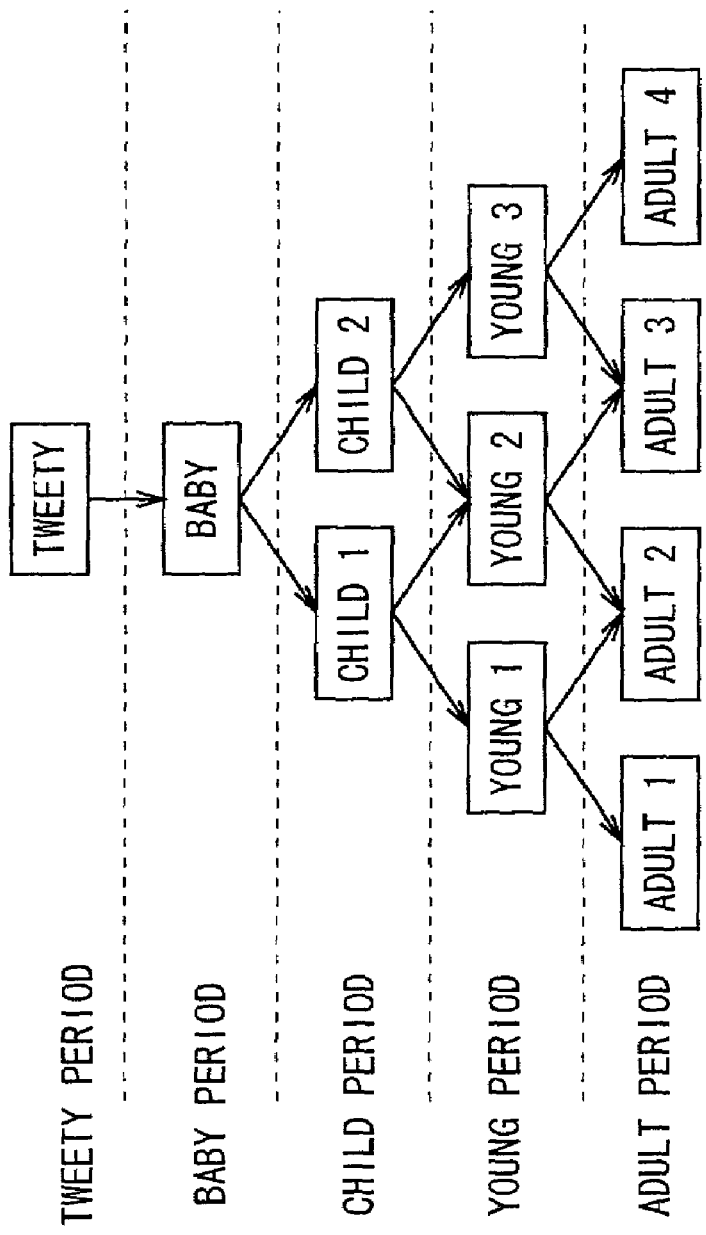
FIG. 10 is a conceptual view showing a growth model of the pet robot.

In this respect, in case of this embodiment, the growth model of the pet robot 1 is a model which branches off in and after the "child period" as shown in FIG. 10.

More specifically, in case of the pet robot 1, the behavioral model library 70 in the application layer 41 (FIG. 5) is provided with a plurality of behavioral models respectively as behavioral models $70_{k(3)}$ to $70_{k(5)}$ for the "child period,"
"young period" and "adult period" concerning each growth-related conditional item described above.

Actually, as the behavioral model $70_{k(3)}$ for, for example, the "child period" in each growth-related conditional item, there are prepared a behavioral model (CHILD 1) for causing the pet robot to perform action of a "fidgety" character having careless and quick movement, and a behavioral model (CHILD 2) for causing it to perform action of a "calm" character having smoother and slower movement than the CHILD 1.

Also, as the behavioral model $70_{k(4)}$ for the "young period," there are prepared a behavioral model (YOUNG 1) for causing it to perform action of a "rough" character having more careless and quicker movement than the "fidgety" character of the "child period," a behavioral model (YOUNG 2) for causing it to perform action and operation of an "ordinary" character having slower and smoother movement than the YOUNG 1, and a behavioral model (YOUNG 3) for causing it to perform action of "calm" character having slower operation and less amount of action than the YOUNG 2.

Further, as the behavioral model $70_{k(5)}$ for the "adult period," there are prepared a behavioral model (ADULT 1) for causing it to perform action of a very excitable "aggressive" character having more careless and quicker movement than the "rough" character of the "young period," a behavioral model (ADULT 2) for causing it to perform action of an excitable "fidgety" character having smoother and slower movement than the ADULT 1, a behavioral model (ADULT 3) for causing it to perform action of a "gentle" character having smoother and slower movement and a less amount of action than the ADULT 2, and a behavioral model (ADULT 4) for causing it to perform action of a "quiet" character having further slower movement and a less amount of action than the ADULT 3.

When notifying the behavioral model library 70 in order to raise the "growth stage" as described above, the learning module 72 (FIG. 5) in the application layer 41 designates the behavioral model (CHILD 1, CHILD 2, YOUNG 1 to YOUNG 3 and ADULT 1 to ADULT 4) of which "character" should be used as a behavioral model in the next "growth stage" in each growth-related conditional item on the basis of the number of times or the like of "was petted" and "was stroked," in and after the "child period," in the "growth stage" thereof.

As a result, the behavioral model library 70 changes, on the basis of this designation, the behavioral models $70_{k(3)}$ to $70_{k(5)}$ to be used in and after the "child period" concerning each growth-related conditional item to behavioral models (CHILD 1, CHILD 2, YOUNG 1 to YOUNG 3 and ADULT 1 to ADULT 4) of the designated "character" respectively.

In this case, in and after the "child period," when shifting to the next "growth stage," the "character" in the next "growth stage" is determined by the "character" in the present "growth stage," and therefore, a shift can be only made between the "characters" which are connected by arrows in FIG. 10. Therefore, when the behavioral model (CHILD 1) of the "fidgety" character is used in, for example, the "child period," the pet robot 1 cannot shift to the behavioral model (YOUNG 3) of the "calm" character in the "young period."

As described above, this pet robot 1 is adapted to change also its "character" along with the "growth" in response to approaches or the like from the user as if a genuine animal formed its character in accordance with how the owner raise or the like.

(1-4) Concrete Configuration of Behavioral Model $70_k$

Next, the description will be made of concrete configuration of the behavioral model $70_k$ (FIG. 9) of each growth-related conditional item described above.

In the case of this pet robot 1, the behavioral model $70_k$ of each growth-related conditional item has vast state space in which each of all the action patterns which the pet robot 1 is capable of revealing has been stored.

Of state space of these behavioral models $70_k$, with a state space portion, in which basic actions in this pet robot such as "walking," "lying down" and "standing" are generated, as a core, these behavioral models $70_k$ use only a limited portion including the core concerned in the "tweety," and thereafter, every time it "grows," permit transition to a state space portion to be newly increased (state space portion in which actions and a series of action patterns enabling to be newly revealed will be generated), and sever a state space portion which has been no longer used (state space portion in which actions and a series of action patterns which will not be caused to be revealed will be generated) to thereby generate behavioral models $70_{k(1)}$ to $70_{k(5)}$ in each "growth stage."

As a method of permitting the transition to the state space portion to be newly increased and for severing any unnecessary state space as described above, this pet robot 1 uses a method of changing the transition probability to the state space in response to the "growth."

Figure 11:
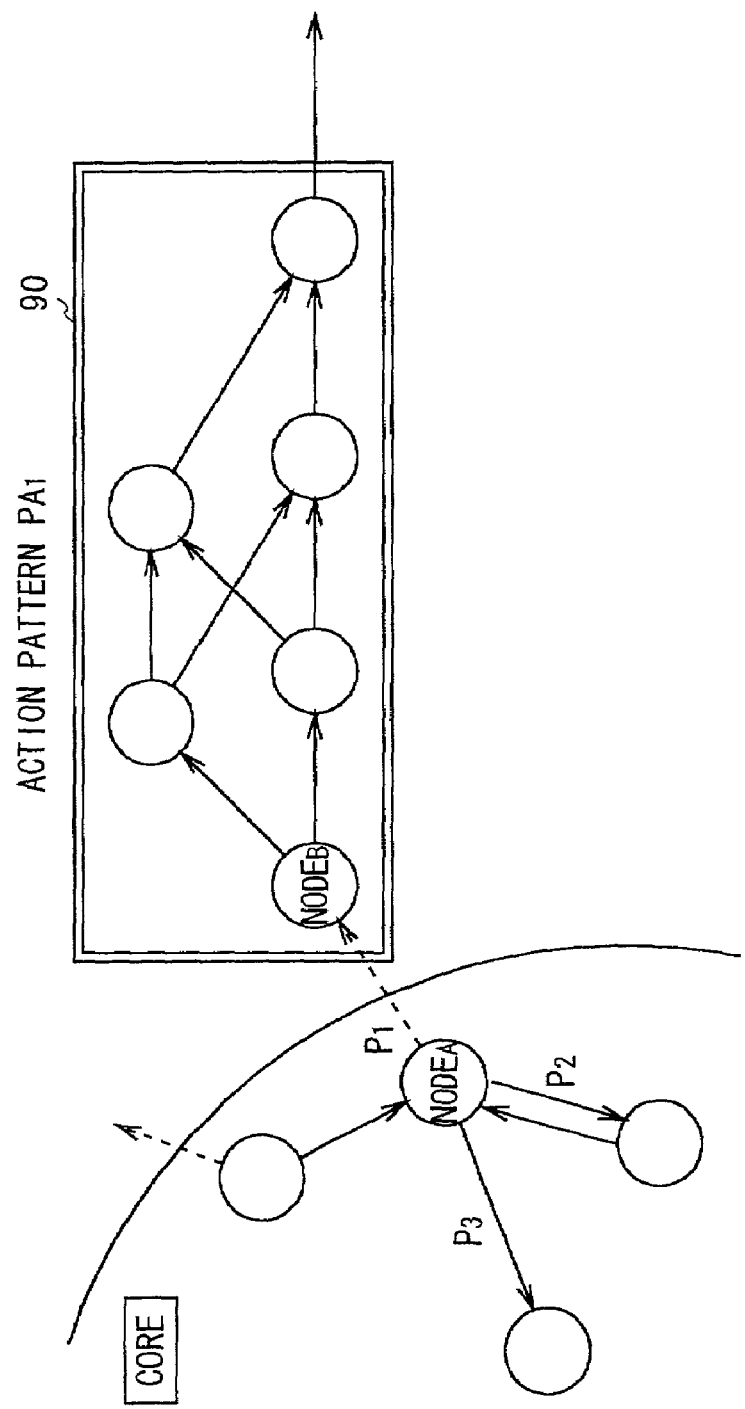
FIG. 11 is a conceptual view for explaining acquisition and forgetfulness of an action pattern along with growth.

For example, in FIG. 11, assuming that a transition condition from a node $NODE_A$ to a node $NODE_B$ is that "detecting a ball," and that a series of node groups 90 from the node $NODE_B$ is used to perform a series of action patterns to "approach the ball to kick it," when the ball has been found at the node $NODE_A$, an action pattern $PA_1$ to "chase the ball to kick it" can be revealed at transition probability $P_1$, but if the transition probability P1 is "0," such an action pattern $PA_1$ will never be revealed.

In this pet robot 1, in the case where such an action pattern $PA_1$ is caused to be revealed after a certain "growth stage" is reached, this transition probability $P_1$ is set to "0" in advance in the initial stage and this transition probability P1 is caused to be changed to a predetermined numerical value higher than "0" when the "growth stage" concerned is reached. Conversely, in the case where this action pattern $PA_1$ is caused to be forgotten when a certain "growth stage" is reached, the transition probability from the node $NODE_A$ to the node $NODE_B$ is caused to be changed to "0" when the "growth stage" is reached.

In this pet robot, as the concrete technique for updating the transition probability at a necessary point as described above, each behavioral model of the above described growth-related conditional item is provided with such files (hereinafter, referred to as difference files) 91A to 91D as shown in FIG. 12 by bringing it into correspondence with each "growth stage" of the "baby period," "child period," "young period" and "adult period" respectively.

In these difference files 91A to 91D, there are contained the node name (number) of a node (which corresponds to the node A in FIG. 11), at which the transition probability should be changed as described above, a place in the state transition table 80 (FIG. 8) of the node, at which the transition probability should be changed, and the transition probability at the place concerned after the change in order to reveal the new action as described above on rising to the "growth stage."

The behavioral model $70_k$ of each growth-related conditional item generates action in accordance with the behavioral model $70_{k(1)}$ for the "tweety period" in the initial stage, and when a notice to the effect that it has "grown" is given from the learning module 72 (FIG. 5) as described above thereafter, the transition probability at each of respectively designated places is changed to the numerical value designated concerning each node described in the difference files 91 to 91D concerned on the basis of the difference files 91 to 91D for the corresponding "growth stage."

For example, in the case of an example shown in FIGS. 8 and 12, when the pet robot has grown to the "baby period," in the behavioral model $70_k$ for each growth-related conditional item, the transition probability in the "first column" and the "first row" in the area (in FIG. 8, a portion which is below the "Output Action" row and on the right of the "Data Range" column) in the state transition table 80, in which the transition probability for the node $NODE_{100}$ has been described, will be changed to "20"[%], and the transition probability in the "first column" and the "n-th row" in the state transition table concerned will be changed to "30"[%], and so forth respectively. In addition, in the behavioral model $70_k$ for each growth-related conditional item, concerning other nodes $NODE_{320}$, $NODE_{720}$, . . . described in the difference file 91A for this "baby period," the corresponding transition probability will be similarly changed respectively.

In this case, among transition probability, whose numerical value will be changed in this manner, there are included transition probability, in which the transition probability until then has been "0" (that is, a transition to a node, which serves as the starting point of a series of action patterns, has been prohibited) and transition probability, in which the transition probability after the change becomes "0," (that is, a transition to a node, which serves as the starting point of a series of action patterns, is prohibited). However, the transition probability is changed from "0" to a predetermined numerical value in this manner, or the transition probability after the change becomes "0," whereby the series of action patterns may become revealed in a new "growth stage," or the series of action patterns may not be revealed.

In this respect, even when the necessary transition probability has been changed as described above, values for each transition probability in each difference file 91A to 91D are selected in such a manner that the sum of each transition probability to be included in the corresponding column in the state transition table 80 after the change amounts, to 100[%].

(1-5) Operation and Effect of This Embodiment

In the above described configuration, of vast state space in which all the action patterns have been stored, with a state space portion for performing basic action as a core, this pet robot 1 uses only a limited portion including the core concerned in the "tweety," and thereafter, every time it "grows," severs the state space portion which has been no longer used except for the core, and permits a transition to a state space portion which should be newly increased to thereby generate behavioral models $70_{k(1)}$ to $70_{k(n)}$ in each "growth stage," and to act in accordance with the behavioral models $70_{k(1)}$ to $70_{k(n)}$ concerned thus generated.

Therefore, this pet robot 1 is capable of reducing discontinuity in the output action before and after the "growth" to thereby express the "growth" more naturally because the state space of the behavioral models $70_{k(1)}$ to $70_{k(n)}$ in each "growth stage" continuously changes. In this pet robot 1, since the state space portion for generating basic actions is shared in all "growth stages," the learning result of the basic action can be successively carried forward to the next "growth stage."

Further, in this pet robot 1, since the state space portion for generating basic action is shared in all "growth stages" as described above, it is easy to prepare behavioral models $70_{k(1)}$ to $70_{k(n)}$ for each "growth stage," and it is also possible to curtail the amount of data for the entire behavioral models as compared with a case where individual behavioral models are prepared for each "growth stage" as in the conventional case.

Further, this pet robot 1 severs the unnecessary state space for a series of action patterns in accordance with the "growth" as described above, and permits a transition to necessary state space for a series of action patterns, to thereby generate behavioral models $70_{k(1)}$ to $70_{k(n)}$ in each "growth stage." Therefore, it is possible to divide each series of action patterns into parts, and to further facilitate an operation for generating the behavioral model $70_k$ of each growth-related conditional item by that much.

According to the above described configuration, of vast state space in which all the action patterns have been stored, with a state space portion for performing basic action as a core, this pet robot 1 uses only a limited portion including the core concerned in the "tweety," and thereafter, every time it "grows," severs the state space portion which has been no longer used except for the core, and permits a transition to a state space portion which should be newly increased to thereby generate the behavioral models $70_{k(1)}$ to $70_{k(n)}$ in each "growth stage," thereby it is possible to reduce discontinuity in the output action before and after the "growth" by continuously changing the state space for the behavioral models $70_{k(1)}$ to $70_{k(n)}$ in each "growth stage." Thus, the "growth" can be expressed more naturally, and it is possible to realize a pet robot capable of improving the entertainment characteristics.

(1-6) Other Embodiments

In this respect, in the above described first embodiment, the description has been made of the case where the present invention is applied to four-legged walking type pet robots 1 and 100, but the present invention is not limited thereto, but is widely applicable to robots of various embodiments in addition.

Also, in the above described first embodiment, the description has been made of the case where the state space of the behavioral model $70_{k(1)}$ to $70_{k(5)}$ of each "growth stage" is successively expanded along with the "growth," but the present invention is not limited thereto, but it may be possible to successively reduce the state space of the behavioral model $70_{k(1)}$ to $70_{k(5)}$ in each "growth stage" or to reduce the state space of the behavioral model $70_{k(1)}$ to $70_{k(5)}$ in any of the "growth stages" in the course of the expansion.

Further, in the above described first embodiment, the description has been made of the case where the pet robot 1 or 100 "grows" in five stages, but the present invention is not limited thereto, but it may be possible to cause the pet robot to "grow" at several stages other than five stages.

Further, in the above described first embodiment, the description has been made of the case where the memory means for storing a behavioral model (behavioral model including all action patterns which the pet robot 1 is capable of performing), and action generating means for generating action by the use of partial or full state space of the behavioral model concerned are configured by one behavioral model $70_k$ and the CPU 10, but the present invention is not limited thereto, but is widely applicable to various configurations in addition.

(2) Second Embodiment (2-1) Principle

Figure 13:
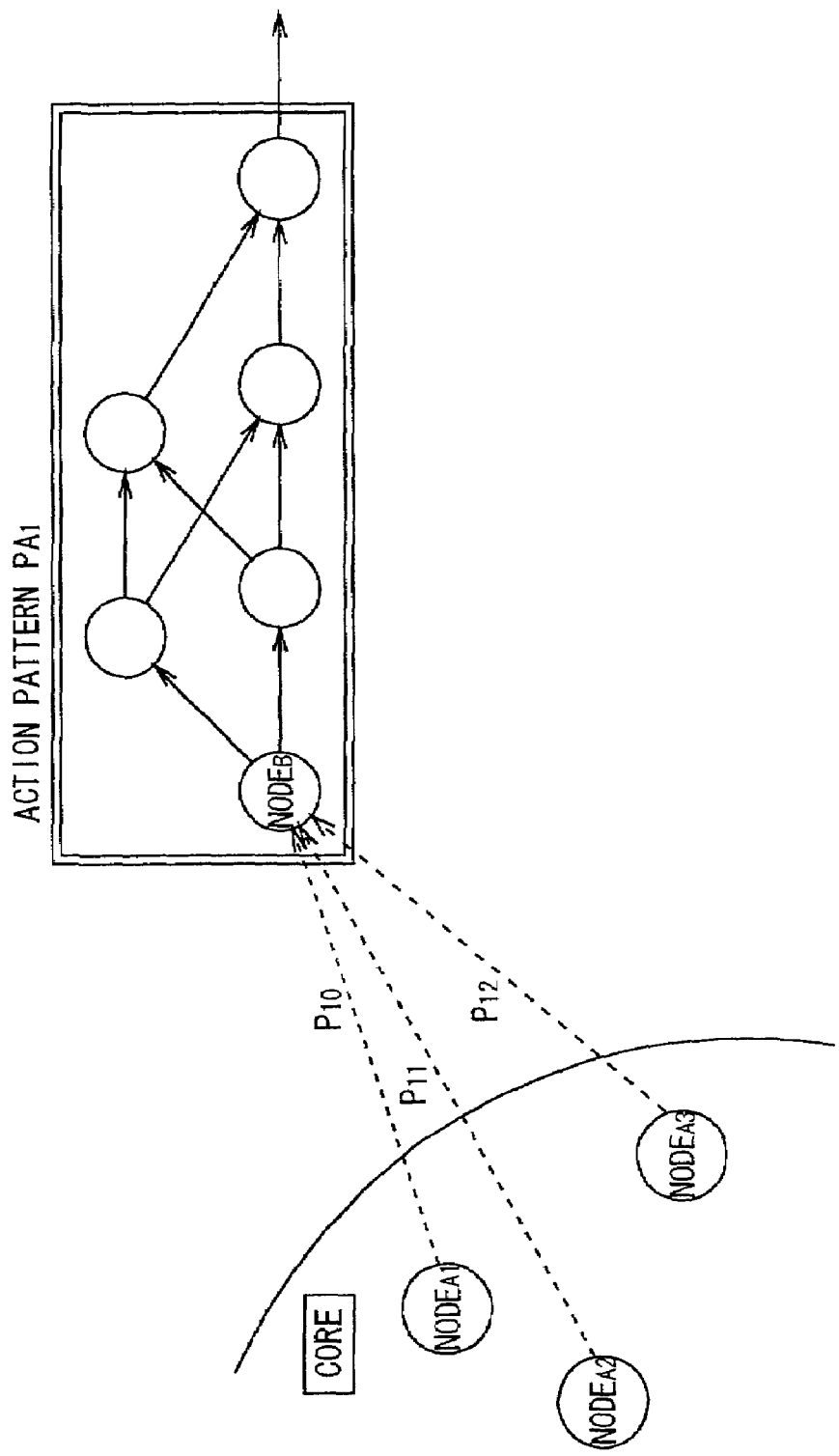
FIG. 13 is a conceptual view for explaining transition from a plurality of nodes to a starting point node of one action pattern.

When a transition to a series of action patterns $PA_1$ to be newly acquired by the "growth" is made only from a specific state (node $NODE_A$) as shown in FIG. 11, it is possible to control the revelation of the action pattern only by changing the transition probability $P_1$. When, however, this transition occurs from a plurality of states (nodes $NODE_{A1}$ to $NODE_{A3}$) as shown in FIG. 13, it is not easy to control all corresponding transition probability $P_{10}$ to $P_{12}$.

Figure 14:
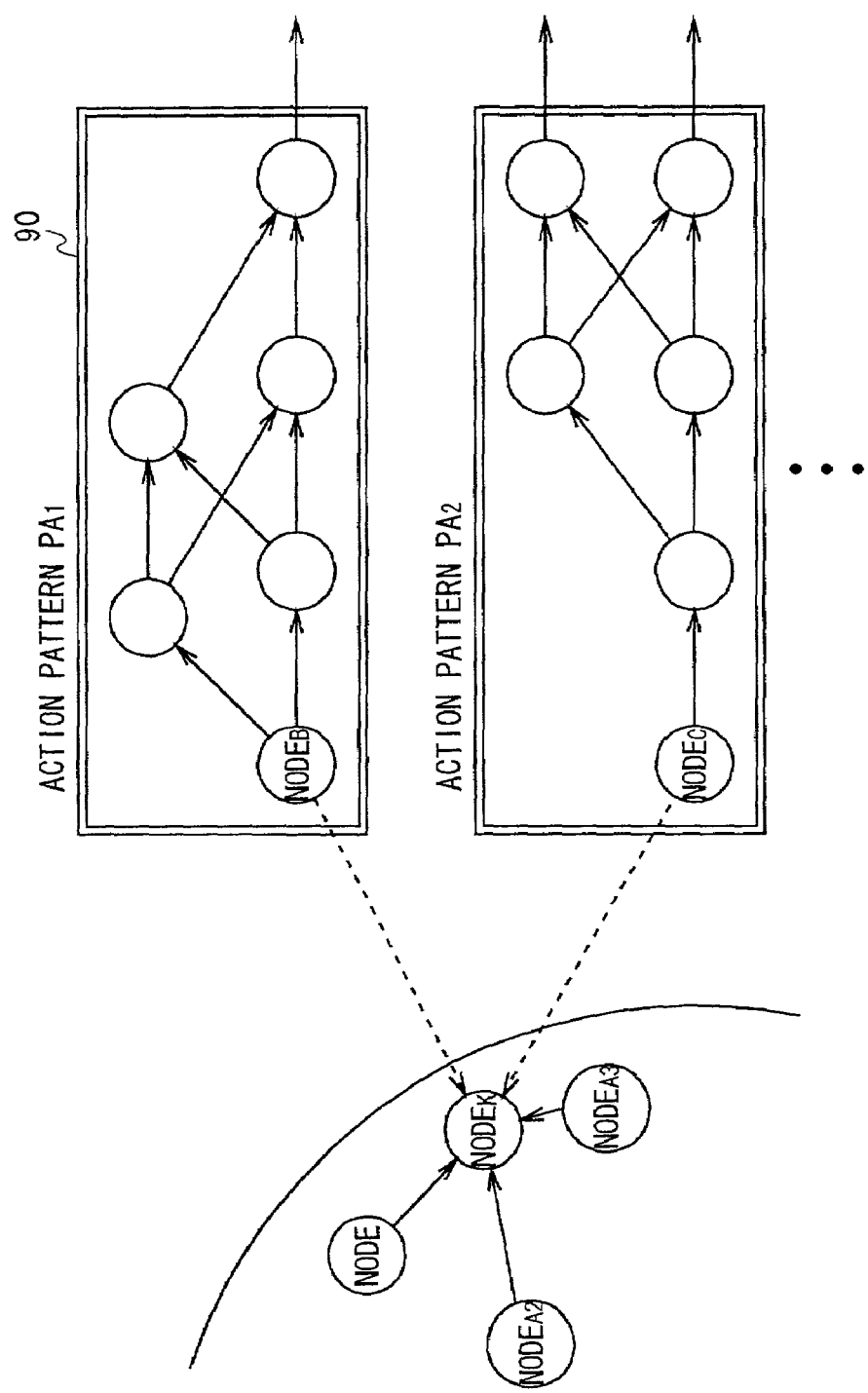
FIG. 14 is a conceptual view for explaining utilization of a virtual node.

In such a case, an imaginary node (hereinafter, referred to as virtual node) $NODE_K$ can be provided in the behavioral model as shown in FIG. 14, and transition from each node $NODE_{A1}$ to $NODE_{A3}$ to a node $NODE_B$, which serves as a starting point of a series of action patterns $PA_1$, can be replaced with transition to the virtual node $NODE_K$ in such a manner that the virtual node $NODE_K$ is brought into correspondence with the node $NODE_B$, which is the starting point of the above described series of action patterns $PA_1$.

Thus, it also becomes easy to control the transition probability, and even when this series of action patterns $PA_1$ is replaced with another series of action patterns $PA_2$ along with "growth," this can be easily performed only by changing correspondence of a real node to the virtual node $NODE_K$ from the node $NODE_B$ at the starting point of the previous action pattern $PA_1$ to a node $NODE_C$ at the starting point of the next action pattern $PA_2$.

(2-2) Configuration of Pet Robot 100 According to This Embodiment

Reference numeral 100 in FIG. 1 denotes a pet robot according to the second embodiment as a whole, and is configured in the same manner as a pet robot 1 according to the first embodiment with the exception that it is different in configuration of the behavioral model $70_k$ (FIG. 9) of each growth-related conditional item along with the "growth."

Figure 15:
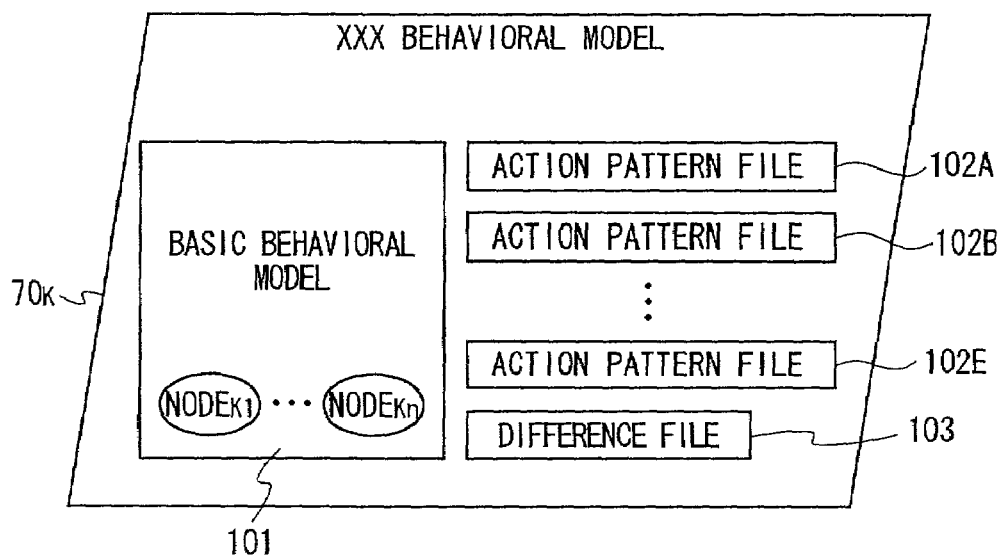
FIG. 15 is a conceptual view showing configuration of a behavioral model of each action-related conditional item in the second embodiment.

More specifically, in this pet robot 100, the behavioral model $70_k$ of each growth-related conditional item is, as shown in FIG. 15, provided with a behavioral model (hereinafter, referred to as basic behavioral model) 101 for generating basic action common to each "growth stage" such as "standing," "sitting down" and "walking" respectively, and within this basic behavioral model 101, there are provided several virtual nodes $NODE_{K1}$ to $NODE_{Kn}$.

Figure 16:
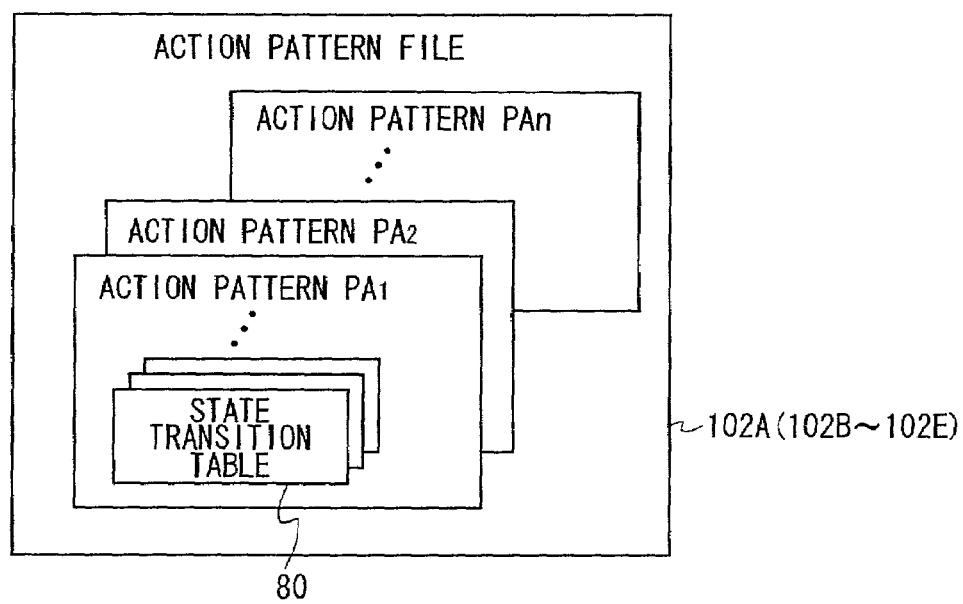
FIG. 16 is a conceptual view for explaining an action pattern file.

The behavioral model $70_k$ for each growth-related conditional item is provided with action pattern files 102A to 102E by bringing it into correspondence with each "growth stage" respectively. These action pattern files 102A to 102E are obtained by collecting, into files, as shown in FIG. 16 respectively, each virtual node $NODE_{K1}$ to $NODE_{Kn}$ within the basic behavioral model 101 in its "growth stage," and state transition tables for node groups for respectively generating each series of action patterns $PA_1$ to $PA_n$, which has been brought into correspondence respectively.

Figure 17:
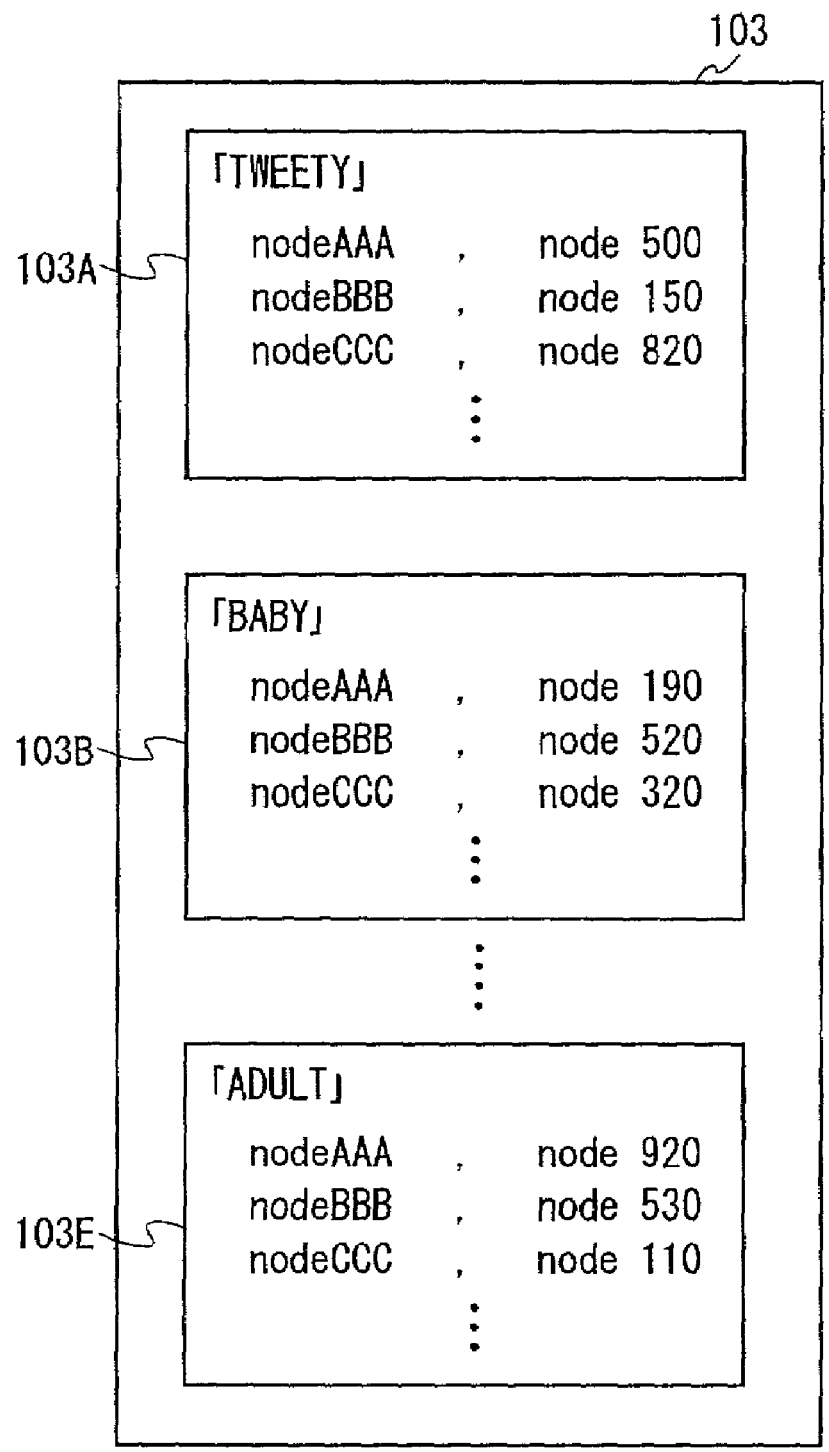
FIG. 17 is a conceptual view for explaining a difference file according to the second embodiment.

Further, the behavioral model $70_k$ for each growth-related conditional item is, as shown in FIG. 17, provided with files (hereinafter, referred to as difference file 103) which have summarized correspondence tables 103A to 103E representing correspondence relation between each virtual node $NODE_{K1}$ to $NODE_{Kn}$ in each "growth stage" and each real node (node at the starting point of any of action patterns $PA_1$ to $PA_n$ stored in the action pattern files 102A to 102E of the "growth stage," and so forth).

The behavioral model $70_k$ for each growth-related conditional item reads out, in the initial stage, the data of the action pattern file 102A for the "tweety period" to add the data to the basic behavioral model 101, and on the basis of the correspondence table 103A for the "tweety period" stored in the difference file 103, converts each virtual node $NODE_{K1}$ to $NODE_{Kn}$ within the basic behavioral model 101 to a real node to thereby generate the behavioral model $70_{k(1)}$ for the "tweety period" for generating action on the basis of the behavioral model $70_{k(1)}$ concerned.

Thereafter, when a notice to the effect that it has "grown" is given from the learning module 72 (FIG. 5), the behavioral model $70_k$ for each growth-related conditional item adds the data for the action pattern file 102B for the "baby period" to the basic behavioral model 101 in place of the data for the action pattern file 102A for the "tweety," and converts each virtual node $NODE_{K1}$ to $NODE_{Kn}$ within the basic behavioral model 101 to a real node on the basis of the correspondence table 103B for the "baby period" stored in the difference file 103 to thereby generate the behavioral model $70_{k(2)}$ for the "baby period," for generating action on the basis of the behavioral model $70_{k(2)}$ concerned.

Further similarly thereafter, every time a notice to the effect that it has "grown" is given from the learning module 72, the behavioral model $70_k$ for each growth-related conditional item successively changes the data for action pattern files 102A to 102E to be added to the basic behavioral model 101 to the data for the "child period," for the "young period" and for the "adult period," and converts each virtual node $NODE_{K1}$ to $NODE_{Kn}$ within the basic behavioral model 101 into a real node on the basis of the correspondence table 103C to 103E for the "growth stage" stored in the difference file 103 to thereby successively generate the behavioral models $70_{k(3)}$ to $70_{k(5)}$ for the "child period," "young period" and "adult period," for generating action on the basis of the behavioral model $70_{k(3)}$ to $70_{k(5)}$.

As described above, this pet robot 100 is adapted to change its action in response to the "growth" by successively changing the action patterns $PA_1$ to $PA_n$ to be brought into correspondence with each virtual node $NODE_{K1}$ to $NODE_{Kn}$ within the basic behavioral model 101 respectively along with the "growth."

(2-3) Operation and Effect of This Embodiment

In the above described configuration, this pet robot 100 changes its action in response to the "growth" by successively changing the action patterns $PA_1$ to $PA_n$ to be brought into correspondence with each virtual node $NODE_{K1}$ to $NODE_{Kn}$ within the basic behavioral model 101 respectively along with the "growth."

In this pet robot 100, therefore, since the basic behavioral model 101 for generating a basic behavioral model is shared in all the "growth stages," it is possible to provide consistency in action throughout all the "growth stages," and the learning result of the basic action can be successively carried forward to the next "growth stage."

In this pet robot 100, since the basic behavioral model 101 is shared in all the "growth stages" as described above, it is easy to prepare the behavioral model, and it is also possible to curtail the amount of data for the entire behavioral models as compared with a case where individual behavioral models are prepared for each "growth stage" as in the conventional case.

Further in this pet robot 100, it is possible to divide, into parts, each action patterns $PA_1$ to $PA_n$ to be brought into correspondence with each virtual node $NODE_{K1}$ to $NODE_{Kn}$ within the basic behavioral model 101 respectively, and to further facilitate an operation for generating the behavioral model $70_K$ of each growth-related conditional item by that much.

Further in this pet robot 100, since virtual nodes $NODE_{K1}$ to $NODE_{Kn}$ are utilized as described above in addition to similar operation effect to such operation effect to be obtained in the first embodiment, it can be made possible to easily generate the behavioral model $70_K$ for each growth-related conditional item even when shifts to a certain series of action patterns $PA_1$ may occur in nodes $NODE_{A1}$ to $NODE_{A3}$ here and there as shown in, for example, FIG. 13.

According to the above described configuration, the basic behavioral model 101 is provided with virtual nodes $NODE_{K1}$ to $NODE_{Kn}$ therein, each behavioral model $70_{k(1)}$ for the "tweety period" is generated in such a manner that (node at the starting point of) each series of action patterns $PA_1$ to $PA_n$ for the "tweety period" is brought into correspondence with each virtual node $NODE_{K1}$ to $NODE_{Kn}$ respectively, and thereafter, each behavioral model $70_{k(2)}$ to $70_{k(5)}$ for the "baby period," for the "child period," for the "young period" and for the "adult period" is generated in such a manner that each series of action patterns $PA_1$ to $PA_n$ to be brought into correspondence with each virtual node $NODE_{K1}$ to $NODE_{Kn}$ respectively is replaced with action patterns for the "baby period," for the "child period," for the "young period" and for the "adult period" along with the "growth." Therefore, it is possible to provide consistency in action throughout all the "growth stages." Thus, it is possible to express the "growth" more naturally, and to realize a pet robot capable of improving the entertainment characteristics.

(3) Other Embodiments

In this respect, in the above described second embodiment, the description has been made of the case where the present invention is applied to four-legged walking type pet robots 1 and 100, but the present invention is not limited thereto, but is widely applicable to robots of various embodiments in addition.

Also, in the above described second embodiment, the description has been made of the case where the state space of the behavioral model $70_{k(1)}$ to $70_{k(5)}$ of each "growth stage" is successively expanded along with the "growth," but the present invention is not limited thereto, but it may be possible to successively reduce the state space of the behavioral model $70_{k(1)}$ to $70_{k(5)}$ in each "growth stage" or to reduce the state space of the behavioral model $70_{k(1)}$ to $70_{k(5)}$ in any of the "growth stages" in the course of the expansion.

Further, in the above described second embodiment, the description has been made of the case where the pet robot 1 or 100 "grows" in five stages, but the present invention is not limited thereto, but it may be possible to cause the pet robot to "grow" at several stages other than five stages.

Further, in the above described second embodiment, the description has been made of the case where change means for changing a node group to be allocated to the virtual node $NODE_{K1}$ to $NODE_{Kn}$ is configured by one behavioral model $70_k$ and the CPU 10, but the present invention is not limited thereto, but is widely applicable to various configurations in addition.

(3) Third Embodiment

(3-1) Configuration of Pet Robot According to Third Embodiment

Figure 18:
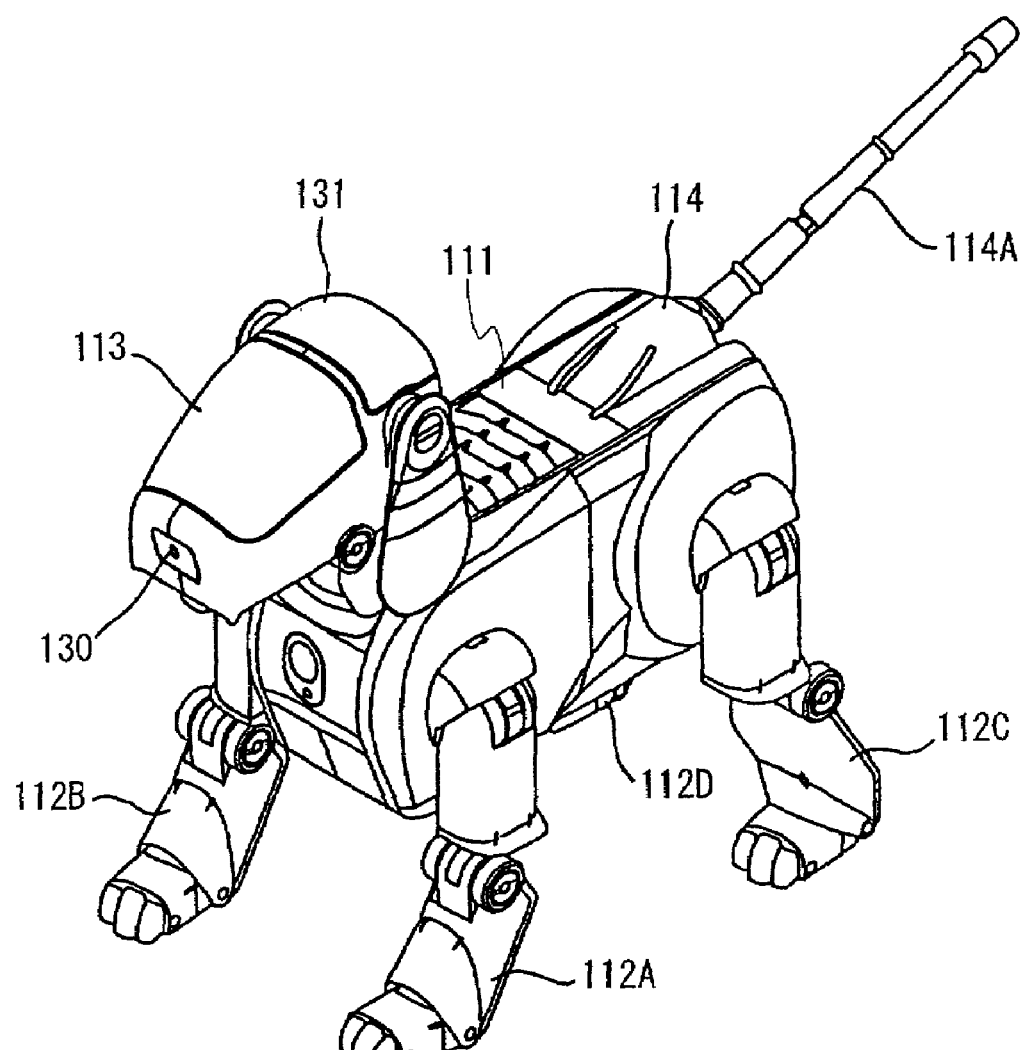
FIG. 18 is a perspective view showing the configuration of the external appearance of a pet robot according to a third and fourth embodiments.

In FIG. 18, reference numeral 110 generally denotes a pet robot according to a third embodiment. Leg units 112A to 112D are respectively connected to the front right, front left, rear right, and rear left parts of a body unit 111 and a head unit 113 and a tail unit 114 are respectively connected to the front end part and the rear end part of the body unit 111.

Figure 19:
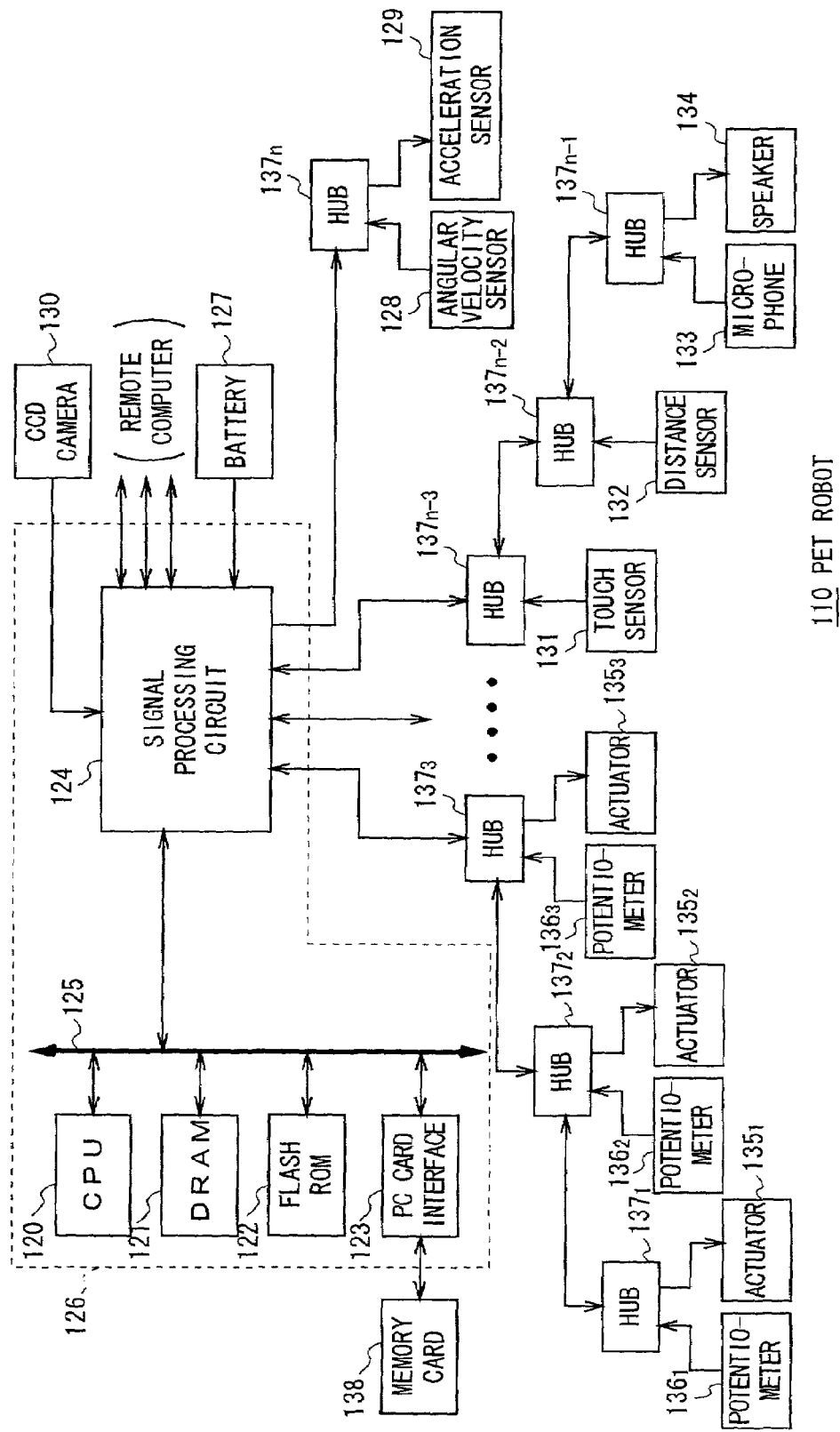
FIG. 19 is a block diagram showing the circuit configuration of the pet robot.

As shown in FIG. 19, in the body unit 111 a control unit 126, a CPU (Central Processing Unit) 120, a DRAM (Dynamic Random Access Memory) 121, a flash ROM (Read Only Memory) 122, a PC (Personal Computer) card interface circuit 123 and a signal processing circuit 124 are connected to each other with an internal bus 125 and a battery 127 serving as the power source of the pet robot 110 are contained. Further, an angular velocity sensor 128 and an acceleration sensor 129 for detecting the orientation or the acceleration of the movement of the pet robot 110 or the like are also accommodated in the body unit 111.

Further, disposed at predetermined positions in the head unit 113 are a CCD (Charge Coupled Device) camera 130 for picking up the image of an external condition, a touch sensor 131 for detecting applied pressure due to physical actions from a user such as "petting" or "patting", a distance sensor 132 for measuring a distance to a front object, a microphone 133 for collecting external sounds, a speaker 134 for outputting sounds such as bark and LEDs (Light Emitting Diode) (not shown) corresponding to the "eyes" of the pet robot 110.

Further, actuators $135_1$ to $135_n$ for the number of degrees of freedom and potentiometers $136_1$ to $136_n$ are respectively disposed in the joint parts of the leg units 112A to 112D, the connecting parts between the leg unit 112A to 112D and the body unit 111, the connecting part between the head unit 113 and the body unit 111 and the connecting part between the tail 114A of the tail unit 114 or the like.

Various kinds of sensors, the LED and the actuators $135_1$ to $135_n$ such as the angular velocity sensor 128, the acceleration sensor 129, the touch sensor 131, the distance sensor 132, the microphone 133, the speaker 134 and the potentiometers $136_1$ to $136_n$ are connected to the signal processing circuit 124 of the control unit 126 with corresponding hubs $27_1$ to $27_N$. The CCD camera 130 and the battery 127 are directly connected to the signal processing circuit 124.

At this time, the signal processing circuit 124 sequentially fetches sensor data, image data and audio data supplied from the above described sensors and sequentially stores them in prescribed positions in the DRAM 121 through an internal bus 125. Further, the signal processing circuit 124 sequentially fetches battery residual amount data indicating battery residual amount supplied from the battery 127 as well as them and stores it in a prescribed position in the DRAM 121.

The sensor data, the image data, the audio data and the battery residual amount data stored in the DRAM 121 in such a way are used when the CPU 120 controls the operation of the pet robot 110 after that.

In practice, during an initial time when the power source of the pet robot 110 is turned on, the CPU 120 reads out a control program stored in a memory card 138 inserted in the PC card slot (not shown) of the body unit 111 or in the flash ROM 122 directly or through the PC card interface circuit 123 and stores it in the DRAM 121.

Further, the CPU 120 then judges its own and circumferential states or whether or not there exist an instruction and an action from a user on the basis of the sensor data, the image data, the audio data and the battery residual amount data which are sequentially stored in the DRAM 121 from the signal processing circuit 124 as mentioned above.

Still further, the CPU 120 determines a subsequent conduct on the basis of the judged result and the control program stored in the DRAM 121 and drives desired actuators $135_1$ to $135_n$ on the basis of the determination result, so that the CPU 120 permits the pet robot to act, such as to move the head unit 113 upward and downward and rightward and leftward, to wag the tail 114A of the tail unit 114 and to drive the respective leg units 112A to 112D to walk.

At this time, the CPU 120 generates the audio data as required and supplies the audio data to the speaker 134 as an audio signal through the signal processing circuit 124 to output a voice based on the audio signal to an external part, and turn on or off or flickers the above described LEDs.

As described above, the pet robot 110 is designed to autonomously conduct in accordance with its own and circumferential states and the instruction and action from the user.

(3-2) Software Configuration of Control Program

Figure 20:
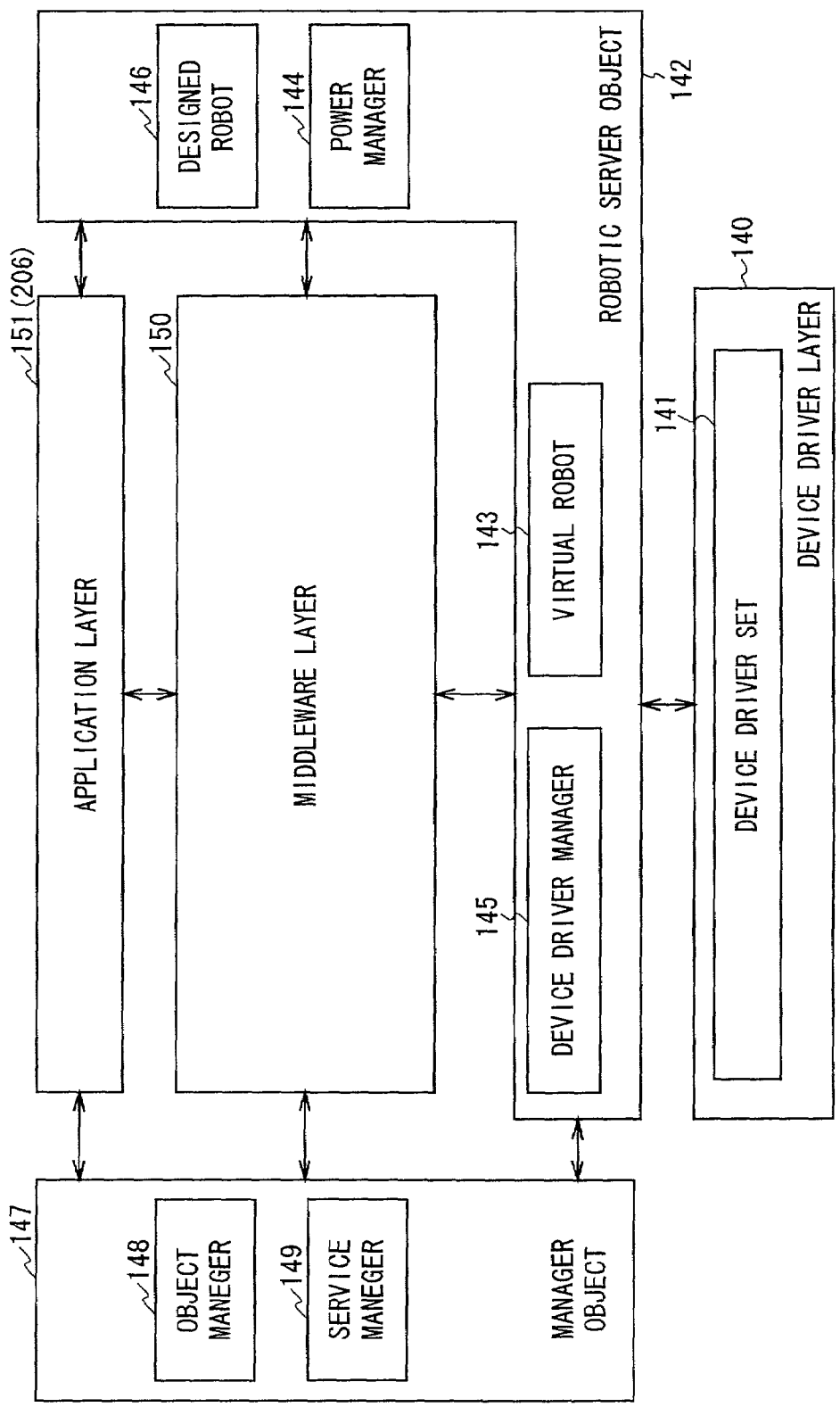
FIG. 20 is a conceptual view showing the software configuration of a control program.

The software configuration of the above described control program in the pet robot 110 is shown in FIG. 20. In FIG. 20, a device driver layer 140 is located in the lowermost layer of the control program and composed of a device driver set 141 having a plurality of device drivers. In this case, each device driver is an object which is allowed to directly access a hardware employed in an ordinary computer such as the CCD camera 130 (FIG. 19) or a timer and executes a processing by receiving an interruption from a corresponding hardware.

Further, a robotic server object 142 is located in a layer higher than the device driver layer 140. The robotic server object 142 comprises a virtual robot 143 composed of software groups for providing interfaces to have access to, for instance, the hardware such as the above described various types of sensors or the actuators $135_1$ to $135_n$, etc., a power manager 144 composed of software groups for managing the switching of the power source or the like, a device driver manager 145 composed of software groups for managing various kinds of other device drivers and a designed robot 146 composed of software groups for managing the mechanism of the pet robot 110.

A manager object 147 comprises an object manager 148 and a service manager 149. In this case, the object manager 148 comprises software groups for managing the start and end of each of software groups included in the robotic server object 142, a middleware layer 150 and an application layer 151. The service manager 149 comprises software groups for managing the connection of the objects on the basis of connection information between the objects written in a connection file stored in the memory card 138 (FIG. 19).

The middleware layer 150 is located in a layer higher than the robotic server object 142 and is composed of software groups for providing the basic functions of the pet robot 110 such as image processing or audio processing. The application layer 151 is located in a layer higher than the middleware layer 150 and is composed of software groups for determining the action of the pet robot 110 on the basis of the result processed by the software groups constituting the middleware layer 150.

Figure 21:
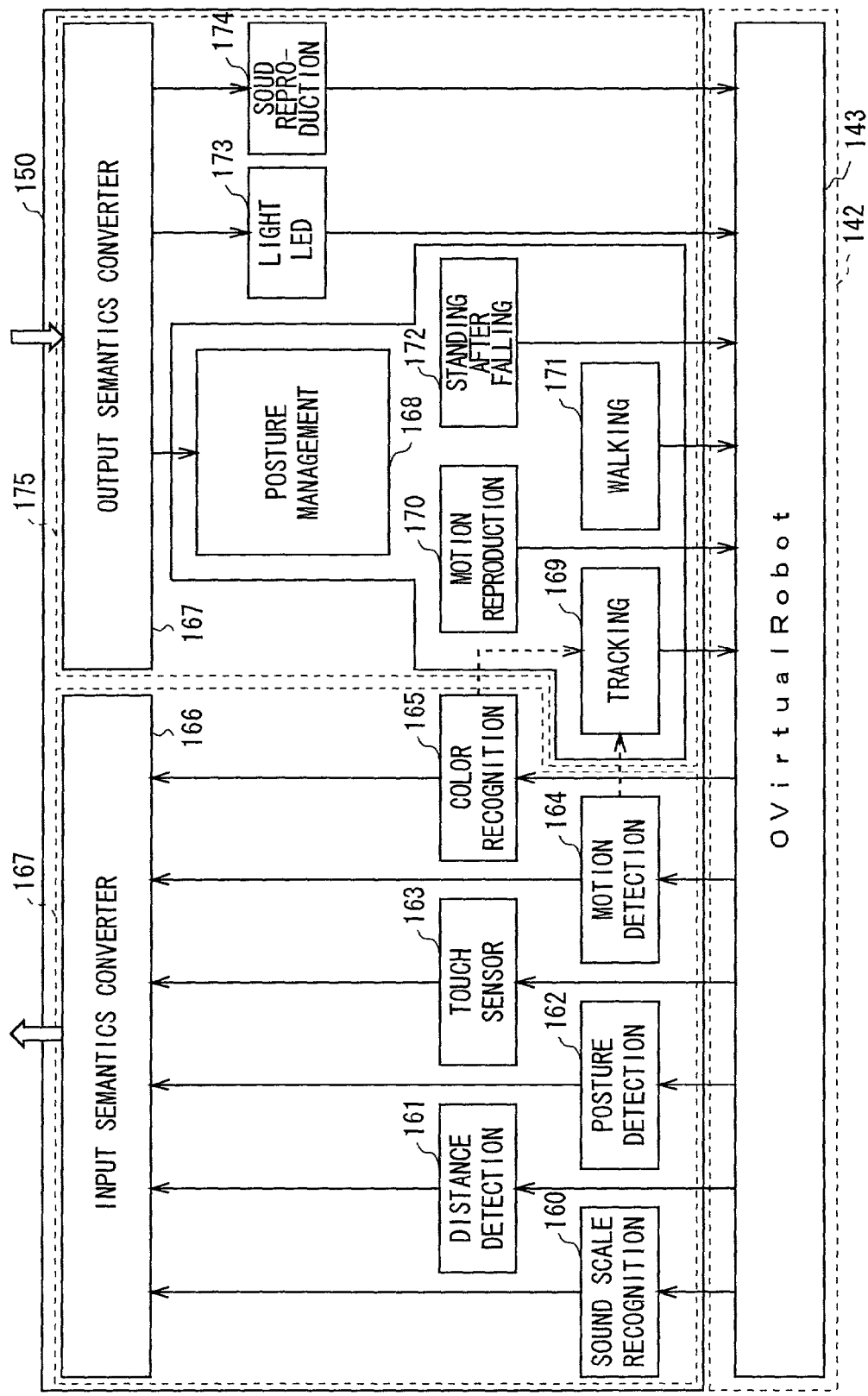
FIG. 21 is a conceptual view showing the software configuration of a middleware layer.
Figure 22:
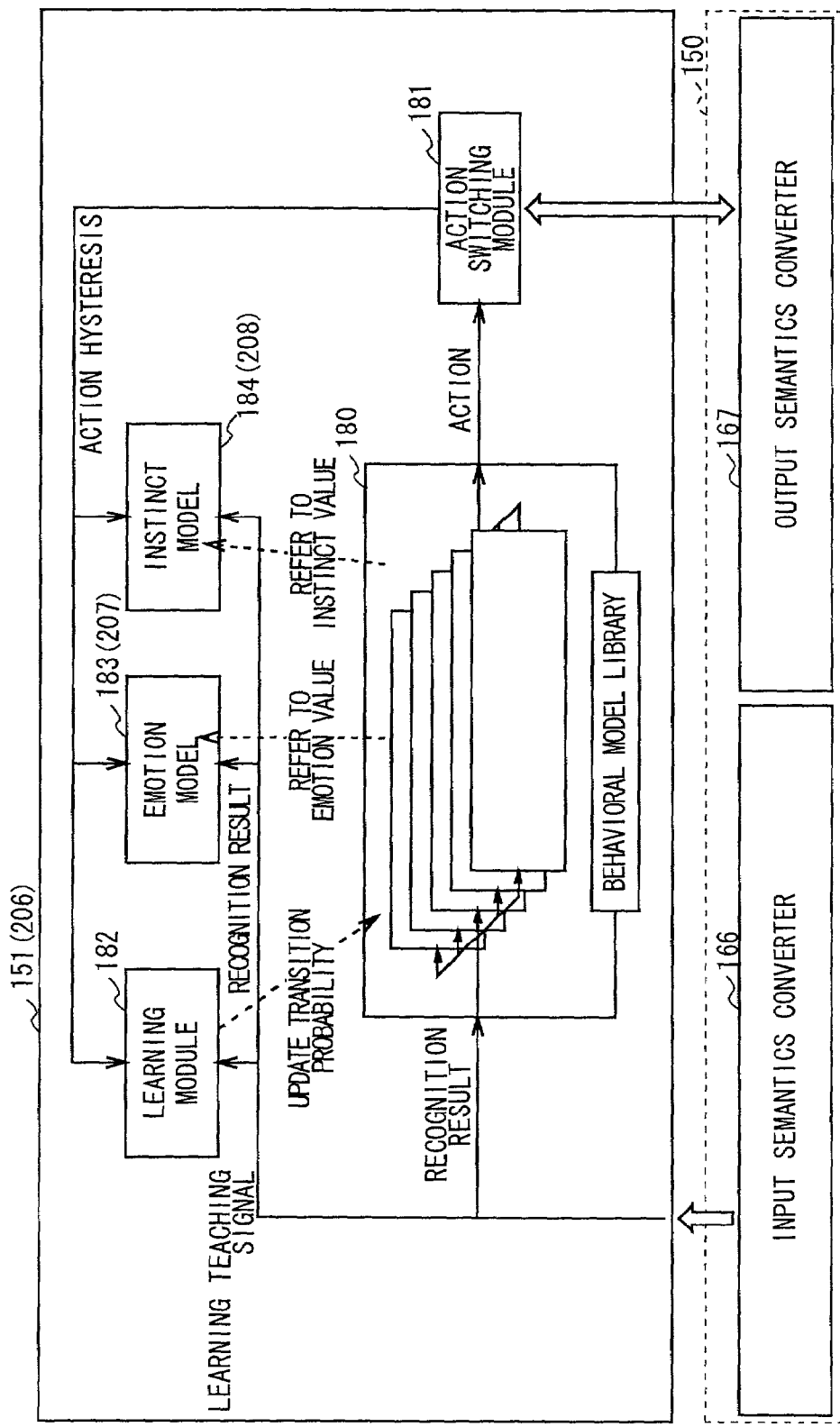
FIG. 22 is a conceptual view showing the software configuration of an application layer.

The specific software configurations of the middleware layer 150 and the application layer 151 are respectively shown in FIGS. 21 and 22.

As apparent from FIG. 21, the middleware layer 150 comprises a recognition system 167 including signal processing modules 160 to 165 for recognizing sound scales, for detecting a distance, for detecting a posture, for a touch sensor, for detecting a movement and for recognizing a color and an input semantics converter module 166 and an output system 175 including an output semantics converter module 167 and signal processing modules 168 to 174 for managing a posture, for tracking, for reproducing a motion, for walking, for standing up after falling down, for lighting the LEDs and reproducing sounds and the like.

In this case, the respective signal processing modules 160 to 165 of the recognition system 167 fetch the corresponding data from among the sensor data, the image data and the audio data read from the DRAM 121 (FIG. 19) by the virtual robot 143 of the robotic server object 142, execute prescribed processing on the basis of the fetched data and supply the processed results to the input semantics converter module 166.

The input semantics converter module 166 recognizes its own and circumferential states or the instructions and the actions from the user such as "detected a ball", "detected a falling-down", "was touched", "was patted", "heard the scales of do, mi, so", "detected a moving object" or "detected an obstacle", on the basis of the processed results supplied from the signal processing modules 160 to 165 and outputs the recognition results to the application layer 151 (FIG. 19).

As shown in FIG. 22, the application layer 151 comprises five modules including a behavioral model library 180, an action switching module 181, a learning module 182, an emotion model 183 and an instinct model 184.

Figure 23:
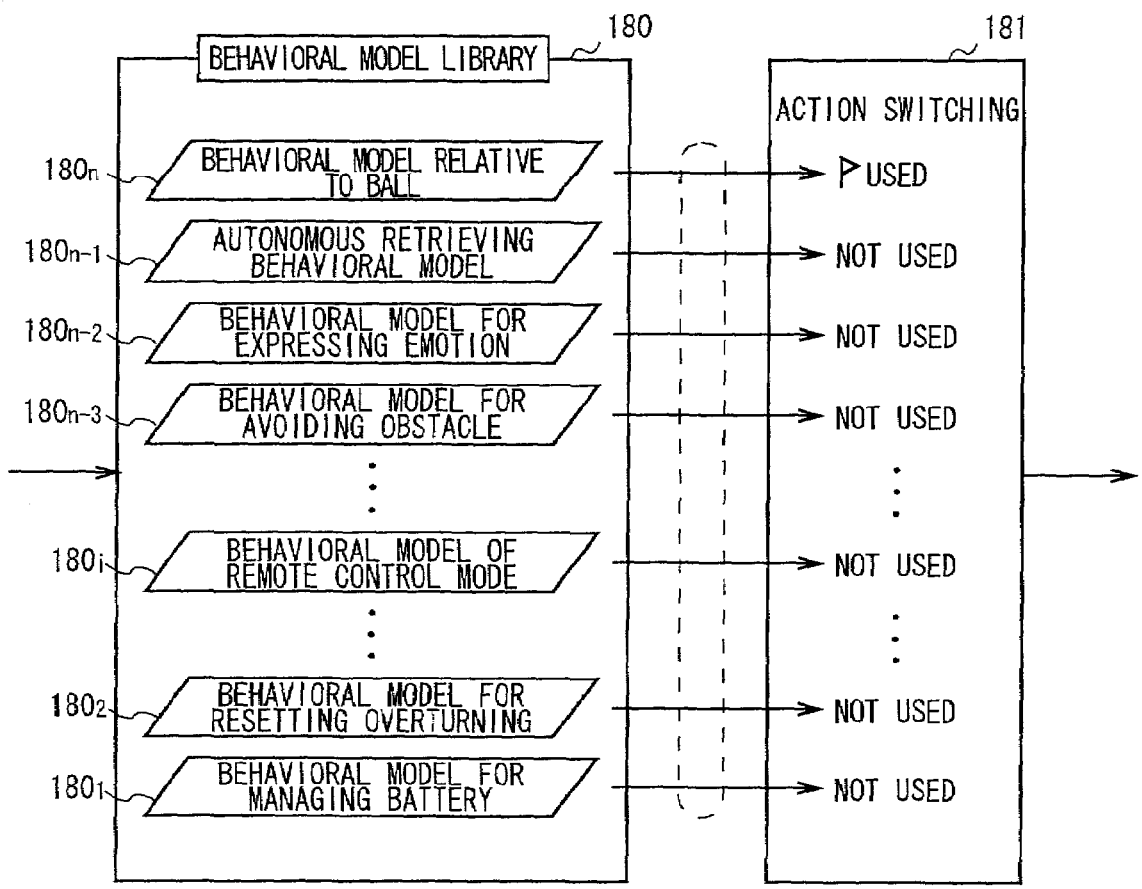
FIG. 23 is a conceptual view used for explaining a behavioral model library.

In this case, in the behavioral model library 180, as shown in FIG. 23, respectively independent behavioral models $180_1$ to $180_n$ are provided so as to correspond to previously selected several condition items such as "when a battery residual amount is getting low", "when standing up after falling-down ", "when avoiding an obstacle", "when expressing an emotion", "when detecting a ball" or the like.

Then, when the recognition results are respectively supplied from the input semantics converter module 166 or when a prescribed time passes after the last recognition result is supplied or the like, these behavioral models $180_1$ to $180_n$ respectively determine subsequent actions by referring to the parameter values of corresponding emotional behaviors held in the emotion model 183 or the parameter values of corresponding desires held in the instinct model 184 if necessary as mentioned later and output the determination results to the action switching module 181.

In this embodiment, the respective behavioral models $180_1$ to $180_n$ uses, as methods for determining subsequent actions, an algorithm called a probability automaton for probably determining to which node $NODE_0'$ to $NODE_n'$ the transition is made from one node (state) of $NODE_n'$ to $NODE_n'$, on the basis of a transition probability $P_1'$ to $P_n'$ respectively set to arcs $ARC_1$ to $ARC_{n1}$ for connecting the $NODE_0'$ to $NODE_n'$ together.

Specifically, each behavioral model $180_1$ to $180_n$ has a state transition table 190 as shown in FIG. 25 for each of these nodes $NODE_0'$ to $NODE_n'$, so as to correspond to each of the nodes $NODE_0'$ to $NODE_n'$ which respectively form their own behavioral models $180_1$ to $180_n$.

In this state transition table 190, input events (recognition results) which are regarded as transition conditions in the nodes $NODE_0'$ to $NODE_n'$ are listed in order of priority in the row of "input event name" and further conditions of the transition conditions are described in corresponding columns in the rows of "data name" and "range of data".

Thus, in the node $NODE_{100}'$ shown in the state transition table 190 in FIG. 25, in the case where the recognition result of "detected a ball" is obtained, the "size (SIZE)" of the ball which is given together with the recognition result needs to be located within a range of "0 to 1000", as a condition to shift to other node, or in the case where the recognition result of "detected an obstacle (OBSTACLE)" is obtained, a "distance (DISTANCE)" to the obstacle which is given together with the recognition result needs to be located within a range of "0 to 100", as a condition to shift to other node.

Further, in the node $NODE_{100}'$, even in the case where there is no input of recognition result, the node can shift to another node when the parameter value of any one of "joy (JOY)", "surprise (SURPRISE)" or "sadness (SADNESS)" of the parameter values of respective emotional behaviors and respective desires held in the emotion model 183 and the instinct model 184 to which the behavioral models $180_1$ to $180_n$ periodically refer is within a range of "50 to 100".

Further, in the state transition table 190, the names of nodes which can shift from the nodes $NODE_0'$ to $NODE_n'$ are enumerated in the row of "transition destination node" in the column of "transition probability to other nodes". Further, the transition probability to each of other nodes $NODE_n'$ to $NODE_n'$ to which the node can shift when all conditions described in the rows of "input event name", "data name" and "range of data" are completed, is respectively described in a corresponding position in the column of "transition probability to other nodes". Actions to be outputted upon shift to the nodes $NODE_0$ to $NODE_n$ are described in the row of "output action" in the column of "transition probability to other nodes". In this connection, the sum of the probability in respective rows in the column of "transition probability to another nodes" is 100[%].

Therefore, in the node $NODE_{100}'$ seen in the state transition table 190 shown in FIG. 25, for instance, in the case where the recognition result of "detected a ball (BALL)" in which the "SIZE (size)" of the ball is located within a range of "0 to 1000" is given, the node $NODE_{100}'$ can shift to a "node $NODE_{120}'$" with the probability of "30[%]" and the action of "ACTION 1" is outputted at that time.

The behavioral models $180_1$ to $180_n$ are configured so that the nodes $NODE_0'$ to $NODE_n'$ respectively described in such a state transition table 190 are linked together. When recognition results are supplied thereto from the input semantics converter module 166, the action modules $180_1$ to $180_n$ stochastically determine next actions by using the state transition table 190 of the corresponding nodes $NODE_0'$ to $NODE_n'$ and output the determination results to the action switching module 181.

The action switching module 181 selects the action outputted from the behavioral models $180_1$ to $180_n$ high in predetermined priority from among the actions outputted from the behavioral models $180_1$ to $180_n$ of the behavioral model library 180 and transmits a command for executing the action (called it an action command, hereinafter) to the output semantics converter 167 of the middleware layer 150. In the present embodiment, the behavioral models $180_1$ to $180_n$ described in the lower side in FIG. 23 are set to be higher in priority.

The action switching module 181 informs the learning module 182, the emotion model 183 and the instinct model 184 of the completion of the action on the basis of action completion information supplied from the output semantics converter 167 after the completion of the action.

On the other hand, the learning module 182 inputs the recognition results of teaching received as actions from the user such as "hit" or "patted" of the recognition results supplied form the input semantics converter 56.

Then, the learning module 182 changes the corresponding transition probability to the behavioral models $180_1$ to $180_n$ so as to lower the appearance probability of an action upon "hit (scolded)", and raise the appearance probability of an action upon "patted (praised)" on the basis of the recognition result and information from the action switching module 181.

The emotion model 183 holds a parameter indicating the intensity of an emotional behavior for each emotional behavior of the total of six emotional behaviors including "joy", "sadness", "anger", "surprise", "disgust" and "fear". The emotion module 183 is adapted to sequentially update the parameter values of these emotional behaviors on the basis of the specific recognition results such as "hit" and "patted", etc. respectively supplied from the input semantics converter module 166, the lapse of time and information from the action switching module 181 or the like.

Specifically, the emotion model 183 calculates the parameter value E[t+1] of an emotional behavior during a next cycle by using a following equation (4) for a prescribed cycle, assuming that the quantity of fluctuation of an emotional behavior calculated by a prescribed operation expression on the basis of the recognition result from the input semantics converter 56 and a degree (preset) of the action of the pet robot 110 at that time which acts on the emotional behavior, the parameter value of each desire-held by the instinct model 184 and the degree (preset) of the action of the pet robot 110 at that time which acts on the emotional behavior, a degree of suppression and stimulation receiving from other emotional behavior, the lapse of time or the like is $\Delta E[t]'$, the present parameter value of the emotional behavior is $E[t]'$, and a coefficient expressing a rate (called it a sensitivity, hereinafter) of changing the emotional behavior depending on the recognition result, etc. is $k_e'$.

$$E\ [t+1]'=E\ [t]'+k_e'\times\Delta E\ [t]' \qquad (4)$$

Then, the emotion model 183 replaces the calculated result by the present parameter value $E[t]'$ of the emotional behavior to update the parameter value of the emotional behavior. It is previously determined to update which emotional behavior of all emotional behaviors in respect of its parameter value relative to each of the recognition results and the information from the action switching module 181. For instance, in the case where the recognition result of "hit" is supplied, the parameter value of the emotional behavior of "anger" is raised. In the case where the recognition result of "patted" is supplied, the parameter value of the emotional behavior of "joy" is increased.

As compared therewith, the instinct model 184 holds a parameter indicating the intensity of a desire for each desire of mutually independent four desires including an "exercise desire", an "affection desire", an "appetite desire" and a "curiosity desire". Then, the instinct model 184 is adapted to sequentially update the parameter values of these desires respectively on the basis of the recognition results supplied from the input semantics converter module 166, the lapse of time and the notification from the action switching module 181 or the like.

Specifically, the instinct model 184 calculates the parameter value $I[k+1]'$ of a desire during a next cycle by using a following equation for a prescribed cycle, assuming that the quantity of fluctuation of the desire calculated by a prescribed operation expression on the basis of the action output of the pet robot 110, the lapse of time and the recognition results, etc. is $\Delta I[k]'$ in respect of the "exercise desire", the "affection desire" and the "curiosity", the present parameter value of the desire is $I[k]'$, and a coefficient indicating the sensitivity of the desire is $k_1'$.

$$I\ [K+]'=I\ [k]'+k_i'\times\Delta I\ [k]' \qquad (5)$$

The calculated result is replaced by the present parameter value $I[k]'$ to update the parameter value of the desire. It is previously determined which desire is changed in respect of its parameter value relative to the action output or the recognition results, etc. For instance, when there is a notification (information of an action) sent from the action switching module 181, the parameter value of the "exercise desire" decreases.

Further, as for the "appetite desire", the instinct model 184 calculates the parameter value $I[k]'$ of the "appetite desire" in accordance with a following equation for a prescribed cycle, assuming that a battery residual amount is $B_L'$ on the basis of the battery residual amount data supplied through the input semantics converter module 166.

$$I\ [k]'=100-B_L' \qquad (6)$$

The calculated result is replaced by the present parameter value $I[k]'$ of the appetite desire to update the parameter value of the "appetite desire".

In the present embodiment, the parameter values of the emotional behaviors and desires are regulated so as to respectively vary within a range of 0 to 100. Further, the values of coefficients $k_e'$ and $k_i'$ are individually set for each emotional behavior and for each desire.

The output semantics converter module 167 of the middleware layer 150 supplies abstract action commands such as "advancement", "joy", "cry" or "tracking (chase a ball)" supplied from the action switching module 181 of the application layer 151 as mentioned above to the corresponding signal processing modules 168 to 174 of the output system 175, as shown in FIG. 21.

Then, when the action commands are supplied to the signal processing modules 168 to 174, these signal processing modules 168 to 174 generate servo command values to be supplied to the actuators $135_1$ to $135_n$ (FIG. 19) for carrying out the actions, the audio data of sound outputted from the speaker 134 (FIG. 19) or driving data supplied to the LED of the "eye" on the basis of the action commands and sequentially transmit these data to the corresponding actuators $135_1$ to $135_n$, the speaker 134 or the LEDs through the virtual robot 143 of the robotic server object 142 and the signal processing circuit 124 (FIG. 19).

In such a way, the pet robot 110 is designed to carry out the autonomous actions in accordance with its own and circumferential states and the instructions and the actions from the user on the basis of a control program.

(3-3) Growth Model of Pet Robot (3-3-1) Growth of Action

Now, a growth function mounted on the pet robot 110 will be described below. In the pet robot 110, is mounted the growth function for changing its action in accordance with the actions from the user as if a real animal grew.

Figure 26:
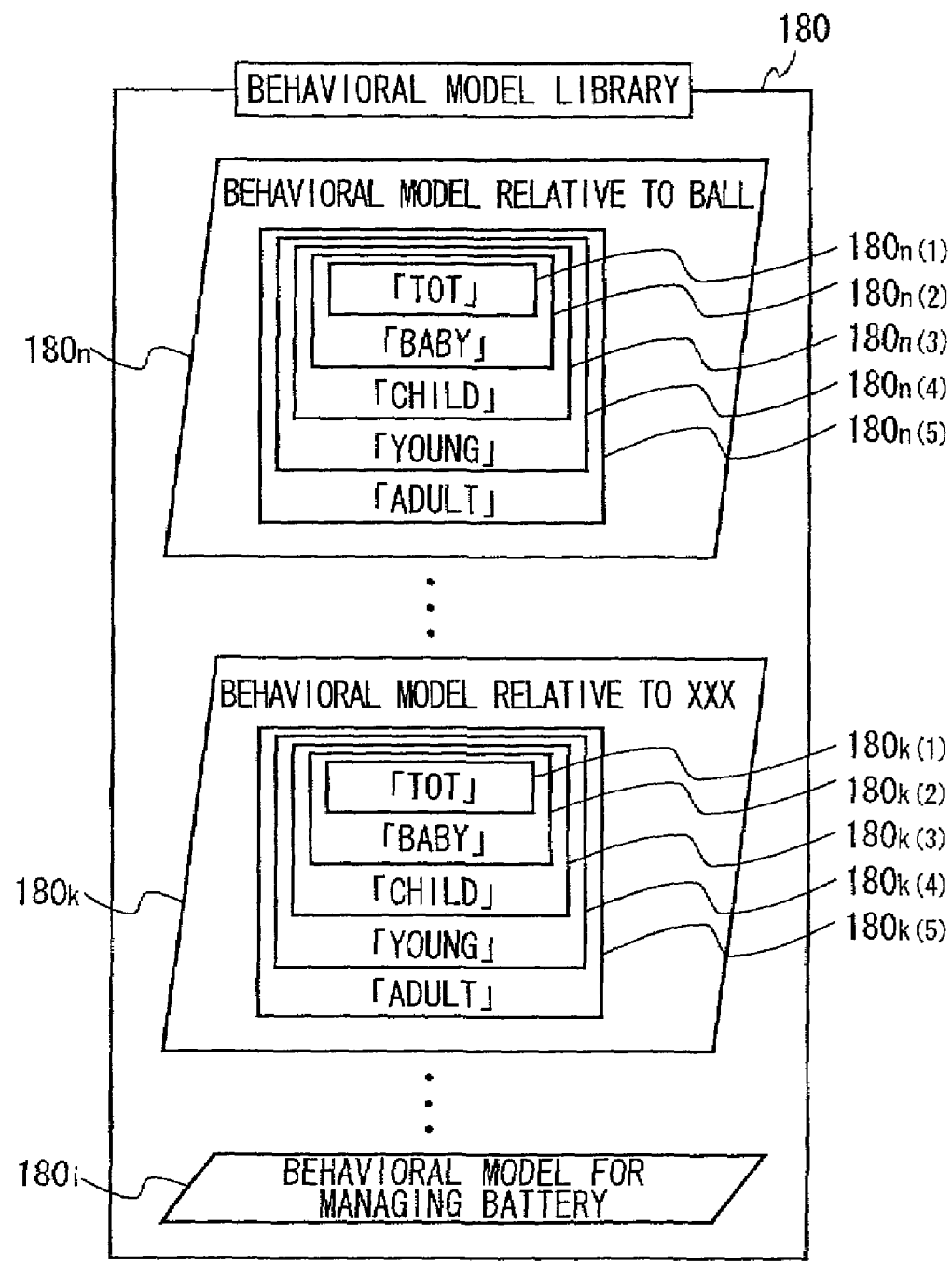
FIG. 26 is a conceptual view showing the detailed configuration of the behavioral model library.

Specifically, in the pet robot 110, five "growth stages" including a "tweety period", a "baby period", a "child", a "young" and an "adult period" are provided as growth processes. In the behavioral model library 180 (FIG. 22) of the application layer 151, behavioral models $180_{k(1)}$ to $180_{k(5)}$ are respectively provided corresponding to the "tweety period", "baby period", "child", the "young" and the "adult period" as behavioral models $180_k$ as shown in FIG. 26, in respect of all condition items (called them condition items related to growth, hereinafter) related to four items of a "walking state", a "motion", an "action" and a "sound (bark)" of the respective condition items such as the above described "when the battery residual amount gets low". Then, concerning these condition items related to growth in the behavioral model library 181, a next action is determined by employing the behavioral model $180_{k(1)}$ of the "tweety period" during an initial time.

Figure 24:
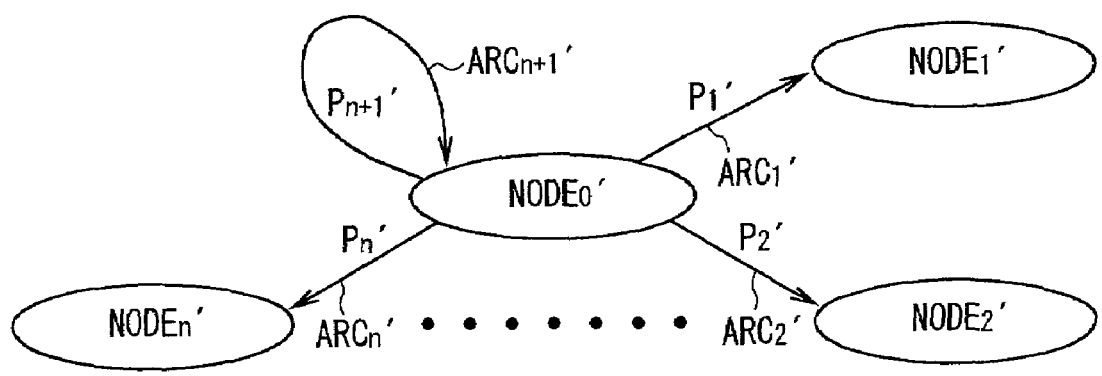
FIG. 24 is a schematic diagram showing a probability automaton.

In this case, each behavioral model $180_{k(1)}$ in the "tweety period" has the small number of nodes $NODE_0{'}$ to $NODE_n{'}$ (FIG. 24). Further, the contents of the action outputted from these behavioral models $180_{k(1)}$ are equivalent to actions or the contents of actions which correspond to those of the "tweety period" such as "move forward in accordance with a pattern 1 (walking pattern for the "tweety period" or "cry in accordance with a pattern 1 (crying pattern for the "tweety period").

Thus, the pet robot 110 acts and operates in accordance with each behavioral model $180_{k(1)}$ of the "tweety period" during the initial time, for instance, "walks totteringly" with small steps in "a walking state", makes a "simple movement" such as simply "walking", "standing", "sleeping" as for "motion", makes a monotonous" action by repeating the same actions as for "action" and generates a "small and short" cry as for "sound"

Further, at this time, the learning module 182 (FIG. 22) of the application layer 151 holds a parameter (called it a growth parameter, hereinafter) indicating the degree of "growth" therein and sequentially updates the value of the growth parameter in accordance with the number of times of actions (teaching) from the user such as "patted" or "hit" or the lapse of time on the basis of the recognition results or the lapse of time information, etc. supplied from the input semantics converter module 166.

Then, the learning module 182 evaluates the value of the growth parameter every time the power source of the pet robot 110 is turned on. When the above described value exceeds a preset threshold value so as to correspond to the "baby period", the learning module 182 informs the behavioral model library 180 of it. When being given this information, the behavioral model library 180 changes the behavioral models used respectively for the above described condition items related to growth to the behavioral models $180_{k(2)}$ of the "baby period".

At this time, each behavioral model $180_{k(2)}$ of the "baby period" has the number of nodes $NODE_0{'}$ to $NODE_n{'}$ larger than those of the behavioral model $180_{k(1)}$ in the "tweety period". Further, the contents of the actions outputted from these behavioral models $180_{k(2)}$ are more difficult and more complicated in a level (growth level) than those of the actions in the "baby period".

Thus, the pet robot 110 then acts and operates in accordance with these behavioral models $180_{k(2)}$, so as to "slightly securely walk" by increasing the rotating speed of the respective actuators $135_1$ to $135_n$ (FIG. 19), for instance, as for the "walking state", to make "a little higher and more complicated " movement by increasing the number of actions, as for the "motion", to have "a little purposeful" conduct as for the "action" and to have "a little long and loud sounds" as for the "sound".

Further, every time the value of growth parameter exceeds threshold values respectively preset so as to correspond to the "child", the "young" and the "adult period", the learning module 184 informs the behavioral model library 181 of it in the similar way to the above described case. Further, the behavioral model library 181 sequentially changes the behavioral models to the behavioral models $180_{k(3)}$ to $180_{k(5)}$ in the "child", the "young" and the "adult period", respectively as for the above described condition items related to growth every time this information is supplied thereto.

At this time, as the "growth stage" is raised, the number of nodes $NODE_0{'}$ to $NODE_n{'}$ of each of the behavioral models $180_{k(3)}$ to $180_{k(5)}$ of the "child", the "young" and the "adult period" increases. Further, as the "growth stage" is raised, the contents of the actions outputted from these behavioral models $180_{k(3)}$ to $180_{k(5)}$ are more difficult and more complicated in the level.

As a result, as the "growth stage" in the pet robot 110 rises (in other words, when the "tweety period" changes to the "baby period", the "baby period" changes to the "child", the "child" changes to the "young" and the "young" changes to the "adult period"), the "walking state" changes from "walking totteringly" to "walking securely", the "motion" changes from a "simple" motion to a "high level and complicated" motion, the "action" changes from the "monotonous action" to the "purposeful action" and the "sound" changes from the "small and short sound" to the "long and large sound", sequentially stepwise.

As described above, in the pet robot 110, the action and operation are designed to "grow" in the course of five stages of the "tweety period", the "baby period", the "child", the "young" and the "adult period" in accordance with teaching given from the user and the lapse of time.

Figure 27:
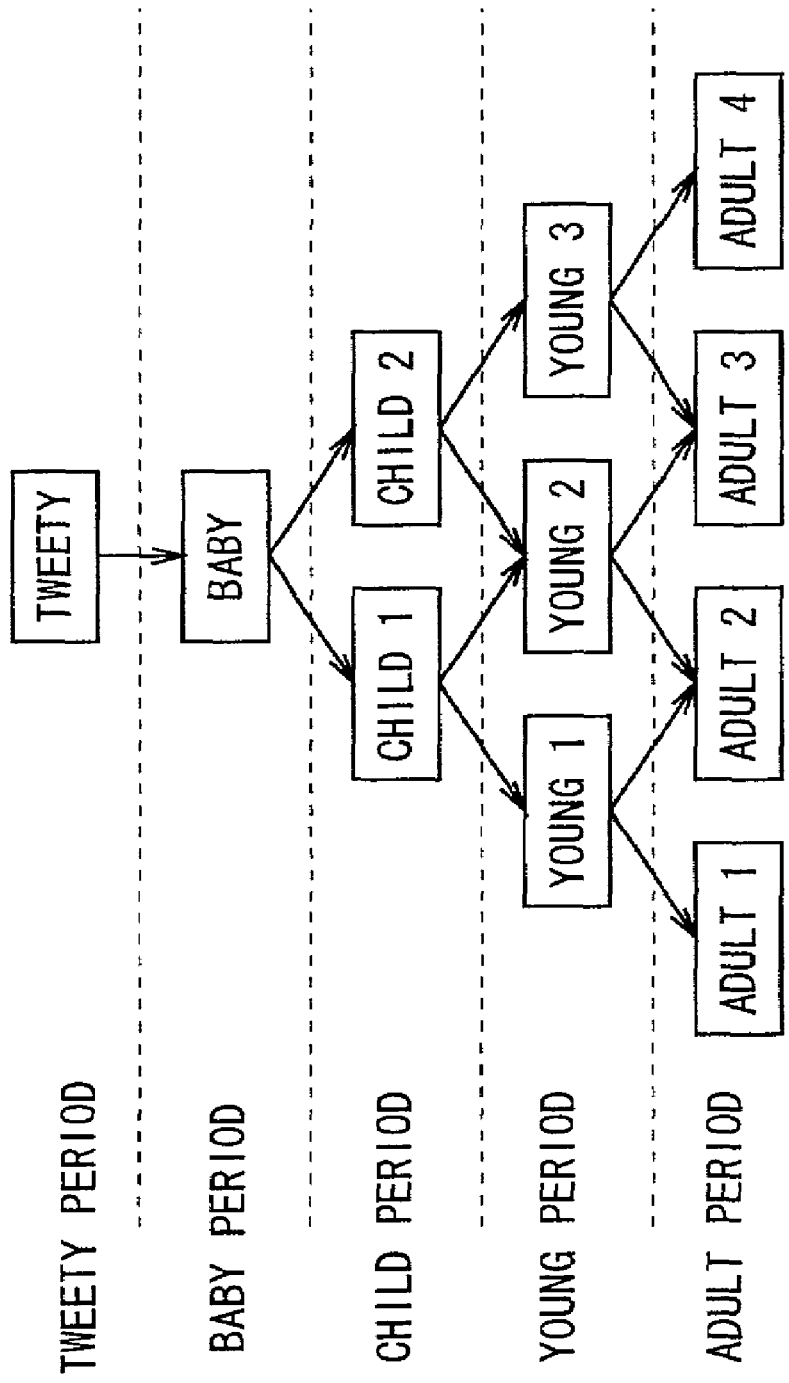
FIG. 27 is a conceptual view showing the growth model of the pet robot.
Figure 28:
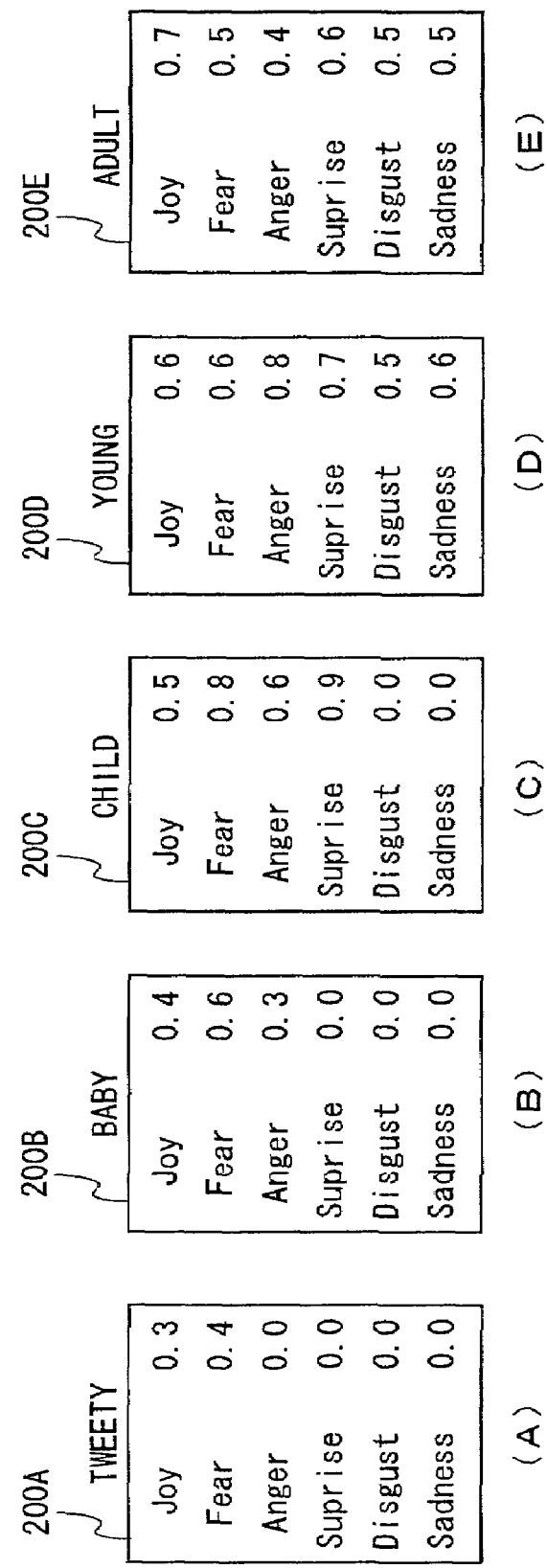
FIG. 28 is a conceptual view showing an emotion parameter file for each "growth stage".

In the present embodiment, the growth model of the pet robot 110 is a model which branches after the "young" as shown in FIG. 27.

Specifically, in case of the pet robot 110, in the behavioral model library 180 of the application layer 151 (FIG. 22), a plurality of behavioral models are prepared as the behavioral models $180_{k(3)}$ to $180_{k(5)}$ of the "child period", the "young period" and the "adult period" respectively for the above described condition items related to growth.

In practice, as the behavioral models of, for instance, the "child period" of the condition items related to growth, are prepared a behavioral model (CHILD 1') for performing an action of a "wild" character whose movement is rough and rapid and a behavioral model (CHILD 2') for performing an action of a "gentle" character whose movement is smoother and slower than the former.

Further, as the behavioral models of the "young period", are prepared an action mode (YOUNG 1') for performing an action of a "rough" character whose movement is rougher and faster than that of the "wild" character of the "child period", a behavioral model (YOUNG 2') for performing an action and operation of an "ordinary" character whose movement is slower and smoother than that of the YOUNG 1', and a behavioral model (YOUNG 3') for performing an action of a "gentle" character whose movement is much slower and whose amount of movement is lower than that of the YOUNG 2'.

Still further, as behavioral models of the "adult period", are prepared a behavioral model (ADULT 1') for performing an action of a very irritable and "aggressive" character whose movement is rougher and faster than that of the "rough" character of the "young period", a behavioral model (ADULT 2') for performing an action of an irritable and "wild" character whose movement is smoother and slower than that of the ADULT 1', a behavioral model (ADULT 3') for performing an action of a "gentle" character whose movement is smoother and slower and whose amount of movement is lower than that of the ADULT 2' and a behavioral model (ADULT4) for performing an action of a "quiet" character whose movement is much slower and whose amount of movement is lower than that of the ADULT 3'.

Then, when the learning module 182 (FIG. 22) of the application layer 151 supplies information for raising the "growth stage" to the behavioral model library 180, as described above, the learning module 182 designates which character is used from among the characters, and which behavioral model is used from among the behavioral models CHILD 1', CHILD 2', YOUNG 1' to YOUNG 3' and ADULT 1' to ADULT 4' as the behavioral model of a next "growth stage" of the condition items related to growth on the basis of the number of times of "hit" and "patted", etc. in the "growth stage" after the "child period".

As a result, the behavioral model library 180 changes the behavioral models used after the "child period" to the behavioral models of the designated "characters" respectively for the condition items related to growth on the basis of the designation.

In this case, after the "child period", the "character" in a next "growth stage" is determined depending on the "character" in the present "growth stage" upon shift to the next "growth stage". In FIG. 27, a character can be changed only to another character of the "characters" connected together by arrow marks. Therefore, for example, in the case where the behavioral model (CHILD 1') of a "wild" character is employed in the "child period", it cannot be changed to the behavioral model (YOUNG 3') of a "gentle" character in the "young period".

As described above, the pet robot 110 is designed to change its "character" with its "growth" in accordance with the actions from the user or the like as if the character of a real animal were formed by a breeding method of an owner.

(3-3-2) Growth of Emotion and Instinct

In addition to the above configuration, in the case of the pet robot 110, the emotion and instinct are designed to "grow" as the above described actions "grow".

More specifically, in case of the pet robot 110, in the emotion model 183 (FIG. 22) of the application layer 151, are stored files (called them emotion parameter files, hereinafter) 200A to 200E in which the values of coefficient $k_e'$ of the equation (1) relative to each emotional behavior for each of the "growth stages" as shown in FIGS. 29(A) to 29(E) are respectively described.

The emotion model 183 is designed to cyclically update the parameter values of the emotional behaviors respectively on the basis of the equation (4) by using the values of coefficient $k_e'$ described in the emotion parameter file 200A for the "tweety period" during the initial time (namely, the "growth stage" is a stage of the "tweety period".

Further, every time the "growth stage" rises, the learning module 182 supplies information for informing the rise of the stage to the emotion model 183 as in the case of the behavioral model library 180 (FIG. 22). Then, the emotion model 183 respectively updates the values of coefficient $k_e$ of the equation (4) for the respective emotional behaviors to corresponding values described in the emotion parameter files 200B to 200E of the corresponding "growth stages" every time this information is supplied.

Figure 29:
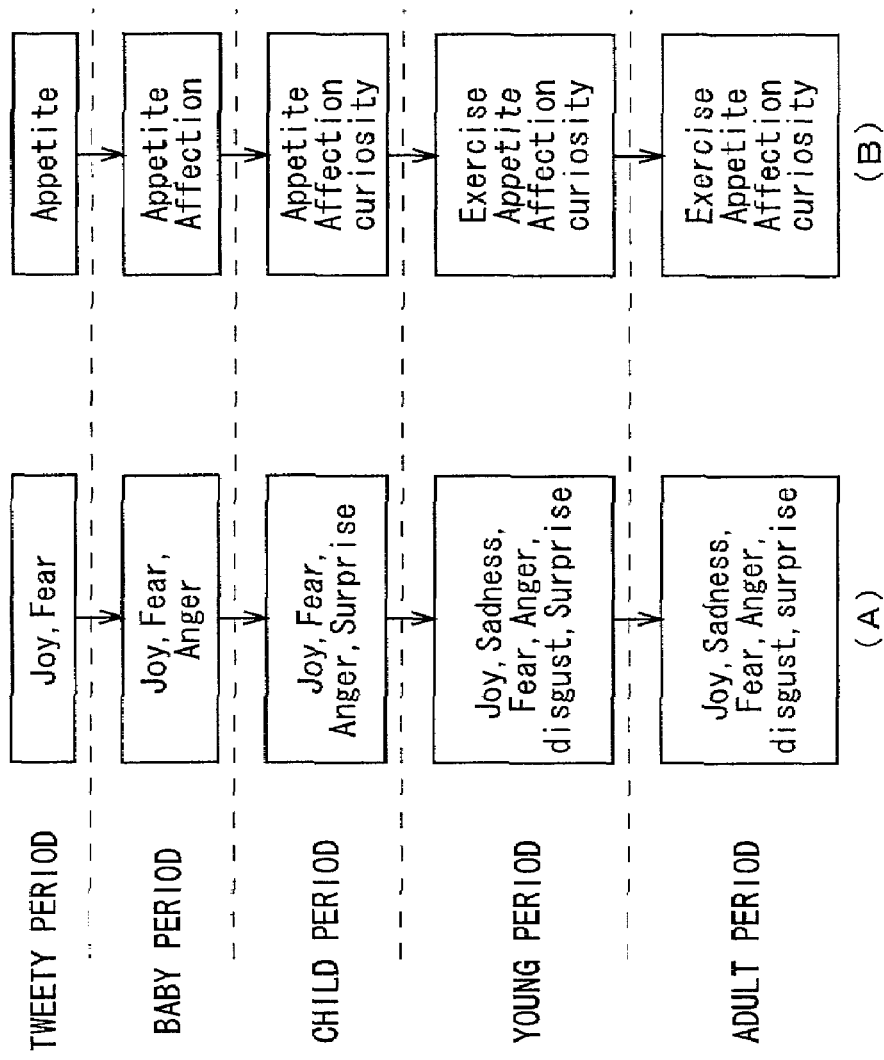
FIG. 29 is a flowchart used for explaining the growth of sensitivity and instinct.

At this time, for example, in the "tweety period", all the values of coefficient $k_e'$ of other emotional behaviors than a "joy" and a "fear" are set to "0", as apparent from FIG. 29(A). Accordingly, in the "tweety period", it is only the emotional behaviors of "joy" and "fear" that the values of parameters of the emotional behaviors cyclically updated change. Since the parameter values of other emotional behaviors are always constant, the emotional behaviors except "joy" and "fear" are suppressed. Consequently, in the "tweety period", only the "joy" and the "fear" of six emotional behaviors can be expressed as the actions (in other words, only the respective parameter values of "joy" and "fear" of six emotional behaviors are employed for generating the actions).

Further, as shown in FIG. 29(B), in the "baby period", all the values of coefficient $k_e'$ of the emotional behaviors other than "joy", "fear" and "anger" are set to "0". Accordingly, in the "baby period", it is limited to the emotional behaviors of "joy", "fear" and "anger" that the values of parameters of the respective emotional behaviors cyclically updated change. Since the parameter values of other emotional behaviors are always constant, the emotional behaviors except the "joy", the "fear" and the "anger" are suppressed. As a result, in the "baby period", the "joy", the "fear" and the "anger" of the six emotional behaviors can be expressed as the actions.

Similarly, as shown in FIGS. 29(C) to 29(E), only the emotional behaviors of "joy", "fear", "anger" and "surprise" can be expressed as the actions in the "child period" and all the emotional behaviors can be expressed as the actions in the "young period" and the "adult period".

As described above, in the pet robot 110, as the "growth stage" rises, the number of emotional behaviors which can be expressed as actions (the number of emotional behaviors employed for generating actions) increases. Thus, with the "growth" of the action, the emotion can "grow".

Similarly to the above, in the instinct model 184 (FIG. 22) of the application layer 151, are stored files (called them instinct parameter files, hereinafter) 201A to 201E in which the values of coefficient $k_i'$ of the equation (5) relative to each desire for each of the "growth stages" as shown in FIGS. 30(A) to 30(E) are described.

The instinct model 184 is adapted to cyclically update the parameter values of the respective desires on the basis of the equation (5) by employing the values of coefficient $k_1'$ described in the instinct parameter file 201A in the "tweety period", during an initial time (that is to say, the "growth stage" is a stage of the "tweety period").

Further, every time the "growth stage" rises, a notification for informing the instinct model 184 of this is supplied to the instinct model 182 from the learning module 182 (FIG. 22), as in the case of the emotion model 183. Then, the instinct model 184 is adapted to update the values of coefficient $k_i'$ in the equation of (5) for each desire to corresponding values described in the instinct parameter files 201B to 201E of the corresponding "growth stages" every time the notification is supplied thereto.

At this time, in the "tweety period", as apparent from FIG. 30(A), all the values of coefficient $k_i'$ of other desires than "appetite" are set to "0". Accordingly, in the "tweety period", it is limited only to the "appetite" that the values of parameter of the desires which are cyclically updated change. Since the parameter values of other desires are always constant, the desires except the "appetite" are suppressed. Consequently, in the "tweety period", only the "appetite" of four desires can be expressed as an action (in other words, only the parameter value of the "appetite" of the four desires is employed for generating an action).

Further, in the "baby period", as apparent from FIG. 30(B), all the values of coefficient $k_i'$ of desires except the "appetite" and an "affection desire" are set to "0". Therefore, in the "baby period", it is limited only to the "appetite" and the "affection desire" that the values of parameters of the desires cyclically updated change, and the parameters of other desires are always constant values. As a result, in the "baby period", desires other than the "appetite" and the "affection desire" are suppressed and only the "appetite" and the "affection desire" of the four desires can be expressed as the actions.

Similarly, as shown in FIGS. 30(C) to 30(E), in the "child period", desires of the "appetite", "the affection desire" and "curiosity" can be represented as actions. In the "young period" and the "adult period", all the desires can be expressed as actions.

As described above, in the pet robot 110, as the "growth stage" rises, the number of desires (the number of desires used for generating actions) which can be expressed as the actions and operations increases, as shown in FIG. 30 (B). Thus, with the "growth" of the action, the instinct is allowed to "grow".

(3-4) Operation and Effects of First Embodiment

The pet robot 110 having the above described configuration can express only a part of the emotional behaviors and desires of six emotional behaviors and four desires as the actions during an initial time. Then, as the "growth stage" rises, the number of emotional behaviors and desires which can be expressed as the actions increases.

Therefore, since the emotion and instinct of the pet robot 110 also "grow" with the "growth" of the actions, the "growth" can be more biologically and naturally expressed, and the user can enjoy the processes thereof.

Further, since the emotion and instinct models of the pet robot 110 first start from two simple emotional behaviors and one desire, the user can grasp the actions of the pet robot 110 with ease. Then, when the user is accustomed to the emotion and instinct models, the emotion and instinct models become complicated little by little, so that the user can readily understand or meet the emotion and instinct models in each "growth stage".

According to the above described configuration, since only a part of the emotional behaviors and desires of the six emotional behaviors and the four desires can be expressed as the actions during an initial time, and then, as the "growth stage" rises, the number of emotional behaviors and desires which can be expressed as the actions is increased, the "growth" can be more biologically and naturally expressed, so that the pet robot capable of improving an entertainment characteristic can be realized.

(3-5) Other Embodiments

In the above described third embodiment, although there is described a case in which the present invention is applied to a four-footed walking type pet robot, it should be noted that the present invention is not limited thereto, and can be widely applied to, for instance, a two-footed robot or other various kinds of robot apparatuses.

Further, in the above described third embodiment, although there is described a case to which the emotion model 183 and the instinct model 184 are applied as restricting means for restricting the number of emotional behaviors or desires used for generating the action so as to increase stepwise, needless to say, the present invention is not limited thereto, and the number of emotional behaviors or desires used for generating the action may be restricted so as to increase stepwise in, for instance, the behavioral model library 180 or the learning module 182.

Still further, in the above described third embodiment, although there is described a case in which the number of emotional behaviors or desires used for generating the action is restricted so as to increase stepwise on the basis of the externally applied prescribed stimulation (for instance, "hit" or "patted") and the lapse of time, it should be noted that the present invention is not limited thereto, and the number of emotional behaviors or desires used for generating the action may be restricted so as to increase stepwise, in addition thereto or in place thereof, on the basis of other conditions (for example, a desired action can be successfully done) except the above.

Still further, in the above described third embodiment, although there is a described a case in which the number of emotional behaviors and desires is increased in the course of five stages including the "tweety period", the "baby period", the "child period", the "young period", and the "adult period" so as to meet the "growth" of the action, it should be recognized that the present invention is not limited thereto, and a "growth stage" except them may be provided.

Still further, in the above described third embodiment, although there is described a case in which a plurality of behavioral models $180_1$ to $180_n$ are provided in the action library 180 as the action generating means for generating the action on the basis of the respective parameter values of the emotional behaviors and desires and the behavioral models $180_1$ to $180_n$, it should be recognized that the present invention is not limited thereto, and the action may be generated on the basis of one behavioral model and various kinds of other configurations may be broadly applied to the configuration of the action generating means.

Still further, in the above described third embodiment, although there is described a case in which the behavioral model changing means for changing the behavioral models $180_{k(1)}$ to $180_{k(5)}$ (FIG. 26) to the behavioral models $180_{k(2)}$ to $180_{k(5)}$ high in growth level on the basis of the accumulation of prescribed stimulation (for instance, "hit" or "pat") and the lapse of time comprises the learning module 182 and the behavioral model library 180, needless to say, the present invention is not limited thereto and various kinds of other configurations can be widely applied.

Still further, in the above described third embodiment, although there is described a case in which, as the emotional behaviors, six emotional behaviors including "joy", "sadness", "anger", "surprise", "disgust" and "fear" are provided and, as the desires, four desires including "exercise", "affection", "appetite" and "curiosity" are provided, it should be noted that the present invention is not limited thereto and various kinds and various numbers may be broadly applied to the number and kinds of the emotional behaviors and desires.

(4) Fourth Embodiment (4-1) Configuration of Pet Robot 205 According to Fourth Embodiment In FIG. 18, reference numeral 205 generally denotes a pet robot according to a fourth embodiment, which is configured similarly to the pet robot 110 according to the third embodiment except a point that the sensitivity of desires and emotional behaviors is changed in accordance with a circumferential state or actions from a user or the like.

Specifically, in the pet robot 110 of the third embodiment, when the emotion or the instinct is updated as mentioned above, the equation (4) or (5) is used. However, an external output (sensor data from various kinds of sensors, image data, audio data, etc.) on which the update at this time depends is greatly dependent upon an environment in which the pet robot 110 is present or a manner by which a user treats the pet robot.

For instance, in the case where the user frequently "hits" the pet robot or seldom "pats" the pet robot, the pet robot 110 is brought to a state in which the emotion of "anger" is amplified for most of time, because he is "hit", so that the emotion of "joy" is not expressed as an action or operation when he is only unexpectedly "patted". Accordingly, for the pet robot 110 positioned in such a state, the sensitivity of "joy" is raised more than that of "anger" so that the number and kinds of emotions expressed as the actions or operations need to be adjusted not to be biased.

Thus, in the pet robot 205 according to the fourth embodiment, the parameter values of each emotional behavior and each desire are respectively separately integrated for a long time, these integrated values are compared with each other between the parameters and the sensitivity of the emotional behavior or the desire is raised or lowered when the rate of the integrated value relative to the total is extremely large or small, so that all emotional behaviors and desires can be equally expressed as actions or operations so as to meet the environment or the manner by which the user treats the pet robot.

In practice, in the pet robot 205, the emotion model 207 of an application layer 206 shown in FIG. 22 sequentially calculates the integrated values $E_k''$ of parameter values for the respective emotional behaviors after a power source is finally turned on and the lapse of time $T_{all}''$ after the power source is finally turned on at intervals of prescribed periods $\Delta T'$ (for instance, at intervals of 1 to 2 minutes) in accordance with following mathematical equations.

$$E_k''=E_k'+E_k(t)'\times\Delta T' \qquad (7)$$

$$T_{all}''=T_{all}'+\Delta T' \qquad (8)$$

In the above equations, it is assumed that the parameter value of the emotional behavior at that time is $E_k(t)'$, the integrated value of the parameter values of the emotion up to that time after the power source is finally turned on is $E_k'$, and the lapse of time up to that time after the power source is finally turned on is $T_{all}'$.

Further, the emotion model 207 integrates the integrated values $E_k''$ of each emotional behavior and the integrated value $T_{all}''$ of the lapse of time, upon stop of turning on the power source of the pet robot 205 (upon shut-down of a system), respectively with the corresponding total integrated value $E_{k(TOTAL)}$ of total integrated value $E_{k(TOTAL)}$ for each emotional value or the total integrated value $T_{all(TOTAL)}$ which are stored in respectively prepared files (called them total emotional behavior integrated value files, hereinafter), and stores these total integrated values.

Then, the emotion model 207 reads out the total integrated value $T_{all(TOTAL)}$ of the lapse of time from the total emotional behavior integrated value file, every time the power of the pet robot 205 is turned on. When the total integrated value $T_{all(TOTAL)}$ exceeds a preset threshold value (for example, 10 hours), the total integrated value $E_{k(TOTAL)}$ of each emotional behavior stored in the total emotional behavior integrated value file is evaluated. Specifically, the evaluation is executed by calculating the rate of the total integrated value $E_{k(TOTAL)}$ of the emotional behavior relative to the total value ($\Sigma E_{k(TOTAL)}$) of the total integrated value $E_{k(TOTAL)}$ of each emotional behavior.

Then, when the rate of the total integrated value $E_{k(TOTAL)}$ of an emotional behavior is lower than a preset threshold value to the emotional behavior the emotion model 207 raises, the value of the coefficient $k_e'$ of the emotional behavior described in the emotion parameter files 200A to 200E of the corresponding "growth stage" of the emotion parameter files 200A to 200E described above referring to FIGS. 28(A) to 28(E) by a prescribed amount (for instance, 0.1). When it is lower than the threshold value, the value of this coefficient $k_e'$ is lowered by a prescribed amount (for instance, 0.1). In such a way, the emotion model 207 adjusts the coefficient $k_e'$ indicating the sensitivity of the emotional behavior.

The threshold value can be set with a tolerance to some degree for each emotional behavior so that the individuality of each robot is not injured. In the present embodiment, for instance, as for the emotional behavior of "joy", 10 [%] to 50 [%] relative to the total value ($\Sigma E_{k(TOTAL)}$) of the total integrated value $E_{k(TOTAL)}$ of each emotional behavior is set, as for "sadness", 5 [%] to 20 [%] relative to the total value is set, and as for "anger", 10 [%] to 60 [%] relative thereto is set.

Further, when the emotion model 207 completes the same processing for all the emotional behaviors, the emotion model 207 returns the total integrated value $E_{k(TOTAL)}$ of each emotional behavior and the total integrated value $T_{all(TOTAL)}$ of the lapse of time to "0". Then, while the emotion model 207 changes the parameter values of each emotional behavior in accordance with the equation (4) by using a newly determined coefficient $k_e'$ for each emotional behavior, the emotion model 207 newly starts the integration of the parameter values of each emotional behavior and the lapse of time in accordance with the equation (7), and then, repeats the same processing as mentioned above.

As mentioned above, in the pet robot 205, the sensitivity of each emotional behavior is changed, so that all the emotional behaviors can be equally expressed as the actions operations so as to meet the environment or a manner by which the user treats the pet robot.

Similarly to the above, the instinct model 208 (FIG. 22) sequentially calculates the integrated values $I_k''$ of parameter values for respective desires after the power source is finally turned on and sequentially calculates the integrated value $T_{all}''$ of the lapse of time after the power source is finally turned on in accordance with the equation (8) at intervals of prescribed periods $\Delta T'$ (for instance, at intervals of 1 to 2 minutes) in accordance with a following mathematical equation.

$$I_k''=I_k'+I_k(t)'\times\Delta T' \qquad (9)$$

In the above equation, it is assumed that the parameter value of the desire at that time is $I_k(t)'$ and the integrated value of the parameter values of the desire up to that time after the power source is finally turned on is $I_k'$.

Further, the instinct model 208 integrates the integrated values $I_k''$ of each desire and the integrated value $T_{all}''$ of the lapse of time, upon stop of turning on the power source of the pet robot 205 respectively with the corresponding total integrated value $I_{k(TOTAL)}$ of total integrated value $I_{k(TOTAL)}$ for each desire or the total integrated value $T_{all(TOTAL)}$ of the lapse of time which are stored in respectively prepared files (called them files for integrating desires, hereinafter) and stores these total integrated values.

Then, the instinct model 208 reads out the total integrated value $T_{all(TOTAL)}$ of the lapse of time from the total desire integrated value file, every time the power of the pet robot 205 is turned on. When the total integrated value $T_{all(TOTAL)}$ exceeds a preset threshold value (for example, 10 hours), the total integrated value $I_{k(TOTAL)}$ of each desire stored in the total desire igntegrated value file is evaluated. Specifically, the evaluation is executed by calculating the rate of the total integrated value $I_{k(TOTAL)}$ of the desire relative to the total value ($\Sigma I_{k(TOTAL)}$) of the total integrated value $I_{k(TOTAL)}$ of each desire.

Then, when the rate of the total integrated value $I_{k(TOTAL)}$ of a desire is lower than a preset threshold value to the desire, the instinct model 208 raises the value of the coefficient $k_i'$ of the desired described in the desire parameter files 201A to 201E of the corresponding "growth stage" of the desire parameter files 201A to 201E described above referring to FIGS. 30(A) to 30(E) by a prescribed amount (for instance, 0.1). When it is lower than the threshold value, the value of this coefficient $k_i'$ is lowered by a prescribed amount (for instance, 0.1). The threshold value at this time is set with a tolerance to some degree for each desire as mentioned above.

Further, when the instinct model 208 completes the same processing for all the desires, the instinct model 208 returns the total integrated value $I_{k(TOTAL)}$ of each desire stored in the total desire integrated value file and the total integrated value $T_{all(TOTAL)}$ of the lapse of time to "0". Then, while the instinct model 208 changes the parameter values of each desire in accordance with the equation (5) by using a newly determined coefficient $k_i'$ for each desire, the instinct model 208 newly starts the integration of the parameter values of each desire and the integration of the lapse of time in accordance with the equation (9), and then, repeats the same processing as mentioned above.

As mentioned above, in the pet robot 205, the sensitivity of each desire is changed, so that all the desires can be equally expressed as the actions or operations so as to meet the environment or a manner by which the user treats the pet robot.

(4-2) Operation and Effects of Fourth Embodiment

In the pet robot 205 with the above mentioned configuration, the parameter values of each emotional behavior and each desire are respectively sequentially integrated and the sensitivity of each emotional behavior and desire are changed at intervals of prescribed periods ΔT' on the basis of the integrated result.

Accordingly, in the pet robot 205, all the desires can be equally expressed as the actions or operations so as to meet the environment and a manner according to which the user treats the pet robot. Therefore, this pet robot 205 has high amusement characteristics, as compared with the pet robot 110 in the third embodiment.

With the above described configuration, the parameter values of each emotional behavior and each desire are sequentially integrated and the sensitivity of each emotional behavior and desire are changed at intervals of prescribed periods ΔT' on the basis of the integrated result. Therefore, all the desires can be equally expressed as the actions or operations so as to meet the environment and a way by which the user treats the pet robot. Thus, the pet robot capable of improving much more an amusement characteristic.

(4-3) Other Embodiments

In the above described fourth embodiment, although there is described a case in which the present invention is applied to a four-footed walking type pet robot 205, it should be noted that the present invention is not limited thereto, and can be widely applied to, for instance, a two-footed robot or various kinds of other robot apparatuses than it.

Further, in the above described fourth embodiment, although there is described a case to which the emotion model 207 and the instinct model 208 are applied as restricting means for restricting the number of emotional behaviors or desires used for generating the action so as to increase stepwise, needless to say, the present invention is not limited thereto, and the number of emotional behaviors or desires used for generating the action may be restricted so as to increase stepwise in, for instance, the behavioral model library 180 or the learning module 182.

Still further, in the above described fourth embodiment, although there is described a case in which the number of emotional behaviors or desires used for generating the action is restricted so as to increase stepwise on the basis of the externally applied prescribed stimulation (for instance, "hit" or "patted") and the lapse of time, it should be noted that the present invention is not limited thereto, and the number of emotional behaviors or desires used for generating the action may be restricted so as to increase stepwise, in addition thereto or in place thereof, on the basis of other conditions (for example, a desired action can be successfully done) except the above.

Still further, in the above described fourth embodiment, although there is described a case in which the number of emotional behaviors and desires is increased in such order as shown in FIGS. 29(A) or 29(B), the present invention is not limited thereto, and the emotional behaviors or the desires may be increased in other order than the above order.

Still further, in the above described fourth embodiment, although there is a described case in which the number of emotional behaviors and desires is increased in the course of five stages including the "tweety period", the "baby period", the "child period", the "young period", and the "adult period" so as to meet the "growth" of the action, it should be recognized that the present invention is not limited thereto, and a "growth stage" except them may be provided.

Still further, in the above described fourth embodiment, although there is described a case in which the number of emotional behaviors and desires used for generating the action sequentially increases, needless to say, the present invention is not limited thereto, and the number of emotional behaviors and desires used for generating the action may be initially decreased or decreased halfway (for instance, the "growth stage" such as an "old age period" is provided after the "adult period" so that the number of emotions or desires is decreased upon shift of the "growth stage" to the "old age period").

Still further, in the above described fourth embodiment, although there is described a case in which a plurality of behavioral models $180_1$ to $180_n$ are provided in the action library 180 as the action generating means for generating the action on the basis of the respective parameter values of the emotional behaviors and desires and the behavioral models $180_1$ to $180_n$, it should be recognized that the present invention is not limited thereto, and the action may be generated on the basis of one behavioral model and various kinds of other configurations may be broadly applied to the configuration of the action generating means.

Still further, in the above described embodiment, although there is described a case in which the behavioral model changing means for changing the behavioral models $180_{k(1)}$ to $180_{k(5)}$ (FIG. 26) to the behavioral models $180_{k(2)}$ to $180_{k(5)}$ high in growth level on the basis of the accumulation of prescribed stimulation (for instance, "hit" or "pat") and the lapse of time comprises the learning module 182 and the behavioral model library 180, needless to say, the present invention is not limited thereto and various kinds of other configurations can be widely applied.

Still further, in the above described fourth embodiment, although there is described a case in which, as the emotional behaviors, six emotional behaviors including "joy", "sadness", "anger", "surprise", "disgust" and "fear" are provided and, as the desires, four desires including "exercise", "affection", "appetite" and "curiosity" are provided, it should be noted that the present invention is not limited thereto and various kinds and various numbers may be broadly applied to the number and kinds of the emotional behaviors and desires.

Still further, in the above described fourth embodiment, although there is described a case in which the emotion model 207 and the instinct model 208 as the emotional behavior or desire updating means update the parameter values of the respective emotional behaviors and desires on the basis of the externally applied stimulation and the lapse of time, it should be recognized that the present invention is not limited thereto and the parameter values of the respective emotional behaviors and desires may be updated on the basis of conditions other than the above conditions.

Still further, in the above described fourth embodiment, although there is described a case in which the value of the coefficient $k_e'$ or $k_i'$ of the equation (4) or (9) is changed, as a method for respectively updating the sensitivity to each emotional behavior or each desire by the emotion model 207 and the instinct model 208 as the sensitivity changing means, needless to say, the present invention is not limited thereto and the sensitivity to each emotional behavior and each desire may be updated by any method other than the above method.

Furthermore, in the above described fourth embodiment, although there is described a case in which the environment is evaluated on the basis of the rate of the total integrated value $E_{k(TOTAL)}$ or $I_{k(TOTAL)}$ of the parameter values of the emotional behavior or the desire which are sequentially updated, relative to the total value ($\Sigma E_{k(TOTAL)}, \Sigma I_{k(TOTAL)}$) of the total integrated values $E_{k(TOTAL)}$ or $I_{k(TOTAL)}$ of the parameter values of all the emotional behaviors or desires, it should be noted that the present invention is not limited thereto and the environment may be evaluated on the basis of the number of times or the frequency of specific external stimulation such as "hit" or "patted" and a variety of methods other than the above methods may be widely applied as a method for evaluating the environment.

(5) Fifth Embodiment

The fifth embodiment will be described in detail using the accompanying drawings. The present invention is applicable to a pet robot which acts like a quadruped animal.

Figure 31:
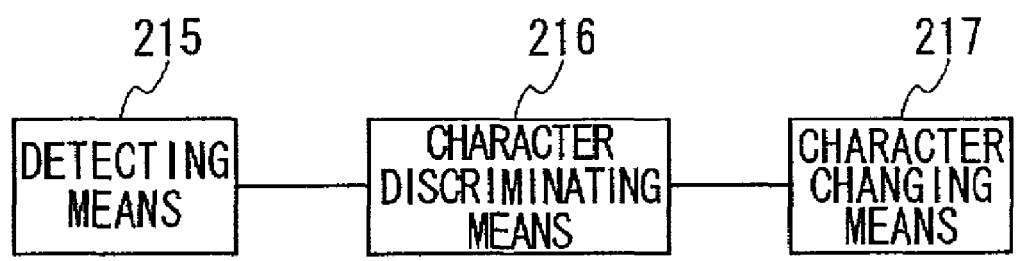
FIG. 31 is a block diagram explaining the fifth embodiment.

As shown in FIG. 31, a pet robot comprises detecting means 215 which detects an output from another pet robot, character discriminating means 216 which discriminates a character of the other pet robot on the basis of a detection result obtained by the detecting means 215 and character changing means 217 which changes a character on the basis of a discriminating result obtained by the character discriminating means 216.

Accordingly, the pet robot discriminates the character of the other robot apparatus by the character discriminating means 216 on the basis of the detection result of the output from the other pet robot obtained by the detecting means 215. The pet robot is capable of changing a character of its own by the character changing means 217 on the basis of the discriminating result of the character of the other pet robot.

Though described in detail later, the detecting means 215 detects an emotion or the like expressed by an action of the other pet robot and the character changing means 217 changes the character by changing parameters or the like of an emotion model which determines an action of the pet robot itself deriving from an emotion.

The pet robot is capable of changing the character of its own on the basis of an action or the like of the other pet robot as described above.

Accordingly, the pet robot has a character which is shaped like that of a true animal and can act on the basis of the character.

Now, description will be made of a specific configuration of a pet robot to which the present invention is applied.

(5-1) Configuration of Pet Robot

Figure 32:
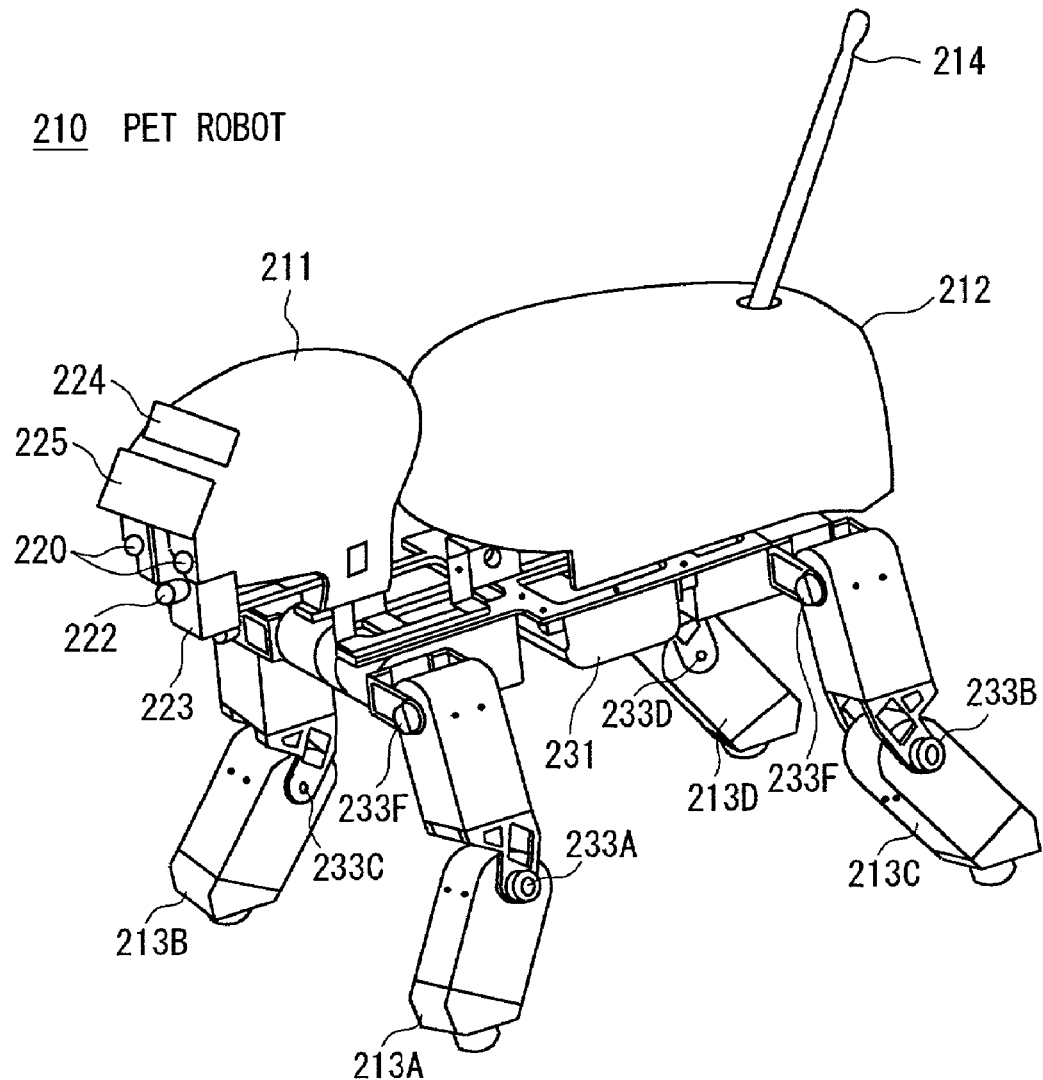
FIG. 32 is a perspective view showing an embodiment of a pet robot according to the fifth embodiment.

A pet robot 210 is configured as a whole as shown in FIG. 32, and composed by coupling a head unit 211 which corresponds to a head, a main body unit 212 which corresponds to a trunk, leg units 213A through 213D which correspond to legs and a tail unit 214 which corresponds to a tail so that the pet robot 210 acts like a true quadruped animal by moving the head unit 211 and the leg units 213A through 213D and the tail unit 214 relative to a main body unit 212.

Attached to predetermined locations of the head unit 211 are image recognizing section 220 which correspond to eyes and consist, for example, of CCD (Charge Coupled Device) cameras for picking up an image, microphones 221 which correspond to ears for collecting a voice, and a speaker 222 which corresponds to a mouth for giving sounds. Furthermore, attached to the head unit 211 are a remote controller receiver 223 which receives a command transmitted from a user by way of a remote controller (not shown), a touch sensor 224 which detects touch with a user's hand or the like, and an image display 225 which displays an internally generated image.

A battery 231 is attached to a location of the main body unit 212 corresponding to a ventral side and an electronic circuit (not shown) is accommodated in the main body unit 212 for controlling the action of the pet robot 210 as a whole.

Joint portions of the leg units 213A through 213D, coupling portions between the leg units 213A through 213D and the main body unit 212, a coupling portion between the main body unit 212 and the head unit 211, a coupling portion between the main body unit 212 and the tail unit 214 and the like are coupled with actuators 233A through 233N respectively which are driven under control by the electronic circuit accommodated in the main body unit 212. By driving the actuators 233A through 233N, the pet robot 210 is let to act like a true quadruped animal as described above while swinging the head unit 211 up, down, left and right, wagging the tail unit 214, walking and running by moving the leg units 213A through 213D.

(5-2) Circuit Configuration of Pet Robot 210

Figure 33:
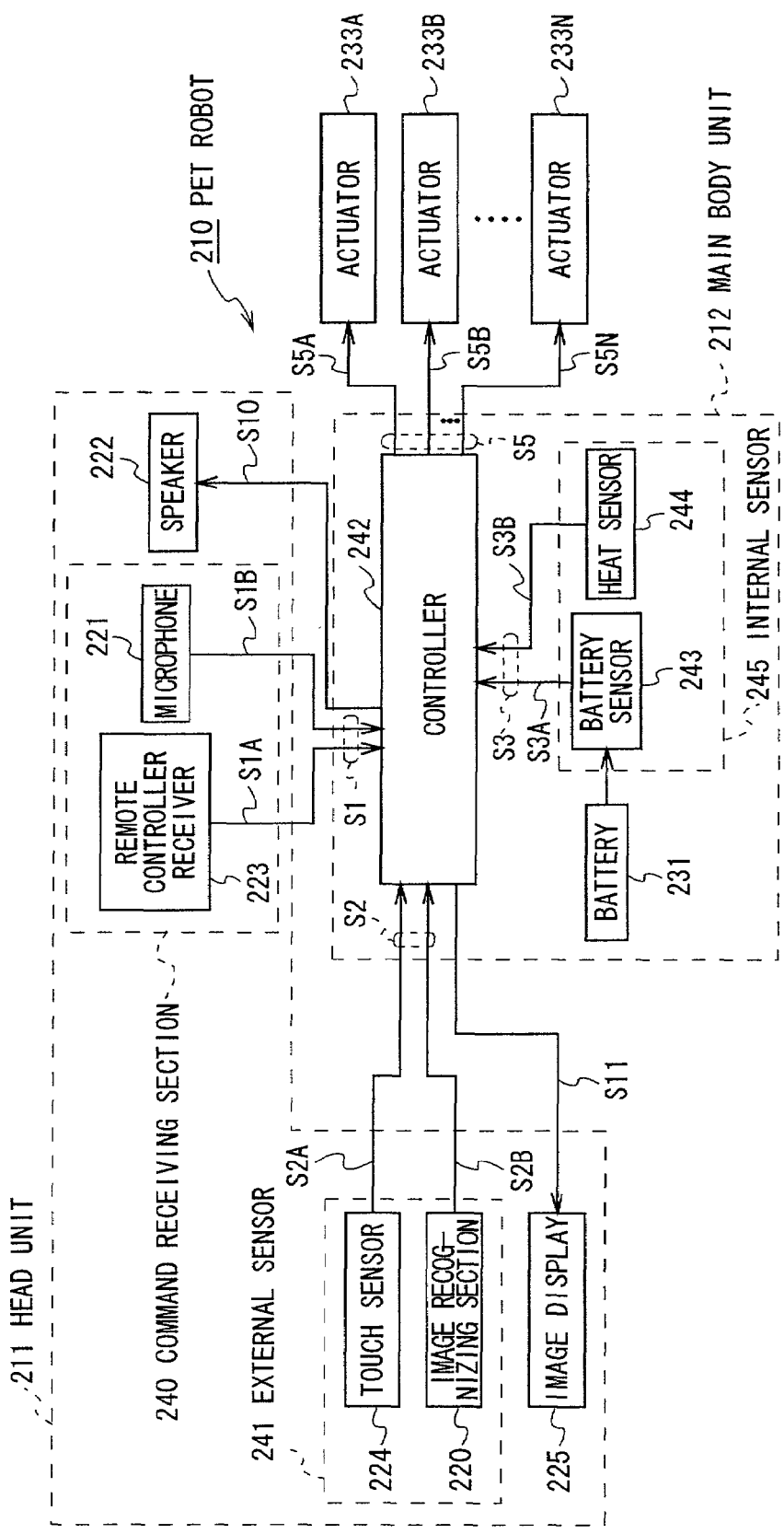
FIG. 33 is a block diagram showing a circuit composition of a pet robot.

Description will be made here of a circuit configuration of the pet robot 210 by using FIG. 33. The head unit 211 has a command receiving section 240 which comprises a microphone 221 and a remote controller receiver 223, an external sensor 241 which comprises an image recognizing section 220 and a touch sensor 224, a speaker 222 and an image display 225. Furthermore, the main body unit 212 has a battery 231, and comprises a controller 242 which controls an action of the pet robot 210 as a whole and an internal sensor 245 which comprises a battery sensor 243 for detecting a residual amount of the battery 231 and a heat sensor 244 for detecting heat generated in the pet robot 210. Furthermore, actuators 233A through 233N are disposed at predetermined locations respectively in the pet robot 210.

The command receiving section 240 is used for receiving commands given from the user to the pet robot 210, for example, commands such as "walk", "prostrate" and "chase a ball", and configured by the remote controller receiver 223 and the microphone 221. When a desired command is input by a user's operation, a remote controller (not shown) transmits an infrared ray corresponding to the above described input command to the remote controller receiver 223. Upon receiving this infrared ray, the remote controller receiver 223 generates a reception signal SIA and sends out this signal to the controller 242. When the user emits sounds corresponding to a desired command, the microphone 221 collects sounds emitted from the user, generates an audio signal SIB and sends out this signal to the controller 242. In response to a command given from the user to the pet robot 210, the command receiving section 240 generates a command signal S1 comprising the reception signal SIA and the audio signal SIB, and supplies the command signal to the controller 242.

The touch sensor 224 of the external sensor 241 is used for detecting a spurring from the user to the pet robot 210, for example, spurring of "tapping" or "striking" and when the users makes a desired spurring by touching the above described touch sensor 224, the touch sensor 224 generates a touch detection signal S2A corresponding to the above described spurring and sends out this signal to the controller 242.

The image recognizing section 220 of the external sensor 241 is used for detecting a discriminating result of an environment around the pet robot 210, for example, surrounding environment information such as "dark" or "a favorite toy is present" or a movement of another pet robot such as "another pet robot is running", photographs an image around the above described pet robot 210 and sends out an image signal S2B obtained as a result to the controller 242. This image recognizing section 220 captures an action which expresses an emotion of the other pet robot.

The external sensor 241 generates an external information signal S2 comprising the touch detection signal S2A and the image signal S2B in response to external information given from outside the pet robot 210 as described above, and sends out the external information signal to the controller 242.

The internal sensor 245 is used for detecting an internal condition of the pet robot 210 itself, for example, an internal condition of "hungry" meaning a lowered battery capacity or "fevered", and is configured by the battery sensor 243 and the heat sensor 244.

The battery sensor 243 is used for detecting a residual amount of the battery 231 which supplies power to each circuit of the pet robot 210 and sends out a battery capacity detection signal S3A to the controller 242 as a detection result. The heat sensor 244 is used for detecting heat in the pet robot 210 and sends out a heat detection signal S3B to the controller 242 as a detection result. The internal sensor 245 generates an internal information signal S3 comprising the battery capacity detection signal S3A and the heat detection signal S3B in correspondence to internal information of the pet robot 210 as described above and sends out the internal information signal S3 to the controller 242 as described above.

On the basis of the command signal SI supplied from the command receiving section 240, the external information signal S2 supplied from the external sensor 241 and the internal information signal S3 supplied from the internal sensor 245, the controller 242 generates control signals S5A through S5N for driving the actuators 233A through 233N and sends out the control signals to the actuators 233A through 233N, thereby making the pet robot 210 act.

At this time, the controller 242 generates a audio signal S10 and an image signal S11 to be output outside as occasion demands, and informs required information to the user by outputting the audio signal S10 outside by way of the speaker 222 and sending out the image signal S11 to the image display 225, thereby providing a desired image on the display.

(5-3) Data Processing in Controller

Now, description will be made of data processing performed in the controller 242. In accordance with programs preliminarily stored in a predetermined memory area used as software, the controller 242 processes the command signal S1 supplied from the command receiving section 240, the external information signal S2 supplied from the external sensor 241 and the internal information signal S3 supplied from the internal sensor 245, and supplies a control signal S5 obtained as a result, to the actuators 23.

Figure 34:
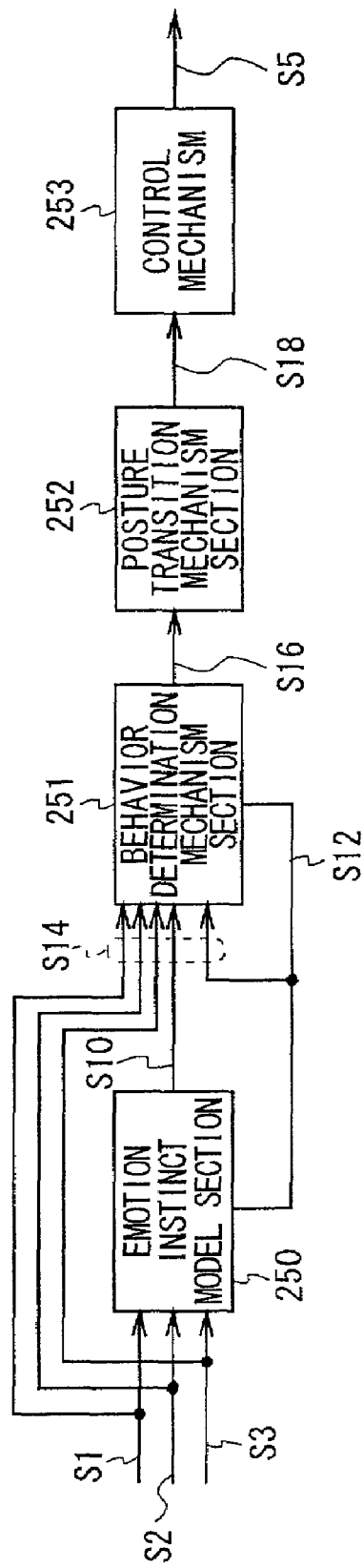
FIG. 34 is a schematic diagram showing data processing in a controller.
Figure 35:
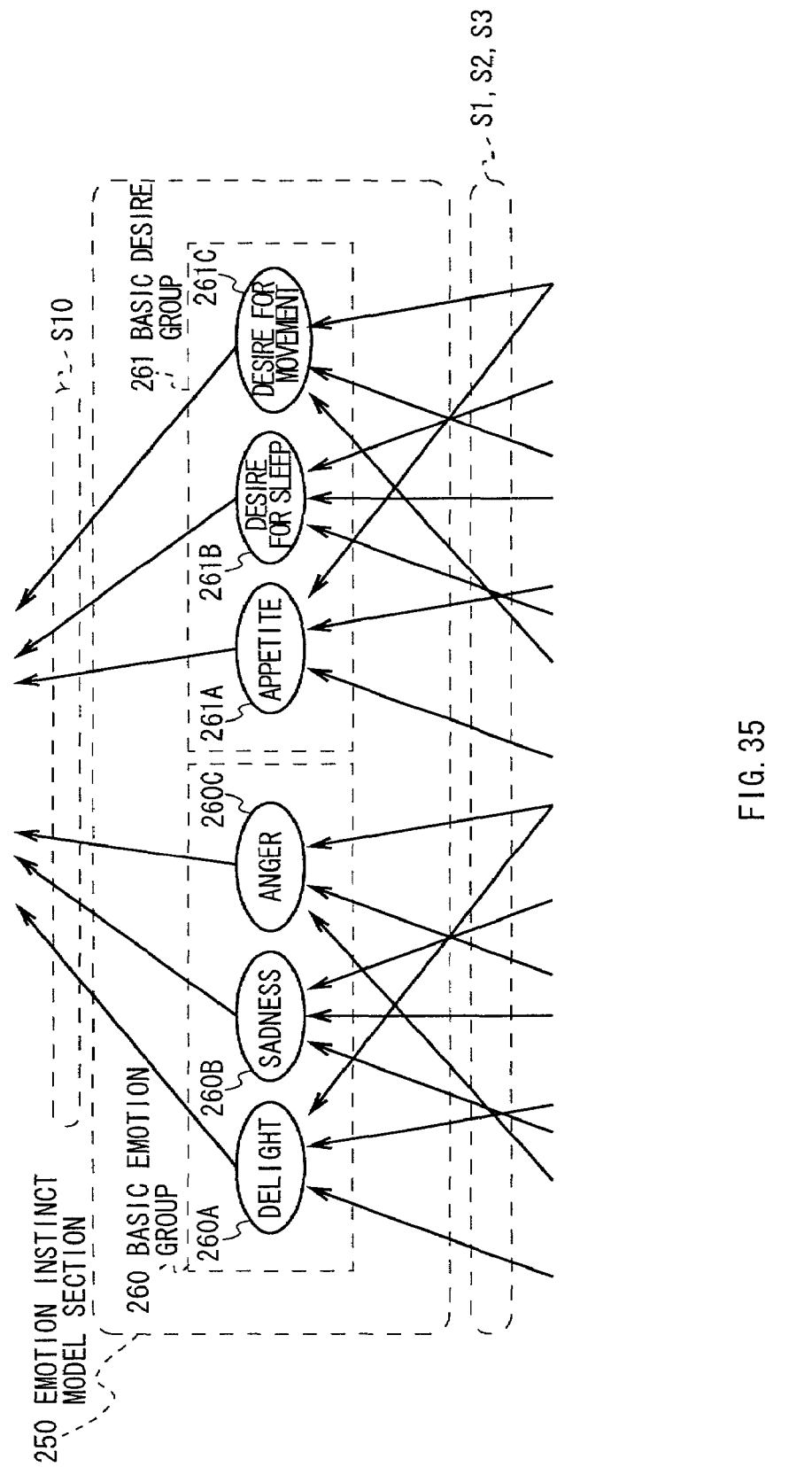
FIG. 35 is a schematic diagram showing data processing by an emotion and instinct model section.

Functions of the controller 242 for the data processing are classified into an emotion and instinct model section 250 used as emotion and instinct model changing means, a behavior determination mechanism section 251 used as action state determining means, a posture transition mechanism section 252 used as posture transition means and a control mechanism section 253 as shown in FIG. 34, and the controller 242 inputs the command signal S1 supplied from outside, the external information signal S2 and the internal information signal S3 to the emotion and instinct model section 250 and the behavior determination mechanism section 251.

The emotion and instinct model section 250 has a basic emotion group 260 which comprises emotion units 260A through 260C adopted as a plurality of independent emotion models and a basic desire group 261 which comprises desire units 261A through 261C adopted as a plurality of independent desire models. In the basic emotion group 260, the emotion unit 260 expresses an emotion of "delight", the emotion unit 260B expresses an emotion of "sadness" and the emotion unit 260C expresses an emotion of "anger".

The emotion units 260A through 260C express degrees of emotions as intensities, for example, from 0 to 100 levels, and change the intensities of the emotions from one minute to the next on the basis of the command signal S1,the external information signal S2 and the internal information signal S3 which are supplied. Accordingly, the emotion and instinct model section 250 expresses an emotion state of the pet robot 210 by combining the intensities of the emotion units 260A through 260C which change from one minute to the next, thereby modeling changes with time of the emotions.

In the basic desire group 261, the desire unit 261A expresses a desire of "appetite", the desire unit 261B expresses a desire of "desire for sleep" and the desire unit 261C expresses a desire of "desire for movement". Like the emotion units 260A through 260C, the desire unit 261A through 261C express degrees of desires as intensities, for example, from 0 to 100 levels, and change the intensities of the desires from one minutes to the next on the basis of the command signal S1,the external information signal S2 and the internal information signal S3 which are supplied. Accordingly, the emotion and instinct model section 250 expresses an instinct state of the pet robot 210 by combining the intensities of the desire units 261A through 261C which change from one minutes to the next, thereby modeling changes with time of the instincts.

The emotion and instinct model section 250 changes the intensities of the emotion units 260A through 260C and the desire units 261A through 261C as described above on the basis of input information S1 through S3 which comprises the command signal S1, the external information signal S2 and the internal information signal S3. The emotion and instinct model section 250 determines the emotion state by combining the changed intensities of the emotion units 260A through 260C, determines the instinct state by combining the changed intensities of the desire units 261A through 261C, and sends out determined emotion state and instinct state to the behavior determination mechanism section 251 as emotion and instinct state information S10.

The emotion and instinct model section 250 combines emotion units which are desired in the basic emotion group 260 so as to restrain or stimulate each other, thereby changing an intensity of one of the combined emotion units when an intensity of the other emotion unit is changed and realizing the pet robot 210 which has natural emotions.

Figure 36:
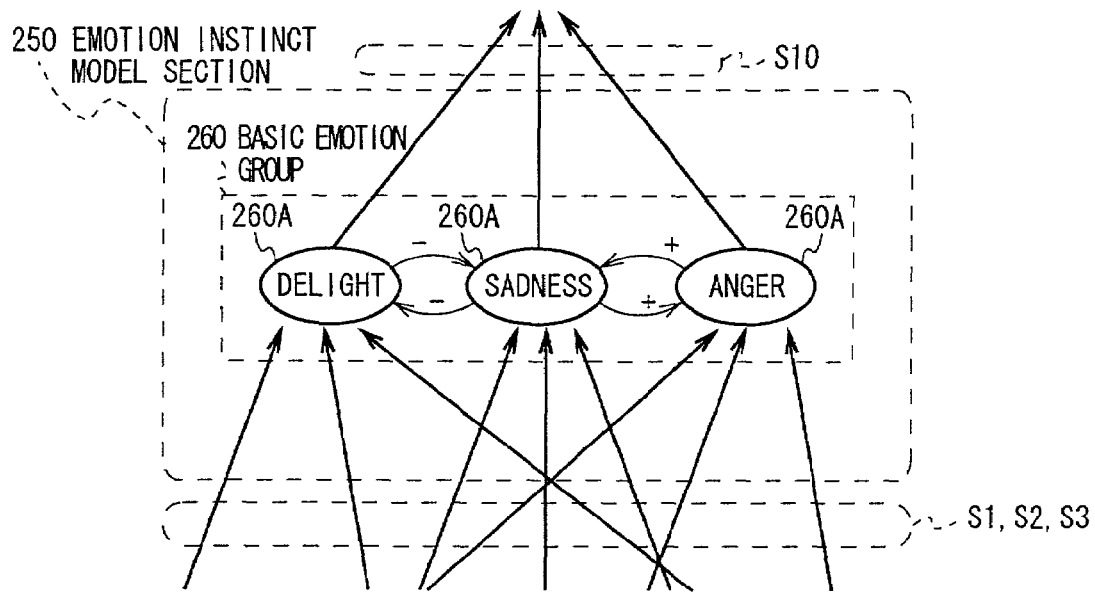
FIG. 36 is a schematic diagram showing data processing by the emotion and instinct model section.

Concretely speaking, the emotion and instinct model section 250 combines the "delight" emotion unit 260A with the "sadness" emotion unit 260B so as to restrain each other as shown in FIG. 36, thereby enhancing an intensity of the "delight" emotion unit 260A when the pet robot 210 is praised by the user and lowering an intensity of the "sadness" emotion unit 260B as the intensity of the "delight" emotion unit 260A is enhanced even when the input information S1 through S3 which changes the intensity of the "sadness" emotion unit 260B is not supplied at this time. Similarly, the emotion and instinct model section 250 naturally lowers an intensity of the "delight" unit 260A as an intensity of the "sadness" emotion unit 260B is enhanced when the intensity of the "sadness" emotion unit 260B is enhanced.

Furthermore, the emotion and instinct model section 250 combines the "sadness" emotion unit 260B with the "anger" emotion unit 260C so as to stimulate each other, thereby enhancing an intensity of the "anger" emotion unit 260C when the pet robot is struck by the user and enhancing an intensity of the "sadness" emotion unit 260B as the intensity of the "anger" emotion unit 260C is enhanced even when the input information S1 through S3 which enhances the intensity of the "sadness" emotion unit 260B is not supplied at this time. When an intensity of the "sadness" emotion is enhanced, the emotion and instinct model section 250 similarly enhances an intensity of the "anger" emotion unit 260C naturally as the intensity of the "sadness" emotion unit 260B is enhanced.

As in a case where the emotion units 260 are combined with each other, the emotion and instinct model section 250 combines desire units desired in the basic desire group 261 so as to restrain or stimulate each other, thereby changing an intensity of one of the combined desire units when an intensity of the other desire unit is changed and realizing the pet robot 210 which has natural instincts.

Returning to FIG. 34, action information S12 representing a current action or a past action of the pet robot 210 itself, for example, "walked for a long time" is supplied to the emotion and instinct model section 250 from the behavior determination mechanism section 251 disposed at a later stage so that the emotion and instinct model section 250 generates emotion and instinct state information S10 which is different dependently on an action of the pet robot represented by the above described action information S12 even when identical input information S1 through S3 is given.

Figure 37:
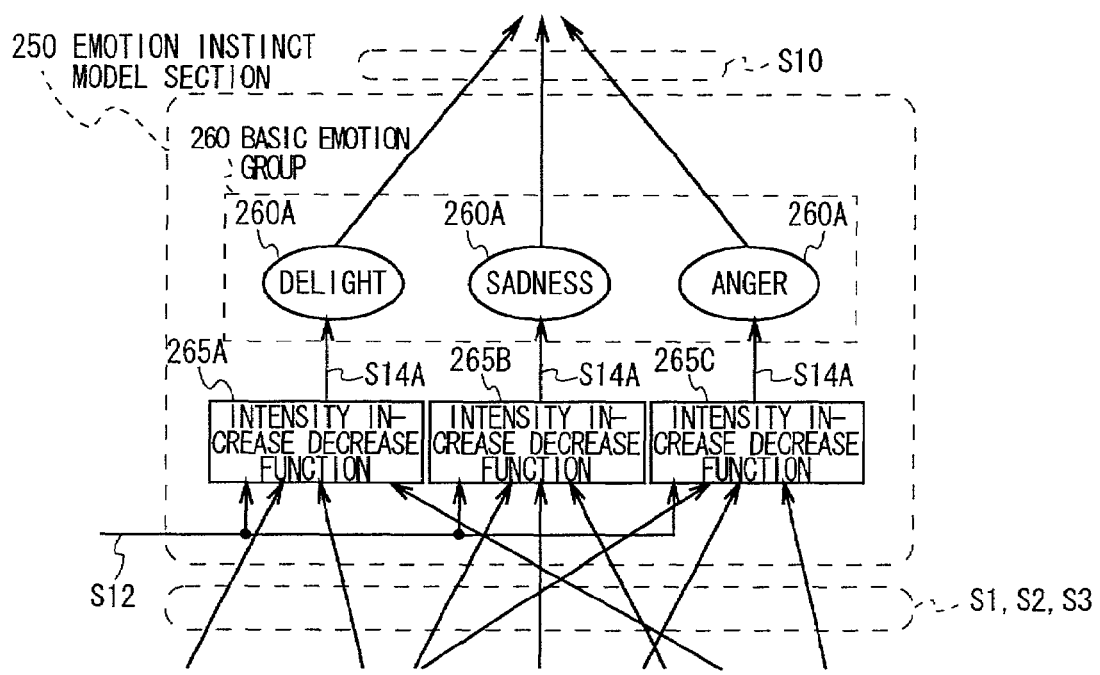
FIG. 37 is a schematic diagram showing data processing by the emotion and instinct model section.

Specifically, the emotion and instinct model section 250 has intensity increase/decrease functions 265A through 265C which are disposed at a stage before the emotion units 260A through 260C as shown in FIG. 37 and generate intensity information S14A through S14C to enhance and/or lower intensities of the emotion units 260A through 260C on the basis of the action information S12 representing an action of the pet robot 210 and the input information Si through S3, and enhances and/or lowers the intensities of the emotion units 260A through 260C in correspondence with the intensity information S14A through S14C output from the above described intensity increase/decrease functions 265A through 265C.

The emotion and instinct model section 250 enhances an intensity of the "delight" emotion unit 260A, for example, when the pet robot makes a courtesy to the user and is tapped on the head, that is, when the action information S12 representing a courtesy to the user and the input information S1 through S3 representing being tapped on the head are given to the intensity increase/decrease function 55A, whereas the emotion and instinct model section 250 does not change the intensity of the "delight" emotion unit 260A even when the pet robot is tapped on the head during execution of some task, that is, when the action information S12 representing execution of a task and the input information S1 through S3 representing being tapped on the head are given to the intensity increase/decrease function 265A.

The emotion and instinct model section 250 determines intensities of the emotion units 260A through 260C while referring not only to the input information Si through S3 but also to the action information S12 representing the current or past action of the pet robot 210, thereby being capable of preventing an unnatural emotion from arising which enhances an intensity of the "delight" emotion unit 260A, for example, when the user taps on the head for mischief during execution of some task. By the way, the emotion and instinct model section 250 is configured to similarly enhance and/or lower intensities also of the desire units 261A through 261C respectively on the basis of the input information S1 through S3 and the action information S12 which are supplied.

When the input information S1 through S3 and the action information S12 are input, the intensity increase/decrease functions 265A through 265C generate and output the intensity information S14A through S14C as described above dependently on parameters which are preliminarily set, thereby making it possible to breed the above described pet robot 210 so as to be a pet robot having an individuality, for example, a pet robot liable to get angry or a pet robot having a cheerful character by setting the above described parameters of the pet robot 210 at different values.

Furthermore, parameters of the emotion model can be changed dependently on a character of another robot apparatus (hereinafter referred to as a mate robot). In other words, a character of the pet robot 210 is changed through interactions with the mate robot, thereby shaping the character with a characteristic such as "He that touches pitch shall be defiled". It is therefore possible to realize the pet robot 210 having a character which is formed naturally.

Figure 38:
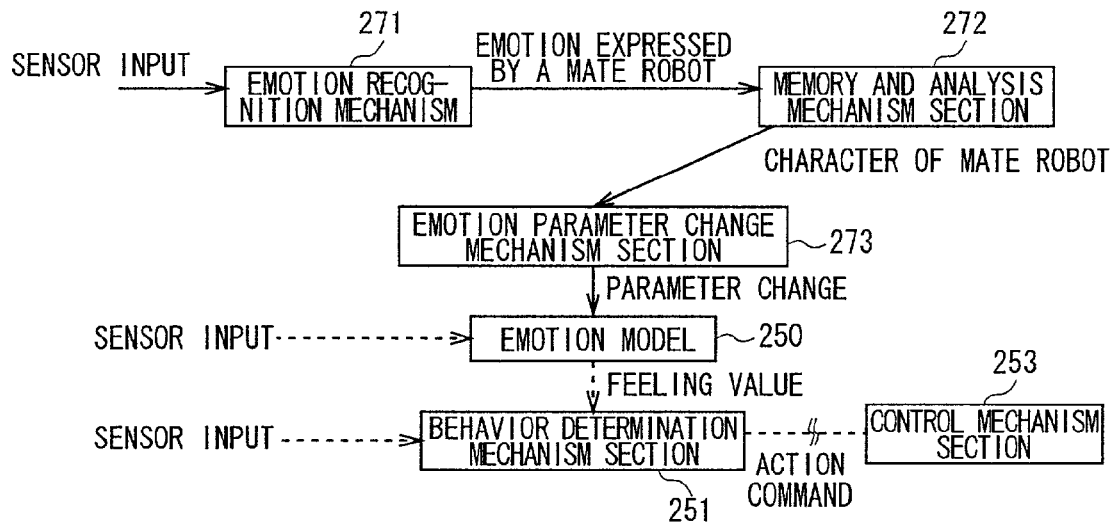
FIG. 38 is a block diagram of component members for changing parameters of an emotion model in the above described pet robot.

Specifically, it is possible to form a character which is adapted to the mate robot apparatus by disposing an emotion recognition mechanism section 271, a memory and analysis mechanism section 272, and a parameter change mechanism section 273 as shown in FIG. 38.

The emotion recognition mechanism section 271 recognizes whether or not an action of the mate robot expresses some emotion as well as a kind and an intensity of an emotion when the action expresses an emotion. Specifically, the emotion recognition mechanism section 271 comprises a sensor which detects an action of the mate robot and an emotion recognizing section which recognizes an emotion of the mate robot on the basis of a sensor input from the sensor, captures the action of the mate robot with the sensor and recognizes the emotion of the mate robot from the sensor input with the emotion recognizing section. The sensor input is, for example, the external information signal S2 out of the above described input signals and may be the audio signal S1B from the microphone 221 shown in FIG. 33 or the image signal S2B from the image recognizing section 220 shown in FIG. 33.

Speaking of recognition of an emotion, the emotion recognition mechanism section 271 recognizes an emotion expressed by sounds emitted from the mate robot or an action of the mate robot which is used as the sensor input.

Specifically, the pet robot 210 has an action pattern for actions deriving from emotions of the mate robot as information and compares this action pattern with an actual action of the mate robot, for example, a movement of a moving member or an emitted sound, thereby recognizing an emotion expressed by an action of the mate robot. For example, the pet robot 210 has an action pattern for a movement of a foot of the mate robot when the above described mate robot is angry and detects an angry state of the mate robot when a movement of the foot of the mate robot which is obtained with the image recognizing section 220 is coincident with the action pattern.

Actions of the pet robot 210 have been determined, for example, on the basis of a preliminarily registered emotion model. In other words, the actions of the pet robot 210 result from expressions of emotions. On a premise that the mate robot also has a similar emotion model, the pet robot 210 is capable of comprehending an action as a result of what emotion of the mate robot from the action pattern for the mate robot. By comparing the action information held by the pet robot itself with motion information of the mate robot, the pet robot is easily capable of comprehending emotions of the mate robot.

By recognizing emotions as described above, the pet robot 210 is capable of recognizing that the mate robot is angry when the pet robot 210 detects an angry action, for example, an angry walking manner or an angry eye.

The emotion recognition mechanism section 271 sends information of an emotion expressed by the mate robot which is recognized as described above to the memory and analysis mechanism section 272.

On the basis of the information sent from the emotion recognition mechanism section 271, the memory and analysis mechanism section 272 judges a character of the mate robot, for example, an irritable character or a pessimistic character. Specifically, the memory and analysis mechanism section 272 stores the information sent from the emotion recognition mechanism section 271 and analyzes a character of the mate robot on the basis of a change of the information within a certain time.

Figure 39:
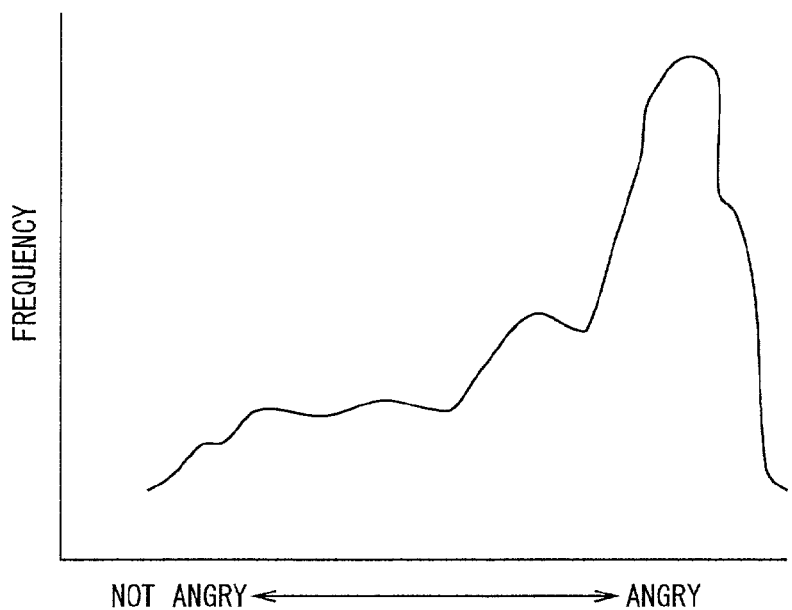
FIG. 39 is a characteristic diagram showing an emotion expression ratio of a mate robot.

Specifically, the memory and analysis mechanism section 272 takes out information within the certain time from information stored in a data memory (not shown) and analyzes an emotion expression ratio. When information of an emotion related to "anger" is obtained at a ratio shown in FIG. 39, for example, the memory and analysis mechanism section 272 judges that the mate robot has a character which is liable to be angry.

The memory and analysis mechanism section 272 sends information of a character of the mate robot obtained as described above to the emotion parameter change mechanism section 273.

The emotion parameter change mechanism 63 changes parameters of the emotion model (specifically, the emotion and instinct model section) 250. Concretely speaking, the emotion parameter change mechanism section 273 changes parameters of the emotion units related to the emotions of "anger" and "sadness".

Furthermore, the parameters of the above described intensity increase/decrease functions 265A through 265C may be changed as the parameters related to the emotions. Since the intensity information S14A through S14C is generated from the input information S1 through S3 and the action information S12 in accordance with the changed parameters of the intensity increase/decrease functions 265A through 265C in this case, it is possible to breed the pet robot 210 so as to have, for example, a character which is liable to be angry or cheerful.

Input into the emotion model section 250 are sensor inputs which are the input information S1 through S3 and the action information S12, and output to the behavior determination mechanism section 251 is emotion state information S10a which are to be used as emotion values corresponding to the parameters (intensities) changed by the emotion parameter change mechanism section 273. The behavior determination mechanism section 251 disposed at a later stage determines an action of the pet robot 210 on the basis of the emotion values (emotion state information S10a), thereby expressing a character through the action.

The pet robot 210 changes the parameters (intensities) of the emotion model in correspondence to a character of the mate robot as described above, thereby naturally forming a character. When the pet robot 210 is in contact with another robot which is liable to be angry, for example, the pet robot 210 increases parameters of a liability to be angry of its own and makes itself liable to be angry.

Returning to FIG. 34, the behavior determination mechanism section 251 determines a next action on the basis of input information S14 which comprises the command signal S1, the external information signal S2, the internal information signal S3, the emotion and instinct state information S10 and the action information S12, and sends out contents of the above described determined action to the posture transition mechanism section 252 as action command information S16.

Figure 40:
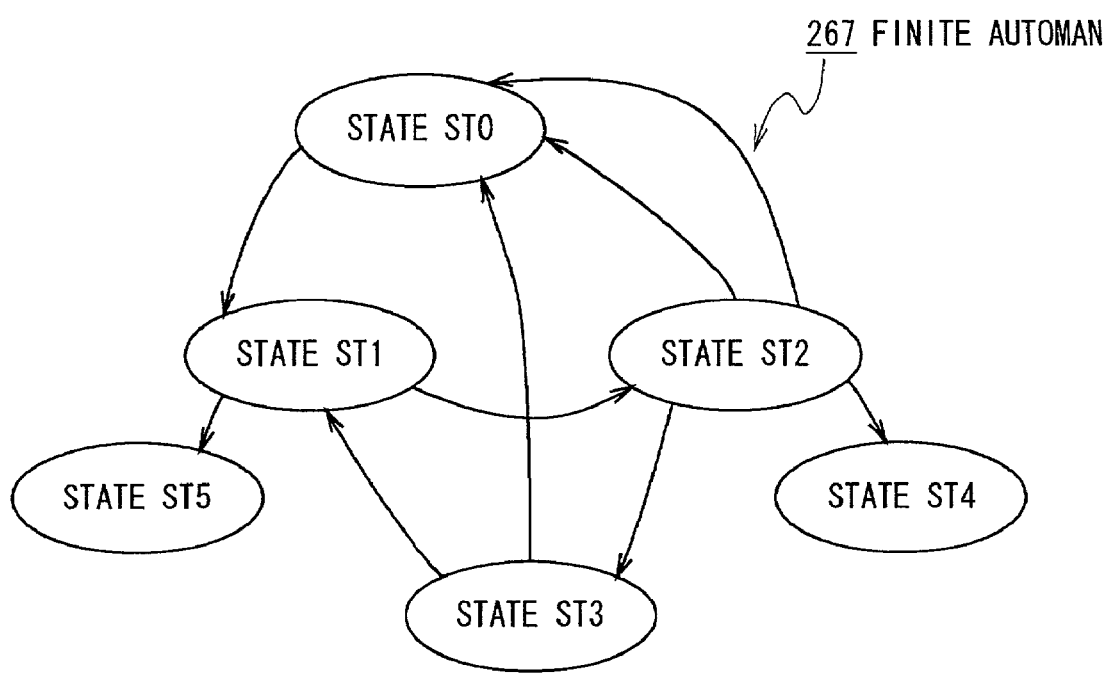
FIG. 40 is a state transition diagram of finite automaton in a behavior determination mechanism section.

Specifically, the behavior determination mechanism section 251 uses an algorithm called finite automaton 267 which has a finite number of action states (hereinafter referred to as states) expressing a history of the input information S14 supplied in the past as shown in FIG. 40, and determines a next action by making transition of a state at that time to another state on the basis of the input information S14 which is currently supplied and the above described state at that time. The behavior determination mechanism section 251 makes transition of a state as described above each time the input information S14 is supplied and determines an action dependently on the above described state to which the transition is made, thereby determining the action referring not only to the current input information S14 but also to the past input information S14.

Accordingly, the behavior determination mechanism section 251 makes transition to a state ST5 of "standing", for example, when the input information S14 of "pet robot has lost sight of a ball" is supplied at a state ST1 of "pet robot is chasing a ball", whereas the behavior determination mechanism section 251 makes transition to a state ST4 of "standing" when the input information S14 of "get up" is supplied at a state ST2 of "lying". It will be understood that actions which are identical at these states ST4 and ST5 are classified as different states due to different histories of the past input information S14.

The behavior determination mechanism section 251 actually makes transition of a current state to a next state when predetermined trigger is made. Concrete examples of the trigger are a definite time reached by an execution time of an action at a current state, input of specific input information S14, and a predetermined threshold value exceeded by an intensity of a unit desired out of intensities of the emotion units 260A through 260C and the desire units 261A through 261C which is represented by the emotion and instinct state information S10 supplied from the emotion and instinct model section 250.

At this time, the behavior determination mechanism section 251 selects a transition destination state on the basis of whether or not a predetermined threshold value is exceeded by an intensity of a unit desired out of intensities of the emotion units 260A through 260C and the desire units 261A through 261C which are represented by the emotion and instinct state information S10 supplied from the emotion and instinct model section 250. Accordingly, the behavior determination mechanism section 251 is configured to make transition to a state which is different dependently on intensities of the emotion units 260A through 260C and the desire units 261A through 261C even when an identical command signal S1 is input.

When the behavior determination mechanism section 251 detects a palm stretched before the eye on the basis of the supplied external information signal S2, detects an intensity of the "anger" emotion unit 260C not higher than the predetermined threshold value on the basis of the emotion and instinct state information S10 and detects "pet robot is not hungry", that is, a battery voltage not lower than a predetermined threshold value on the basis of the internal information signal S3, for example, the behavior determination mechanism section 251 therefore generates action command information S16 for allowing the pet robot to take an action of "hand lending" in correspondence to the palm stretched before the eye and sends out this information to the posture transition mechanism section 252.

Furthermore, when the behavior determination mechanism section 251 detects a palm stretched before the eye, detects an intensity of the "anger" emotion unit 260C not higher than the predetermined threshold value and "pet robot is hungry", that is, a battery voltage lower than the predetermined threshold value, for example, the behavior determination mechanism section 251 generates the action command information S16 for allowing the pet robot to take an action of "licking up a palm" and sends out this information to the posture transition mechanism section 252.

Furthermore, when the behavior determination mechanism section 251 detects a palm stretched before the eye and an intensity of the "anger" emotion unit 260C not lower than the predetermined threshold value, for example, the behavior determination mechanism section 251 generates the action command information S16 which allows the pet robot to take an action of "looking aside in anger" whether or not "pet robot is not hungry", that is, whether or not the battery voltage is not lower than the predetermined threshold value. When the parameters of the emotion model (intensities of the emotion units) are changed in correspondence to the mate robot which has a character liable to get angry, for example, intensities of the emotion model often exceed the predetermined threshold value and the pet robot 210 often takes the action of "looking aside in anger"

On the basis of an intensity of a unit desired out of intensities of the emotion units 260A through 260C and the desire units 261A through 261C represented by the emotion and instinct state information S10 supplied from the emotion and instinct model section 250, the behavior determination mechanism section 251 determines parameters of an action to be taken at the transition destination state, for example, a walking speed, magnitudes and speeds of movements of the hands and feet, a pitch and loudness of a sound to be emitted or the like, generates the action command information S16 corresponding to the parameters of the above described action, and sends out this information to the posture transition mechanism section 252.

By the way, the input information S1 through S3 which comprises the command signal S1, the external information signal S2 and the internal information signal S3 is input not only into the emotion and instinct model section 250 but also into the behavior determination mechanism section 251 since this information has contents which are different dependently on timings of input into the emotion and instinct model section 250 and the behavior determination mechanism section 251.

When the external information signal S2 of "tapped on the head" is supplied, for example, the controller 242 generates the emotion and instinct state information S10 of "delight" with the emotion and instinct model section 250 and supplies the above described emotion and instinct state information S10 to the behavior determination mechanism section 251, but when the external information signal S2 of "a hand is present before the eye" is supplied in this state, the controller 242 generates action command information S16 of "willing to lend a hand" in the behavior determination mechanism section 251 on the basis of the above described information S10 of "delight" and the external information signal S2 of "a hand is present before the eye, and sends out the action command information S16 to the posture transition mechanism section 42.

Returning to FIG. 34, the posture transition mechanism section 252 generates posture transition information S18 for transition from a current posture to a next posture on the basis of the action command information S16 supplied from the behavior determination mechanism section 251 and sends out the information S18 to the control mechanism section 253. In this case, a posture to which transition is possible from the current posture is determined, for example, dependently on physical forms of the pet robot 210 such as forms and weights of the body, hands and feet, coupled conditions of component members and mechanisms of the actuators 233A through 233N such as bending directions and angles of the joints.

Postures to which transition is possible are classified into those to which direct transition is possible from a current posture and others to which the direct transition is impossible from the current posture. From a lying down state of the quadruped pet robot 210 with the four feet largely thrown out, for example, the direct transition is possible to a prostrating state, but impossible to a standing state, and the pet robot 210 must take actions in two stages of once drawing the hands and feet near the body and then standing up. Furthermore, there are postures which cannot be taken safely. The quadruped pet robot 210 easily falls down, for example, when the pet robot 210 attempts to give a hurrah with two forefeet raised in a standing posture.

When postures to which transition is possible are preliminarily registered and the action command information S16 supplied from the behavior determination mechanism section 251 indicates a posture to which the direct transition is possible, the posture transition mechanism section 42 sends out the above described action command information S16 as posture transition information S18 without modification to the control mechanism section 253, but when the action command information S16 indicates a posture to which direct transition is impossible, the posture transition mechanism 252 generates the posture transition information S18 which causes transition once to another posture to which transition is possible and then transition to a target posture, and sends out the information to the control mechanism section 253. Accordingly, the pet robot 210 is capable of avoiding an event of an unreasonable attempt to take a posture to which transition is impossible or an event of falling down.

Figure 41:
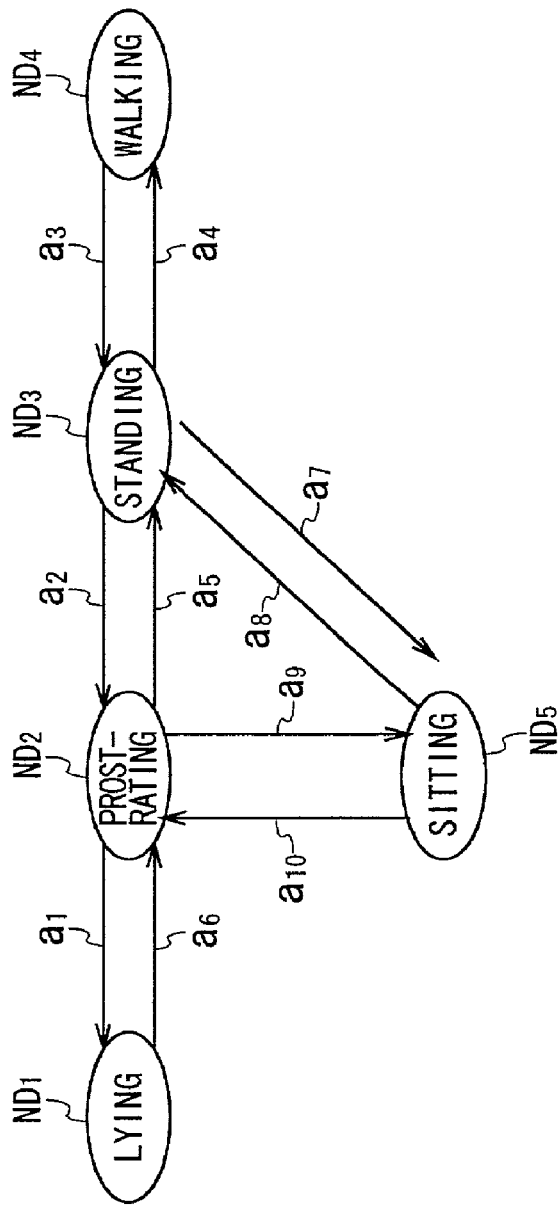
FIG. 41 is a diagram showing a graph of posture transition in a posture transition mechanism section.

Specifically, the posture transition mechanism section 42 is configured to preliminarily register postures which the pet robot 210 can take and record postures between which the transition is possible. The posture transition mechanism section 252 uses an algorithm called directed graph 270 which expresses postures which the pet robot 210 can take as nodes $ND_1$ through $ND_5$ and connects the postures between which the transition is possible, that is, the nodes $ND_1$ through $ND_5$ with directed arcs $a_1$ through $a_{10}$, for example, as shown in FIG. 41.

When the action command information S16 is supplied from the behavior determination mechanism section 251, the posture transition mechanism section 252 plans posture transition by searching for a path from a node ND corresponding to a current posture to a node ND corresponding to a posture to be taken next which is indicated by the action command information S16 in directions indicated by the directed arcs a so as to connect the current node ND to the next node ND and sequentially recording nodes ND existing in the searched path. Accordingly, the pet robot 210 is capable of realizing an action indicated by the behavior determination mechanism section 251 while avoiding the event to make the unreasonable attempt to take the posture to which the transition is impossible or the event of falling down.

When the action command information S16 of "sit down" is supplied in a node $ND_2$ indicating a current posture of "prostration", for example, the posture transition mechanism section 252 gives the posture transition information S18 of "sit down" to the control mechanism section 253 utilizing a fact that the direct transition is possible from the node $ND_2$ indicating the posture of "prostration" to a node $ND_5$ indicating a posture of "sitting down". When the action command information S16 of "walk" is supplied, in contrast, the posture transition mechanism section 252 plans posture transition by searching for a path from the node $ND_2$ of "prostration" to a node $ND_4$ of "walking", generates the action command information S18 which emits a command of "stand up" and then a command of "walk", and sends out the action command information S18 to the control mechanism section 253.

Returning to FIG. 34, the control mechanism section 253 is configured to allow the pet robot 210 to take a desired action by generating the control signal S5 for driving the actuators 233A to 233N on the basis of the action command information S18 and sending out this signal to the actuators 233A to 233N to drive the actuators 233A to 233N.

(5-4) Operations and Effect

In the above described configuration, the emotion and instinct model section 250 changes states of an emotion and an instinct of the pet robot 210 on the basis of the supplied input information S1 through S3 and reflects changes of the states of the emotion and the instinct on an action of the pet robot 210, thereby allowing the pet robot 210 to autonomously act on the basis of the states of emotions and instincts of its own.

The emotion and instinct model section (emotion model section shown in FIG. 38) 250 is capable of determining an action dependently on a character which is changed in correspondence to a character of the mate robot. Accordingly, the user can enjoy a character formation process of the pet robot 210 in correspondence to another robot and gain an interest in breeding.

Furthermore, the behavior determination mechanism section 251 of the controller 242 determines a next state successive to a current state on the basis of the a current state corresponding to a history of the input information S14 which is supplied sequentially and the input information S14 which is supplied next, thereby allowing the pet robot 210 to autonomously act on the basis of states of the emotions and instincts of its own.

Furthermore, the posture transition mechanism section 252 of the controller 242 makes transition from a current posture of the pet robot 210 to a posture corresponding to the action command information S16 by changing the current posture through a predetermined path, thereby avoiding the event to take an unreasonable posture or the event of falling down.

The above described configuration changes states of an emotion and an instinct of the pet robot 210 on the basis of the input information S1 through S3 supplied to the controller 242, determines an action of the pet robot 210 on the basis of changes of states of the emotion and the instinct, selects a posture to which transition is possible dependently on the above described determined action and moves the pet robot 210, thereby making it possible to realize the pet robot 210 which is capable of autonomously acting on the basis of emotions and instincts of its own, and taking actions quite similar to those of a true pet.

(5-5) Other Embodiments

Figure 42:
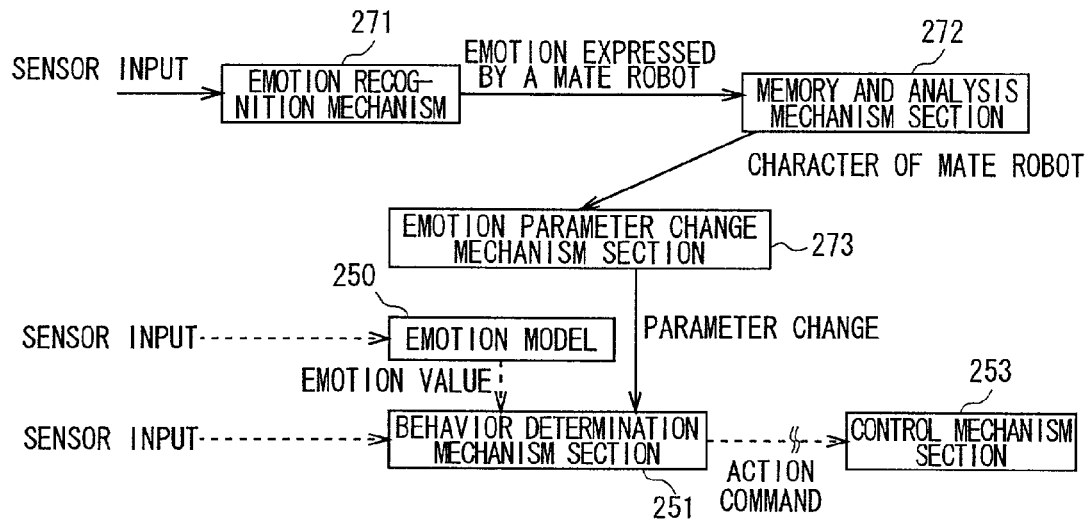
FIG. 42 is a block diagram showing the component members for changing the parameters of the emotion model in the pet robot described in the fifth embodiment and is descriptive of another embodiment for changing the parameters of the emotion model.

Note that, in the aforementioned fifth embodiment, though the emotion parameter change mechanism section 273 changes a character in correspondence to a character of the mate robot by modifying the parameters of the emotion model in the above described embodiment, the present invention is not limited by the embodiment and the character can be changed by modifying parameters of the behavior determination mechanism section 251 as shown in FIG. 42. In this case, adjustable parameters of the behavior determination mechanism section 251 are changed. For example, transition probabilities are changed though the finite automaton makes transition of states by supplying the input information S14.

Figure 43:
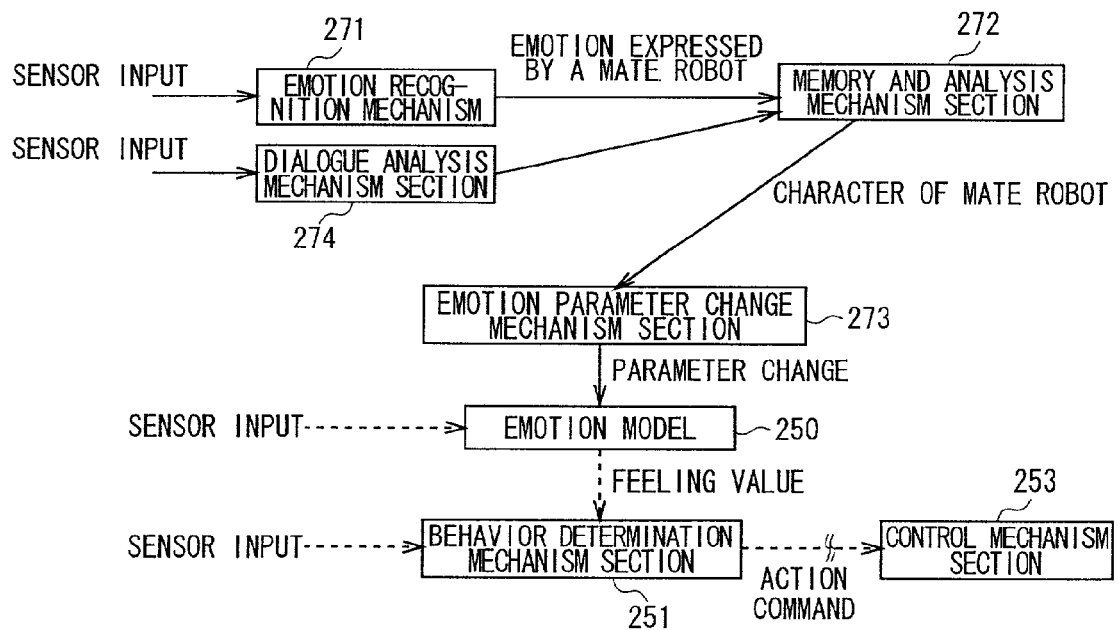
FIG. 43 is a block diagram of component members for changing the parameters of the emotion model in the pet robot described in the fifth embodiment, which comprises a dialogue analysis mechanism section for analyzing dialogue between a mate robot and a user.

Further, in the aforementioned fifth embodiment, though a character state is changed only on the basis of an emotion expressed by the mate robot in the above described embodiment, the present invention is not limited by the embodiment and reference can be made also to other information. The character state can be changed, for example, by disposing a dialogue analysis mechanism section 274 as shown in FIG. 43 and analyzing dialogue between the mate robot and the user (owner).

The dialogue analysis mechanism section 274 analyzes the dialogue between the user and the mate robot, for example, a language emitted from the user to the mate robot or a gesture shown by the user to the mate robot. The dialogue analysis mechanism section 274 analyzes, for example whether the user is scolding or striking the mate robot or the like. The dialogue analysis mechanism section 251 sends an analysis result to the memory and analysis mechanism section 272.

The dialogue analysis mechanism section 274 discriminates a character of the mate robot on the basis of information of an emotion expressed by the mate robot which is supplied from the emotion recognition mechanism section 271 and the analysis result which is obtained with the dialogue analysis mechanism section 274.

Though the mate robot will be judged to have character which is liable to be angry in a case where only barking information is sent as information from the emotion recognition mechanism section 271, reference to the dialogue with the user prevents the mate robot from being easily judged to have the character which is liable to be angry in a case where the mate robot is struck by the user and barking, thereby making it possible to perform composite judgement dependently on environments.

Further, in the aforementioned fifth embodiment, though a character of the pet robot 210 is changed so as to match with a character of the mate robot in the above described embodiment, the present invention is not limited by the embodiment and it is possible to change the character of the pet robot 210 to as to be opposed to the character of the mate robot, that is, in a reverse direction.

Further, in the aforementioned fifth embodiment, though reference is made to an action of the mate robot to judge a character of the mate robot in the above described embodiment, the present invention is not limited by the embodiment and it is possible to judge a character of the mate robot through data communication with the mate robot. The data communication may be radio communication or communication through wire.

Further, in the aforementioned fifth embodiment, though the mate robot is single in the above described embodiment, the present invention is not limited by the embodiment and the mate robot may be in a plurality. In this case, the pet robot 210 is capable of discriminating robots and changing a character of its own collectively from the plurality of robots or individually from specific robots. Accordingly, the pet robot 210 is capable of changing the character of its own dependently on characters of the plurality of mate robots when these robots have characters which are different from one another.

Under a circumstance where a plurality of robots exists as described above, it is further necessary to discriminate individual robots. In this case, faces are patterned as predetermined so that the pet robot 210 is capable of discriminating the robots individually. For example, the so-called bar codes may be attached to the mate robots as predetermined marks so that the pet robot 210 can discriminate the plurality of robots individually. In a case where characters of the mate robots are to be judged through the data communication, discriminating information may be attached to character data so that the pet robot 210 can discriminate the plurality of robots. The discriminating information can be, for example, discriminating numbers of devices of the mate robots, for example, IDs of the so-called memory sticks (trade mark in SONY Co.) which are memory media configured to be detachable.

Further, in the aforementioned fifth embodiment, though description is made mainly of emotion recognition from actions of movable members of the mate robot in the above described embodiment, the present invention is not limited by the embodiment and it is possible to recognize an emotion of the mate robot from a contact state of mate robot with the touch sensor 224.

Further, in the aforementioned fifth embodiment, though the pet robot 210 receives a user's command sent from the remote controller with the infrared ray, the present invention is not limited by the embodiment and the pet robot 210 may be configured to receive a user's command sent, for example, with a radio wave or an acoustic wave.

Further, in the aforementioned fifth embodiment, though the user's command is input through the command receiving section 240 which comprises the remote controller receiver 223 and the microphone 221 in the above described embodiment, the present invention is not limited by the embodiment and it is possible, for example, to connect a computer to the pet robot 210 and input a user's command via the above described connected computer.

Further, in the aforementioned fifth embodiment, though states of an emotion and an instinct are determined using the emotion units 260A through 260C expressing the emotions of "delight", "sadness" and "anger" as well as the desire units 261A through 261C expressing the desires of "appetite", "desire for sleep" and "desire for movement" in the above described embodiment, the present invention is not limited by the embodiment and it is possible to add an emotion unit expressing an emotion of "loneliness" to the emotion units 260A through 260C and add an desire unit expressing "desire for love" to the desire units 261A through 261C or determine states of an emotion and an instinct using a combination of other various kinds of emotion units and desire units.

Further, in the aforementioned fifth embodiment, though a next action is determined by the behavior determination mechanism section 251 on the basis of the command signal S1, the external information signal S2, the internal information signal S3, the emotion and instinct state information S10 and the action information S12 in the above described embodiment, the present invention is not limited by the embodiment and a next action may be determined on the basis of some information out of the command signal S1, the external information signal S2, the internal information signal S3, the emotion and instinct state information S10 and the action information S12.

Further, in the aforementioned fifth embodiment, though a next action is determined using the algorithm called finite automaton 267 in the above described embodiment, the present invention is not limited by the embodiment and an action may be determined by using an algorithm called state machine which has states in a number which is not finite, and in this case, a new state is to be generated each time the input information S14 is supplied and an action is to be determined in accordance with the above described generated state.

Further, in the aforementioned fifth embodiment, though the next action is determined using the algorithm called finite automaton 267 in the above described embodiment, the present invention is not limited by the embodiment and an action may be determined using an algorithm called probability finite automaton which selects a plurality of states as prospective transition destinations on the basis of the input information S14 currently supplied and a state at that time, and determines a transition destination state out of the selected plurality of states at random using random numbers.

Further, in the aforementioned fifth embodiment, though the action command information S16 is sent with no modification to the control mechanism section 253 as the posture transition information S18 when the action command information S16 indicates a posture to which direct transition is possible or the posture transition information S18 for transition once to a posture to which transition is possible and then to a target posture is generated and sent to the control mechanism section 253 when the action command information S16 indicates a posture to which the direct transition is impossible in the above described embodiment, the present invention is not limited by the embodiment and it is possible to configure to accept the action command information S16 and send this information to the control mechanism section 43 only when the action command information S16 indicates a posture to which direct transition is possible, and refuse the above described action command information S16 when this information indicates a posture to which the direct transition is impossible.

Further, in the aforementioned fifth embodiment, though the present invention is applied to the pet robot 210 in the above described embodiment, the present invention is not limited by the embodiment and the present invention is applicable to other various kinds of robots, for example, robot apparatuses which are used in entertainment fields such as games and exhibitions.

Figure 44:
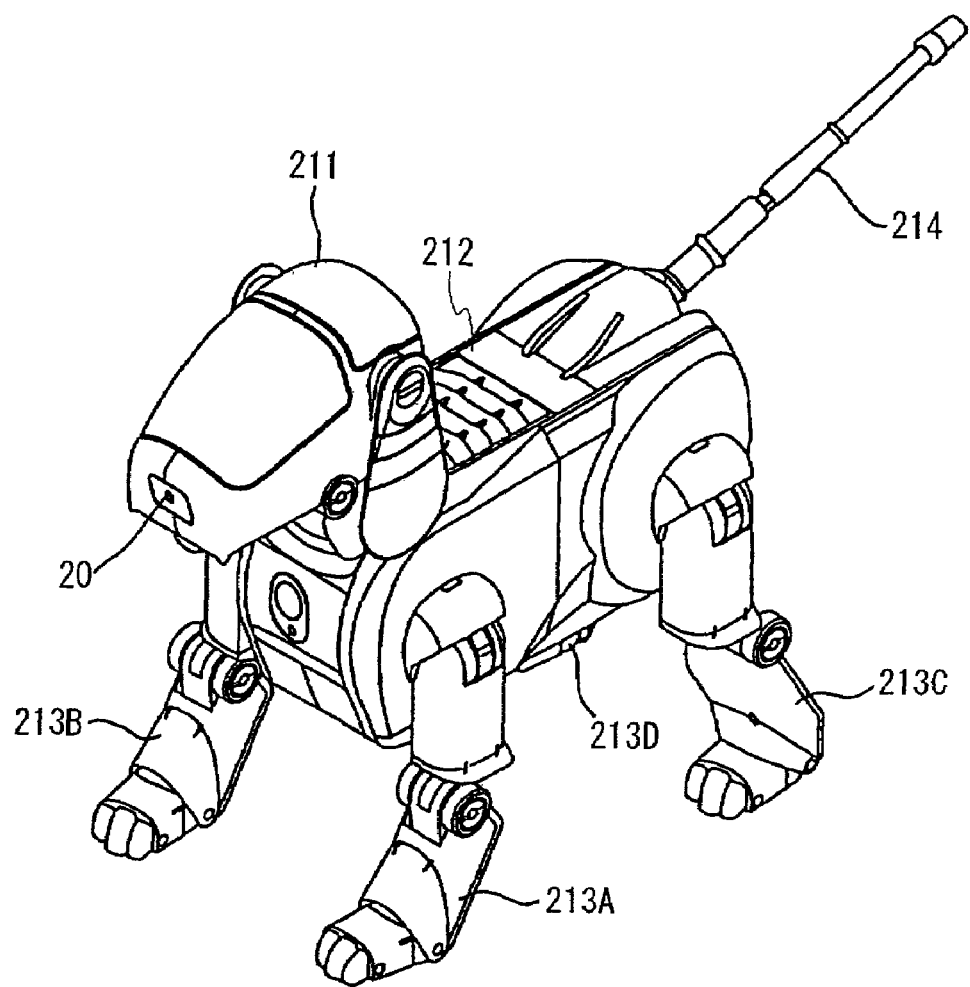
FIG. 44 is a perspective view showing another embodiment of the pet robot described in the fifth embodiment.

Furthermore, an appearance of the pet robot 210 to which the present invention is applied is not necessarily configured as shown in FIG. 32 but may be configured as shown in FIG. 44 so as to resemble to a real dog.

INDUSTRIAL APPLICABILITY

The present invention is applied to robots which are used in an entertainment field such as a game and a exhibition, pet robots which are used as pets, and the like.

What is claimed is:

1. A robot apparatus having emotion models consisting of a plurality of emotional behaviors and instinct models consisting of a plurality of desires, for generating action on the basis of the parameter value of each emotional behavior of the emotion model and/or the parameter value of each desire of the instinct model which are sequentially updated in accordance with prescribed conditions, comprising restricting means for restricting the number of the emotional behaviors or the desires used for generating the action so as to increase or decrease stepwise.

2. The robot apparatus according to claim 1, wherein said restricting means increases and/or decreases stepwise the number of the emotional behaviors or the desires used for generating the action on the basis of the accumulation of prescribed stimulation which are externally applied and/or the lapse of time.

3. The robot apparatus according to claim 1, comprising: action generating means for generating the action on the basis of each of the parameter values of the emotional behaviors and/or the desires and a prescribed behavioral model; and behavioral model changing means for changing the behavioral model in the action generating means, to a behavioral model whose growth level is higher than that of the former, on the basis of the accumulation of prescribed stimulation which are externally applied and/or the lapse of time, and wherein said restricting means increases or decreases the number of the emotional behaviors and/or the desires used for generating the action depending on the change of the behavioral model by the behavioral model changing means.

4. The robot apparatus according to claim 1, wherein said emotion models include six emotional behaviors of joy, sadness, anger, surprise, disgust and fear as said emotional behaviors.

5. The robot apparatus according to claim 1, wherein said instinct models include four desires of exercise, affection, appetite and curiosity as said desires.

6. The robot apparatus according to claim 1, further comprising: emotional behavior and/or desire updating means for sequentially updating the parameter value of each emotional behavior and/or the parameter value of each desire, depending on corresponding sensitivity individually set to each emotional behavior and/or each desire, on the basis of the stimulation and/or the lapse of time; and sensitivity updating means for evaluating an environment and respectively updating the sensitivity corresponding to each emotional behavior and/or each desire on the basis of the evaluated result.

7. A robot apparatus having emotion models consisting of a plurality of emotional behaviors and instinct models consisting of a plurality of desires, for generating action on the basis of the parameter value of each emotional behavior of the emotion model and/or the parameter value of each desire of the instinct model, comprising: emotional behavior and/or desire updating means for sequentially updating the parameter value of each emotional behavior and/or the parameter value of each desire, depending on corresponding sensitivity individually set to each emotional behavior and/or each desire, on the basis of externally applied stimulation and/or the lapse of time; and sensitivity updating means for evaluating an environment and respectively updating the sensitivity corresponding to each emotional behavior and/or each desire on the basis of the evaluated result.

8. The robot apparatus according to claim 7, wherein said sensitivity changing means evaluates the environment on the basis of the parameter value of each emotional behavior and/or the parameter value of each desire which are sequentially updated.

9. The robot apparatus according to claim 7, wherein said emotion models include six emotional behaviors of joy, sadness, anger, surprise, disgust and fear as said emotional behaviors.

10. The robot apparatus according to claim 7, wherein said instinct models include four desires of exercise, affection, appetite and curiosity as said desires.

11. A control method for a robot apparatus having emotion models consisting of a plurality of emotional behaviors and instinct models consisting of a plurality of desires, for generating action on the basis of the parameter value of each emotional behavior of the emotion model and/or the parameter value of each desire of the instinct model which are sequentially updated in accordance with prescribed conditions, comprising: a first step of restricting the number of the emotional behaviors and/or the desires used for generating the action; and a second step of increasing or decreasing stepwise the number of the emotional behaviors and/or the desires used for generating the action.

12. The control method for a robot apparatus according to claim 11, wherein in the second step, the number of the emotional behaviors or the desires used for generating the action is increased stepwise on the basis of the accumulation of prescribed stimulation which are externally applied and/or the lapse of time.

13. The control method for a robot apparatus according to claim 11, wherein: said robot apparatus generates the action on the basis of each of the parameter values of the emotional behaviors and/or the desires and a prescribed behavioral model, and changes the behavioral model in the action generating means, to a behavioral model whose growth level is higher than that of the former, on the basis of the accumulation of prescribed stimulation which are externally applied and/or the lapse of time; and in the second step, the number of the emotional behaviors and/or the desires employed for generating the action is increased or decreased depending on the change of the behavioral model by the behavioral model changing means.

14. The control method for a robot apparatus according to claim 11, wherein said emotion models include six emotional behaviors of joy, sadness, anger, surprise, disgust and fear as said emotional behaviors.

15. The control method for a robot apparatus according to claim 11, wherein said instinct models include four desires of exercise, affection, appetite and curiosity as said desires.

16. The control method for a robot apparatus according to claim 11, wherein: the second step comprises, for each stage, an updating step of sequentially updating the parameter value of each emotional behavior and/or the parameter value of each desire, depending on corresponding sensitivity individually set to each emotional behavior and/or each desire, on the basis of the stimulation and/or the lapse of time; and a sensitivity updating step of evaluating an environment and respectively updating the sensitivity corresponding to each emotional emotional behavior and/or each desire on the basis of the evaluated result.

17. A control method for a robot apparatus having emotion models consisting of a plurality of emotional behaviors and instinct models consisting of a plurality of desires, for generating action on the basis of the parameter value of each emotional behavior of the emotion model and/or the parameter value of each desire of the instinct model, comprising: a first step of updating the parameter value of each emotional behavior and/or the parameter value of each desire, depending on corresponding sensitivity individually set to each emotional behavior and/or each desire, on the basis of externally applied stimulation and/or the lapse of time; and a second step of evaluating an environment and respectively updating the sensitivity corresponding to each emotional behavior and/or each desire on the basis of the evaluated result.

18. The control method for a robot apparatus according to claim 17, wherein in the second step, the environment is evaluated on the basis of the parameter value of each emotional behavior and/or the parameter value of each desire which are sequentially updated.

19. The control method for a robot apparatus according to claim 17, wherein said emotion models include six emotional behaviors of joy, sadness, anger, surprise, disgust and fear as said emotional behaviors.

20. The control method for a robot apparatus according to claim 17, wherein said instinct models include four desires of exercise, affection, appetite and curiosity as said desires.

* * * * *